(12) United States Patent
Franco

(10) Patent No.: US 9,224,147 B2
(45) Date of Patent: Dec. 29, 2015

(54) CUSTOMER SERVICE MANAGEMENT SYSTEM

(71) Applicant: Hector Franco, Sunnyvale, CA (US)

(72) Inventor: Hector Franco, Sunnyvale, CA (US)

(*) Notice: Subject to any disclaimer, the term of this patent is extended or adjusted under 35 U.S.C. 154(b) by 0 days.

(21) Appl. No.: 14/702,722

(22) Filed: May 2, 2015

(65) Prior Publication Data

US 2015/0262188 A1    Sep. 17, 2015

Related U.S. Application Data

(63) Continuation of application No. 13/181,349, filed on Jul. 12, 2011, now abandoned, which is a continuation-in-part of application No. 11/879,138, filed on Jul. 16, 2007, now Pat. No. 7,979,301.

(51) Int. Cl.
| | |
|---|---|
| *G06Q 10/00* | (2012.01) |
| *G06Q 30/00* | (2012.01) |
| *G06F 17/00* | (2006.01) |
| *G06F 11/00* | (2006.01) |
| *G06Q 10/10* | (2012.01) |
| *G06Q 10/04* | (2012.01) |
| *H04M 3/51* | (2006.01) |

(52) U.S. Cl.
CPC ............. *G06Q 30/016* (2013.01); *G06Q 10/04* (2013.01); *G06Q 10/1097* (2013.01); *H04M 3/5158* (2013.01)

(58) Field of Classification Search
None
See application file for complete search history.

(56) References Cited

U.S. PATENT DOCUMENTS

| | | | |
|---|---|---|---|
| 5,309,513 A | 5/1994 | Rose | |
| 5,511,112 A | 4/1996 | Szlam | |
| 5,872,841 A | 2/1999 | King et al. | |
| 5,884,032 A | 3/1999 | Bateman et al. | |
| 6,021,403 A * | 2/2000 | Horvitz et al. | 706/45 |
| 6,044,355 A * | 3/2000 | Crockett et al. | 705/7.39 |
| 6,240,420 B1 * | 5/2001 | Lee | 705/26.8 |
| 6,295,551 B1 | 9/2001 | Roberts et al. | |
| 6,332,129 B1 | 12/2001 | Walker et al. | |
| 6,499,024 B1 | 12/2002 | Stier et al. | |
| 6,560,589 B1 | 5/2003 | Stier et al. | |
| 6,591,258 B1 | 7/2003 | Stier et al. | |

(Continued)

OTHER PUBLICATIONS

Katsuno & Mendelzon, "On the Difference between Updating a Knowledge Based and Revising it," in "Belief Revision," Peter Gardenfors, ed. (1992). pp. 183-203.

(Continued)

*Primary Examiner* — Ariel Yu

(57) ABSTRACT

The customer is given the option to access customer service through the Internet. A web site provides several convenient alternatives for scheduling a voice session with a customer service agent instead of waiting on the phone. Users are encouraged to search a Selection-Oriented-Knowledge-Base (SOKB) that helps the user's thinking process by displaying a sequence of intuitively recognizable multimedia menu selections that eventually lead to what the user has in mind and provide appropriate answers. The SOKB is based upon a Selection-On-Vertex network that provides the infrastructure to expand the level of knowledge of the SOKB by automatically capturing knowledge gained through experience. Customer service agents are seamlessly integrated into the SOKB by a NEED HELP request button that the user can click if difficulties are encountered during the search. A Help Requests Predictor enables customer service agents to respond within seconds to NEED HELP requests initiated by users.

14 Claims, 51 Drawing Sheets

(56) References Cited

U.S. PATENT DOCUMENTS

| | | | |
|---|---|---|---|
| 6,711,585 | B1 | 3/2004 | Copperman et al. |
| 6,771,760 | B1 | 8/2004 | Vortman et al. |
| 6,782,391 | B1 | 8/2004 | Scher |
| 6,968,323 | B1 * | 11/2005 | Bansal et al. ............ 705/80 |
| 6,970,829 | B1 | 11/2005 | Leamon |
| 7,257,552 | B1 * | 8/2007 | Franco ............ 705/28 |
| 7,337,158 | B2 * | 2/2008 | Fratkina et al. ............ 706/45 |
| 7,480,623 | B1 * | 1/2009 | Landvater ............ 705/7.25 |
| 7,716,077 | B1 * | 5/2010 | Mikurak ............ 705/7.12 |
| 7,725,366 | B1 * | 5/2010 | Franco ............ 705/27.1 |
| 7,734,699 | B2 | 6/2010 | Bhatnagar |
| 7,979,301 | B1 * | 7/2011 | Franco ............ 705/7.31 |
| 8,001,017 | B1 * | 8/2011 | Franco ............ 705/28 |
| 8,015,081 | B1 * | 9/2011 | Franco ............ 705/28 |
| 8,024,330 | B1 * | 9/2011 | Franco et al. ............ 707/724 |
| 2001/0049688 | A1 | 12/2001 | Fratkina et al. |
| 2001/0054064 | A1 * | 12/2001 | Kannan ............ 709/203 |
| 2002/0188499 | A1 * | 12/2002 | Jenkins et al. ............ 705/10 |
| 2003/0012143 | A1 * | 1/2003 | Chen et al. ............ 370/252 |
| 2003/0028513 | A1 | 2/2003 | Pawar |
| 2003/0165802 | A1 * | 9/2003 | Murphy ............ 434/350 |
| 2003/0185378 | A1 | 10/2003 | Mullen |
| 2004/0044542 | A1 | 3/2004 | Beniaminy et al. |
| 2004/0054693 | A1 | 3/2004 | Bhatnagar |
| 2004/0083084 | A1 * | 4/2004 | West ............ 703/11 |
| 2004/0168164 | A1 | 8/2004 | Shevchenko |
| 2005/0055321 | A1 | 3/2005 | Fratkina et al. |

OTHER PUBLICATIONS

Dalal, "Investigations Into a Theory of Knowledge Base Revision: Preliminary Report," Proceedings of the Seventh National Conference on Artificial Intelligence, pp. 475-479 (1988).

U.S. Appl. No. 10/651,384, Now abandoned, Complete public file history as of Aug. 1, 2015.

U.S. Appl. No. 11/879,138, Now U.S. Pat. No. 7,979,301, Complete public file history as of Aug. 1, 2015.

* cited by examiner

Fig. 7A

**Welcome to the Friendly Customer Service Site for *Home Products Corporation***

To register, please follow the instructions below to enter all the applicable information.

700

ZIP Code: [          ]

Country: [    ▶    ]  (Click the pull-down menu to select)

Email address: [          ]  (To help us better serve you)

Call-back phone numbers: (To simplify and expedite your use of this customer service site)

Home Phone: ■ [          ]
Work Phone: ☐ [          ]
Mobile Phone: ☐ [          ]
Other: ☐ [          ]

704

705 — NOTE: Please select one of your phone numbers to be used as the default for call backs from customer service by clicking on the corresponding box to the right of the number field To complete your registration and enter the site click here ↑ [SITE ENTRANCE] — 706

To complete your registration without entering the site click here ↑ [REGISTER ME] — 707

*Fig. 7B*

Scheduling a voice session with a customer service agent:

Step 1: | Next Step

Help us identify the subject of your inquiry. Select the most appropriate topic from the sequence of menus that will be presented to you by clicking the corresponding box.

- ☐ Store Locations, Hours, and Directions
- ☐ Product Returns
- ☐ Billing and Accounting
- ☐ Product Warranty
- ☐ Technical Support
- ☐ Parts and Accessories
- ☐ Authorized Service Centers
- ☐ Resume previous session

*Fig. 8A*

Scheduling a voice session with a customer service agent:

Step 1:   | Next Step |

Help us identify the subject of your inquiry. Select the most appropriate topic from the sequence of menus that will be presented to you by clicking the corresponding box.

- ☐ Store Locations, Hours, and Directions
- ☐ Product Returns
- ☐ Billing and Accounting
- ☐ Product Warranty
- ■ Technical Support
  - ☐ Major Appliances
  - ☐ Home Safety
  - ☐ House Wares
  - ☐ Small Appliances
- ☐ Parts and Accessories
- ☐ Authorized Service Centers

Scheduling a voice session with a customer service agent:

Step 1: | Next Step

Help us identify the subject of your inquiry. Select the most appropriate topic from the sequence of menus that will be presented to you by clicking the corresponding box.

■ Technical Support

■ Major Appliances

■ Dishwashers
☐ Freezers
☐ Microwave Ovens
☐ Ranges
☐ Refrigerators

☐ Home Safety
☐ House Wares
☐ Small Appliances

You have completed Step 1. Please click "Next Step" to continue.

*Fig. 8D*

Scheduling a voice session with a customer service agent:

Step 2: | Previous Step | Next Step

Help us identify the model and serial number of the dishwasher. Look for a plaque inside the dishwasher that contains this information and enter it in the fields below:

Model Number: [ GDS500G - 01AW ]

Serial Number: [ LU 707037 B ]

You have completed Step 2. Please click "Next Step" to continue.

*Fig. 9*

Scheduling a voice session with a customer service agent:

Step 3: | Previous Step | Next Step

Help us identify the general nature of the problem with the dishwasher. Select the item that best describes the problem from the following menu:

- ☐ Won't run
- ☐ Door doesn't latch
- ☐ Detergent cup won't open
- ☒ Water won't pump out of the tub
- ☐ No water flows into the tub
- ☐ Leaks or floods
- ☐ Dishes don't dry
- ☐ Other problems You have completed Step 3. Please click "Next Step" to continue.

*Fig. 10*

Scheduling a voice session with a customer service agent:

Step 4: | Previous Step | Next Step

Please try to answer the questions below pertaining to the dishwasher by clicking on the appropriate box. If the meaning of a word is not clear to you, click on that word to see an explanation. This will save time and will enable our service technicians to better assist you.

Where does the dishwasher drain?

☐ Into a kitchen sink drain.

☐ Into a garbage disposer.

☐ Into a kitchen sink air gap.

☐ I don't know.

*Fig. 11A*

Scheduling a voice session with a customer service agent:

Step 4: | Previous Step | Next Step

Please try to answer the questions below pertaining to the dishwasher by clicking on the appropriate box. If the meaning of a word is not clear to you, click on that word to see an explanation. This will save time and will enable our service technicians to better assist you.

Where does the dishwasher drain?

☐ Into a kitchen sink drain.

☐ Into a garbage disposer.

■ Into a kitchen sink air gap.

Have you checked the air gap to make sure that it is not clogged?   ☐ Yes   ☐ No ☐ I don't know.

*Fig. 11B*

Scheduling a voice session with a customer service agent:

| Step 4: | Previous Step | Next Step |

Please try to answer the questions below pertaining to the dishwasher by clicking on the appropriate box. If the meaning of a word is not clear to you, click on that word to see an explanation. This will save time and will enable our service technicians to better assist you.

Where does the dishwasher drain?

☐ Into a kitchen sink drain.

☐ Into a garbage disposer.

■ Into a kitchen sink air gap.

Have you checked the air gap to make sure that it is not clogged? ☐ Yes ■ No

Most air gaps are easy to inspect and clean when necessary. Typically, you can lift off the chrome cover which exposes a plastic cap. Unscrew this cap and remove any materials that may have accumulated.

Was air gap clogged? ☐ Yes ■ No

Since the dishwasher runs and the drain is not clogged, it appears that the drain valve may not open, as required, during the drain cycle.

*Fig. 11C*

Scheduling a voice session with a customer service agent:

Step 5: | Previous Step | Next Step

You have been navigating our Selection-Oriented Knowledge Base. This step will give you the opportunity to continue your navigation before you talk with a qualified service agent. We encourage you to try it.

Once you get comfortable you will find it a very useful tool to get quick answers to your questions; and should you experience any difficulty, we are committed to provide you very quick access to a knowledgeable agent by simply clicking on the "NEED HELP" button that is always displayed for your convenience.

Please select from the following options by clicking on the corresponding box:

☐ I am ready to schedule a session with a service agent.

☐ I wish to continue navigating the Selection-Oriented Knowledge Base to learn more about my problem.

You have completed Step 5. Please click "Next Step" to continue.

*Fig. 12*

Scheduling a voice session with a customer service agent:

Step 6: | Previous Step | Next Step |

This step will give you the opportunity to schedule a voice session with a qualified customer service agent.

The expected duration of your consultation with a customer service agent is : [ 8 min. ▶ ]  — 1301

You can accept this expected duration or select another expected duration. Agents have flexibility to extend the duration if necessary to complete your session. Please provide your best estimate to help us serve all our customers better.

For the duration you selected, a voice session with a qualified customer service agent can be preferably scheduled during the non-shaded open areas shown in the time diagram below. The shaded areas are already fully booked.

1302

Current date & time: [ Sep 23, 2002 ] [ 09:35 AM ]     Selected duration: [ 8 min. ]

Time axis Zoom: [ IN ] [ OUT ]

*Fig. 13A*

Scheduling a voice session with a customer service agent:

Step 6: [Previous Step] [Next Step]

This step will give you the opportunity to schedule a voice session with a qualified customer service agent.

Please select the option of receiving or originating the call for your voice session with a customer service agent. After you complete your selection press the "SELECT" button.

■ I want to receive the call at the number checked below: — 1413

☐ [408-730-0110]  Home number

■ [408-252-7831] x [5432]  Work number + Extension

☐ [650-796-4389]  Mobile number

☐ [           ]  Other, specify

— 1414

☐ I want to originate the call.

Toll-free number to dial: [1-888-684-9712] — 1415

Reference code to enter after the prompt: [     ] — 1416

[SELECT]

Scheduling a voice session with a customer service agent:

Step 6: | Previous Step | Next Step

This step will give you the opportunity to schedule a voice session with a qualified customer service agent.

Please select the option of receiving or originating the call for your voice session with a customer service agent. After you complete your selection press the "SELECT" button. — 1506

The approximate wait for an agent will be: [00 min] [47 sec] — 1507

☐ I want to receive the call at the number checked below:

☐ [408-730-0110]   Home number
☐ [408-252-7831] [x] [5432]   Work number + Extension
☐ [650-796-4389]   Mobile number
☐ [_____]   Other, specify ■ I want to originate the call.

Toll-free number to dial: [1-888-684-9712]

Reference code to enter after the prompt: [8734]

[SELECT]

Scheduling a voice session with a customer service agent:

Step 6: | Previous Step | Next Step

This step will give you the opportunity to schedule a voice session with a qualified customer service agent.

Please select the number to receive the call for your voice session with a customer service agent. After you complete your selection press the "SELECT" button.

I want to receive the call at the number checked below.

■ 408-730-0110    Home number

☐ 408-252-7831   x 5432    Work number + Extension

☐ 650-796-4389    Mobile number

☐ _____    Other, specify

SELECT

| Search Effort | < 10 | 10 to 20 | 20 to 40 | 40 to 60 | 60 to 80 | > 80 |
|---|---|---|---|---|---|---|
| Typical Number of Vertices Visited | < 5 | 5 to 10 | 10 to 20 | 20 to 30 | 30 to 40 | > 40 |
| Typical Search Time (min:sec) | < 01:15 | 01:15 to 02:30 | 02:30 to 05:00 | 05:00 to 07:30 | 07:30 to 10:00 | > 10:00 |
| Priority Level | L1 | L2 | L3 | L4 | L5 | L6 |
| Service Queue Maximum Acceptable Response Time | Not Applicable | 90 sec | 60 sec | 45 sec | 30 sec | 15 sec |

Fig. 24

| 2701 Priority Queue Level | L1 | L2 | L3 | L4 | L5 | L6 |
|---|---|---|---|---|---|---|
| 2702 Maximum Acceptable Response Time (MART) | 30 min | 90 sec | 60 sec | 45 sec | 30 sec | 15 sec |
| 2703 Scheduled Voice Service Sessions | | | | | | x |
| 2704 I Am Ready Callbacks | | x | x | x | x | |
| 2705 Scheduled Callbacks Within Time Segment | x | | x | x | x | x |
| 2706 Fast-Track Callbacks | | x | x | x | x | |
| 2707 NEED HELP Requests | | | | | x | x |
| 2708 Unscheduled Voice Service Sessions | x | | | | | |

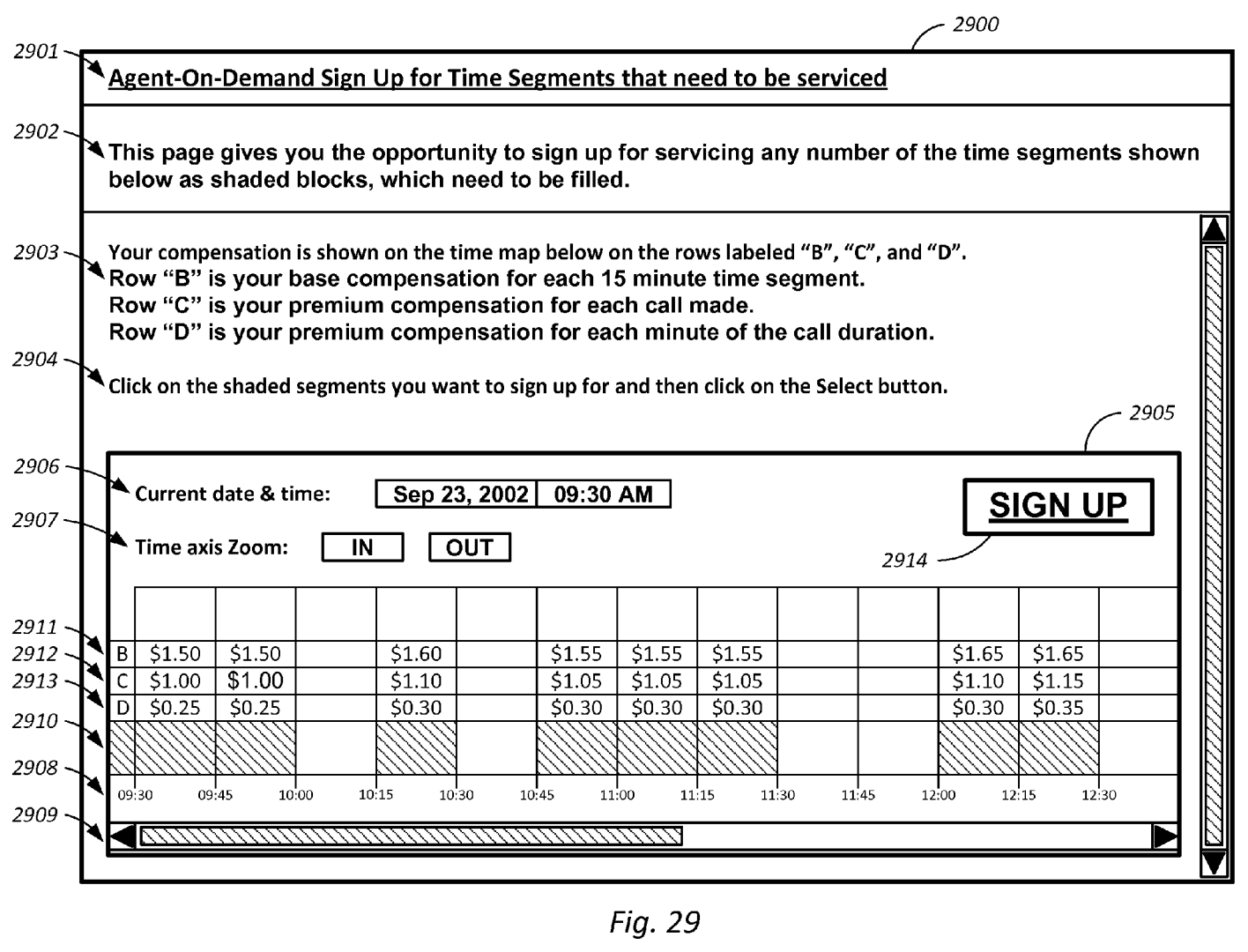

2901 — Agent-On-Demand Sign Up for Time Segments that need to be serviced

2902 — This page gives you the opportunity to sign up for servicing any number of the time segments shown below as shaded blocks, which need to be filled.

2903 — Your compensation is shown on the time map below on the rows labeled "B", "C", and "D".
Row "B" is your base compensation for each 15 minute time segment.
Row "C" is your premium compensation for each call made.
Row "D" is your premium compensation for each minute of the call duration.

2904 — Click on the shaded segments you want to sign up for and then click on the Select button.

2906 — Current date & time: | Sep 23, 2002 | 09:30 AM |

2907 — Time axis Zoom: | IN | OUT |

2905 — SIGN UP

| | 09:30 | 09:45 | 10:00 | 10:15 | 10:30 | 10:45 | 11:00 | 11:15 | 11:30 | 11:45 | 12:00 | 12:15 | 12:30 |
|---|---|---|---|---|---|---|---|---|---|---|---|---|---|
| B | $1.50 | $1.50 | | $1.60 | | $1.55 | $1.55 | $1.55 | $1.55 | | $1.65 | $1.65 | |
| C | $1.00 | $1.00 | | $1.10 | | $1.05 | $1.05 | $1.05 | $1.05 | | $1.10 | $1.15 | |
| D | $0.25 | $0.25 | | $0.30 | | $0.30 | $0.30 | $0.30 | $0.30 | | $0.30 | $0.35 | |

2900 (overall window)
2914 (time map)
2911 (row B), 2912 (row C), 2913 (row D)
2910, 2908, 2909

Fig. 29

CUSTOMER SERVICE MANAGEMENT SYSTEM

RELATED APPLICATIONS

The subject matter of this application is related to U.S. Provisional Application No. 60/192,291, filed on Mar. 27, 2000, U.S. Provisional Application No. 60/225,393, filed on Aug. 15, 2000, U.S. application Ser. No. 09/817,535, filed on Mar. 26, 2001, now U.S. Pat. No. 7,257,552, U.S. Provisional Application No. 60/408,219, filed on Sep. 3, 2002, U.S. application Ser. No. 10/651,384 (with which the present application shares a common specification and figures), filed on Aug. 30, 2003, now abandoned, U.S. application Ser. No. 11/799, 436, filed on May 1, 2007, now U.S. Pat. No. 8,001,017, U.S. application Ser. No. 11/799,168, filed on May 1, 2007, now U.S. Pat. No. 7,725,366, U.S. application Ser. No. 11/879, 138, filed on Jul. 16, 2007, now U.S. Pat. No. 7,979,301, U.S. application Ser. No. 12/780,760, filed on May 14, 2010, now U.S. Pat. No. 8,015,081, and U.S. application Ser. No. 13/181,349 (which incorporated all the foregoing applications by reference), filed on Jul. 12, 2011, now abandoned, all of which applications are hereby incorporated by reference in their entireties.

FIELD OF THE INVENTION

This invention relates generally to a system and methods for improving the efficiency and reducing the costs associated with customer service. More particularly, the invention relates to an Internet-based Customer Service Management System with a scheduling method that provides efficient and convenient access to customer service. This method includes identifying the problem for which the user needs assistance, displaying for the user the available time-slots during which the user can be provided voice contact with a qualified agent, and obtaining from the user a selection of an available time-slot for such voice session. This invention also includes a method for encouraging users to search a Selection-Oriented Knowledge Base to directly find answers to their inquiries. The encouragement is based upon a reward system whereby users that make an effort to consult the Selection-Oriented Knowledge Base are rewarded with very quick priority access to an agent, through the use of a NEED HELP button, if they experience any difficulty.

BACKGROUND OF THE INVENTION

Generally, legacy customer service systems rely upon a toll-free number the user dials to access customer service. However, these systems are plagued with inefficiencies that affect both the user and the organization providing the customer service.

From the user's perspective, there is an unreasonable waste of valuable time. Typically, before the user is able to talk with a qualified customer service agent, there are several frustrating steps. Step one, consists of a time-consuming list of phone menu options, often inapplicable, that sometimes discourage the user from proceeding further. Some menus are so long that users cannot make a selection because they cannot remember all the options provided by the Interactive Voice Response system.

If the user is persistent and manages to overcome Step one, Step two leaves the user waiting online for periods that may extend from minutes to over one hour. During the wait, music interrupted by patience messages and suggestions is often imposed by the system. Unfortunately, such environment generally precludes the user from concentrating on any productive task while waiting. In addition, the user's phone line becomes unavailable for other purposes during the entire waiting period. Step three is pre-empted by a phone ring indicating a forthcoming link to the voice of a customer service agent. In some cases, after a brief evaluation by the customer service agent, the user is directed to a Step four. During Step four the call is transferred to a specialized agent capable of addressing the user's problems. If the transfer is successful, there is a ring, and the user finally has the opportunity to communicate with the specialized agent. If the transfer is not successful, there is a click, and a recording provides the well-known message "if you want to make a call please hang-up and try again." Eventually, the user is left with two unpleasant choices; namely, give up or start all over again.

From the perspective of the organization that offers the customer service there are numerous inefficiencies: (1) Poor utilization of personnel due to random fluctuations in demand. (2) Wasteful utilization of tool-free lines due to long wait-times. (3) High employee turnover rate due to stress. (4) Poorly qualified agents due to lack of specialization. (5) Inadequate identification of the user's problem prior to contact with the agent, due to the limited capabilities of Interactive Voice Response systems. (6) No effective means for educating and encouraging users to use online knowledge-bases to address their questions. (7) No cost effective means to enhance customer satisfaction.

U.S. Pat. No. 5,185,782 to Srinivasan discloses a system that prompts the caller to choose between holding or receiving a return call. If the caller chooses a return call, the arrangement prompts the caller for callback time and time-period. The arrangement places an outgoing call to the stored telephone number when the callback time arrives. If the call does not get through, the arrangement repeatedly periodically repeats placing of the outgoing call, until the call gets through or the callback time-period expires. When it places the outgoing call, the arrangement connects the originating end thereof to an ACD agent to handle the call.

U.S. Pat. No. 5,627,884 to Williams also discloses a system that prompts the caller to choose between holding and receiving a return call. If the caller chooses a return call, caller information is automatically taken from the caller on hold, the call disconnected and the call returned at the time when the caller would have been serviced had the caller stayed on hold.

Although Srinivasan and Williams do disclose systems that enable the caller to receive a call-back instead of holding, they do not present the user a selection of available time windows from which the user can choose an opportune time to have a phone session with an agent. As a result such systems do not provide a method for balancing the workload of the agents to operate at maximum efficiency. Furthermore, these systems require a telephone call to be placed by the user. This call generally requires the user to navigate through an elaborate, time consuming, and difficult to use Interactive Voice Response system, which is a very inconvenient method to access a customer service agent.

In summary, legacy customer service operations are well documented to be a source of frustration for users and a major source of unproductive expenditures and concern for those organizations that need to run them (Telephone automation, customer misery—Sarasota Herald-Tribune, Jun. 20, 1999.) The lack of a cost-effective Internet-based system to efficiently schedule customer service phone sessions, limits customer satisfaction, creates a multitude of economic and logistic problems for many institutions, and is becoming a major impediment to improving the relationship between such institutions and their customers.

SUMMARY OF THE INVENTION

The present invention addresses the aforementioned problems by providing an Internet-based Customer Service Management System that improves the quality and efficiency of customer service while significantly reducing operational costs.

An Interactive Voice Response (IVR) system offers the user the option to access customer service through the Internet in addition to a regular phone. It guides the user to a web site that displays, on the user's browser, web pages that can collect from the user relevant information to help identify, with reasonable specificity, the issues the user has in mind which require assistance by a customer service agent. Then a web page displays the time periods for which a qualified agent will be available to address the user's inquiry. The user is next prompted to select from these time periods a convenient time for a voice session with a qualified agent. Finally the user is given the choice of receiving or initiating a phone call at the selected time. In response to the selections made by the user, the Customer Service Management System schedules a qualified agent to be available at the selected time to initiate or receive the service call.

One aspect of the invention, relates to a Selection-Oriented Knowledge Base which seamlessly integrates the power of expert systems with the interpretive capabilities of human beings to provide an effective high performance knowledge base to address inquiries submitted by people.

Another aspect of the invention, relates to a Selection-On-Vertex (SOV) network, which includes Selection Vertices and Resolution Vertices associated with Classes of Inquiries, and provides the infrastructure to support the operation of the Selection-Oriented Knowledge Base.

Another aspect of the invention, relates to the use of a prominently placed "NEED HELP" button in the web pages of the Selection-Oriented Knowledge Base, which enables users to gain quick access to a customer service agent should the user experience any type of difficulty.

Another aspect of the invention, relates to a process for continuously improving the Selection-Oriented Knowledge Base by recording the frequency of "NEED HELP" requests submitted per vertex. The Selection Vertices that produce the most requests are analyzed to identify the potential deficiencies that triggered the requests. The analysis includes information that voice service agents are instructed to collect describing the reasons why the user encountered difficulties. The respective Classes of Inquiries are then improved off-line to address the deficiencies. The Resolution Vertices that produce the most "NEED HELP" requests are also analyzed to either improve the response to the user's inquiry or spawn new vertices associated with new Classes of Inquiries that may be necessary to address such inquiries. The creation of new Classes of Inquiries may involve tests the user is asked to perform to further narrow and identify the source that triggered the inquiry.

Another aspect of the invention, relates to a process, based upon historical records, for predicting the frequency of "NEED HELP" requests received per vertex. For every access to the Selection-Oriented Knowledge Base, this process records the path of all the vertices visited by the user, the time spent in each vertex, and if a "NEED HELP" request is generated. Off-line statistical analysis of this data identifies the frequency of requests per vertex, the types of paths that result in a "NEED HELP" request, and the distribution of time-spans from the time the user accesses the Selection-Oriented Knowledge Base to the time the "NEED HELP" request is generated. The information obtained by this analysis is used by the aforementioned process to allocate voice service agents to priority queues to ensure that the response time to "NEED HELP" requests is below a threshold that keeps users satisfied.

Another aspect of the invention, relates to the use of multiple priority queues whereby the number of agents assigned to each queue is adjusted dynamically to ensure that the response time for each queue does not exceed a critical configurable limit associated with that queue, called the Maximum Acceptable Response Time (MART). The MART is typically set to a very short time, such as 15 seconds, for the highest priority queue, and to a long time, such as 30 minutes, for the lowest priority queue.

Another aspect of the invention is a web-based method that enables certain participating customer service agents, called Agents-On-Demand, to sign up at their convenience, for specific time-segments that need to be covered. These time-segments are determined by a customer service scheduler that takes into consideration the predicted volume of user's requests. The method includes a pay premium algorithm that computes the pay premium necessary to ensure sufficient participation by Agents-On-Demand. For the users that are searching the Selection-Oriented Knowledge Base, the predicted volume of "NEED HELP" requests is estimated by a Help Requests Predictor.

Another aspect of the invention relates to a process for encouraging the users to search the Selection-Oriented Knowledge Base before attempting to schedule a voice session with an agent. If the user encounters some difficulty while searching the Selection-Oriented Knowledge Base, then the user is given priority voice access to a customer service agent just by clicking the "NEED HELP" button. The process rewards the user in accordance with an algorithm whereby the priority for access to an agent increases with the amount of effort made by the user to search for answers.

Another aspect of the invention relates to Distributed Customer Service Centers whereby the agents can operate from any location, including their own home. Such Distributed Customer Service Centers can resort to several neglected sectors of the educated labor force, such as housewives and retires, that may enjoy working from home, to staff Agents-On-Demand positions. The Agents-On-Demand sign up for time segments during which they standby, ready to respond to inquiries when needed.

Another aspect of the invention relates to Collaborative Customer Support Centers. In accordance with this aspect, groups of service agents can be cross-trained, organized, and coordinated to provide customer service and technical support for multiple brands of products of the same type.

Another aspect of the invention, relates to a co-browsing method that allows agents and users to see the same web page during a voice service session. In accordance with this method the voice service agent enters, in a dedicated field, a link to a web page the agent wants the user to see and then tells the user to click on a "SHOW ME" button to display that page on the user's browser. Such web page is then used to facilitate the verbal communication between the agent and the user.

Another aspect of the invention relates to a web based Directory-of-Subscribers where the user can browse institutions that subscribe to the Customer Service Management System and select the institution of interest. In response to the selection by the user, the Customer Service Management System displays the customer service web page related to that institution.

Further aspects of this invention will become apparent in the Detailed Description and by reference to the attached drawings. The Detailed Description contains the following Sections:

I. Overview and System Components
II. Customer Service Manager
III. Customer Service Scheduler
IV. Scheduling a Customer Service Phone Call
V. Online Scheduling of Customer Service
VI. Selection-Oriented Knowledge Base
VII. Navigational Archive
VIII. User Activity Analyzer
IX. Help Requests Predictor
X. Service Agents Scheduler
XI. Voice Services Archives
XII. Distributed Customer Service Centers
XIII. Collaborative Customer Support Centers
XIV. User-Agent Co-browsing
XV. Directory of Subscriber Institutions
XVI. Conclusion

BRIEF DESCRIPTION OF THE DRAWINGS

FIGS. 7A-B illustrate an example of a user registration web page in one embodiment of the web site associated with the Customer Service Management System.

FIGS. 8A-D depict an example of a web page to identify the subject of the user's inquiry in one embodiment of the web site associated with the Customer Service Management System.

FIG. 9 depicts an example of a web page for the user to provide product references related the inquiry in one embodiment of the web site associated with the Customer Service Management System.

FIG. 10 depicts an example of a web page to identify the general nature of the problem in one embodiment of the web site associated with the Customer Service Management System.

FIGS. 11A-D depict an example of a web page that prompts the user to answer questions that isolate the problem in one embodiment of the web site associated with the Customer Service Management System.

FIG. 12 depicts an example of a web page that prompts the user to select between scheduling a voice session or continuing to navigate the knowledge base in one embodiment of the web site associated with the Customer Service Management System.

FIGS. 13A-B depict an example of a web page where the user can select from a choice of four alternatives for scheduling a phone session with an agent in one embodiment of the web site associated with the Customer Service Management System.

FIGS. 14A-D depict an example of the first selection in FIG. 13B.

FIGS. 15A-D depict an example of the second selection in FIG. 13B.

FIGS. 16A-D depict an example of the third selection in FIG. 13B.

FIG. 24 shows a table that maps priority level to the Maximum Acceptable Response Time (MART) of service queues.

FIG. 27 depicts a table illustrating how activities requiring customer service agents are allocated to priority queues.

FIG. 29 depicts a sign up web page for Agents-On-Demand.

DETAILED DESCRIPTION OF THE INVENTION

In the following description, reference is made to the accompanying drawings, which form a part hereof, and which show, by way of illustration, specific embodiments or processes in which the invention may be practiced. Where possible, the same reference numbers are used throughout the drawings to refer to the same or like components. In some instances, numerous specific details are set forth in order to provide a thorough understanding of the present invention. The present invention, however, may be practiced without the specific details or with certain alternative equivalent devices and methods to those described herein. In other instances, well-known methods and devices have not been described in detail so as not to unnecessarily obscure aspects of the present invention.

I. Overview and System Components

Figure 1:
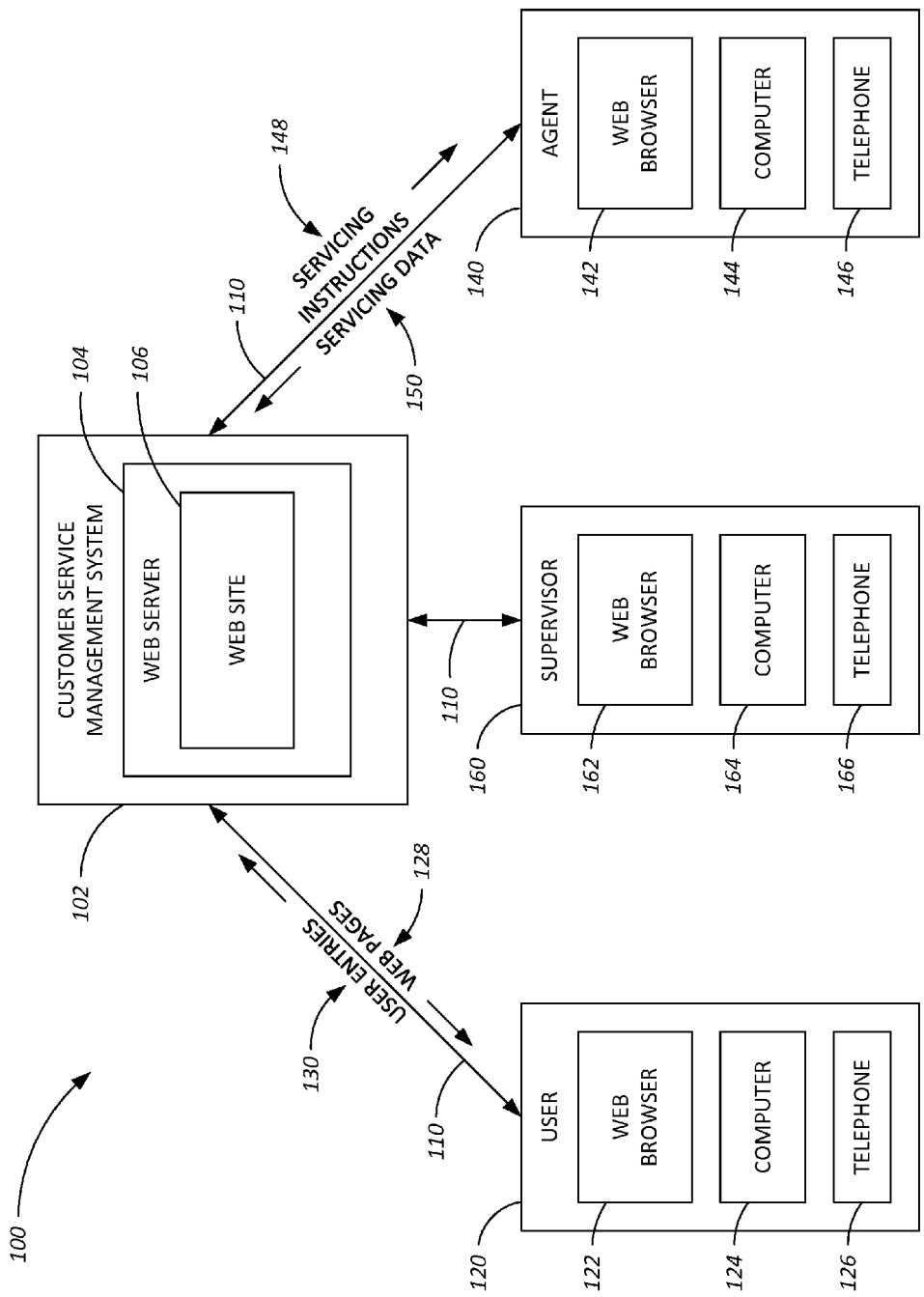
FIG. 1 illustrates one embodiment of the present invention including the Customer Service Management System and various components associated with users, customer service agents, and supervisors.

FIG. 1 illustrates one embodiment 100 of the present invention. The Customer Service Management System 102 includes a web server 104. The web server 104 hosts a web site 106 through which a user 120 can schedule a voice session with a customer service agent 140 and may also access a Selection-Oriented Knowledge Base described with reference to FIG. 2. The Customer Service Management System 102 is preferably operated by each organization (not illustrated) that provides customer service in accordance with this invention. Alternatively the Customer Service Management System 102 may be operated by an independent subcontracting service that operates a Customer Service Management System in accordance with this invention.

The user 120 accesses the web site 106 through a web browser 122 running on a user computer 124 capable of accessing and displaying web pages. The user computer 124 may be, for example, a personal computer, a palmtop device configured with a web browser, or a wireless device that may access web pages using wireless applications protocol (WAP). The user computer 124 is preferably connected to the host system 102 through a computer network 110, such as the Internet. The computer network 110 can include a combination of networks, such as a wireless network combined with the Internet. The user 120 has also access to a telephone 126 for voice communication with a customer service agent 140. If the user 120 has access the Internet 110 while using the telephone 126, the user computer 124 can display, concurrently with the voice connection, pertinent materials to improve and facilitate the communication with the customer service agent 140.

The agent 140 accesses the web site 106 through a web browser 142 running on an agent computer 144 capable of accessing and displaying web pages. The agent computer 144 is preferably connected to the Customer Service Management System 102 through a computer network 110, such as the Internet. The agent 140 has also access to a telephone 146 that can be used for voice communication with the user 120.

A supervisor 160, who preferably supervises a group of agents 140, accesses the web site 106 through a web browser 162 running on a supervisor computer 164 capable of accessing and displaying web pages. The supervisor computer 164 is preferably connected to the host system 102 through a computer network 110, such as the Internet. The supervisor 160 has also access to a telephone 166 for voice communication. Phone conferencing and call transfer are preferably available to enable the supervisor 160 to participate in or take over a voice service session.

The Customer Service Management System 102 provides web pages 128 of the web site 106 to the user 120 through the computer network 110, the user computer 124, and the web browser 122. The user 120 provides user entries 130 to the Customer Service Management System 102 through the web browser 122, the user computer 124, and the computer network 110. The user entries 130 preferably identify user selections and answers to questions presented to the user 120 by the web pages 128.

The Customer Service Management System 102 also creates servicing instructions 148 which are assigned by a scheduling system to an agent 140. These instructions are based upon the user entries 130 previously provided by the user 120 to the Customer Service Management System 102 via the web pages 128. The servicing data 150 generated by the agent 140 during the voice service session with the user 120 includes all the relevant information that caused the user 120 to seek assistance from a customer service agent 140 and a brief report on how the inquiry submitted by the user 120 was addressed and resolved.

Figure 2:
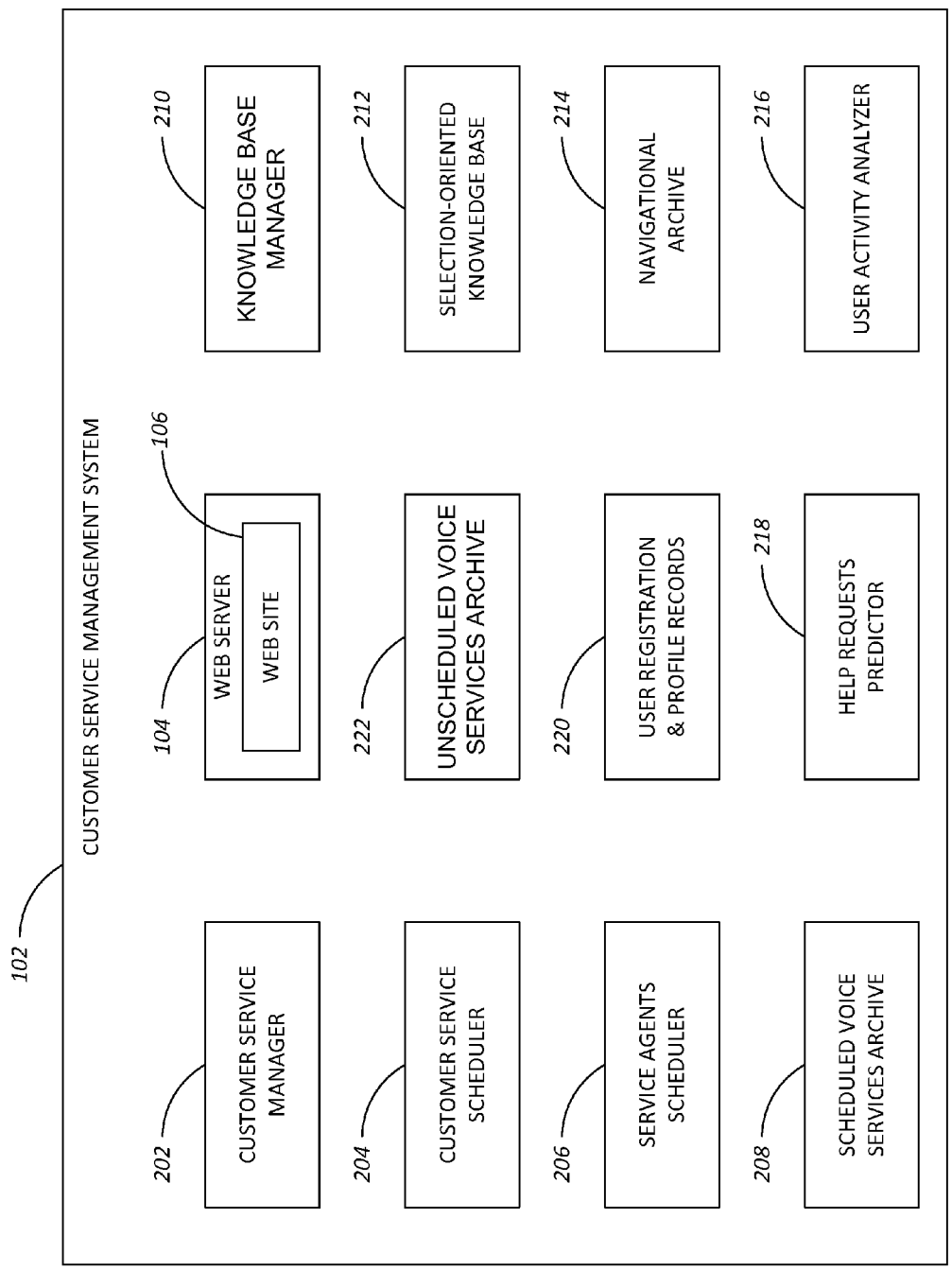
FIG. 2 shows a block diagram of a preferred embodiment of the Customer Service Management System.

FIG. 2 shows a block diagram of a preferred embodiment of the Customer Service Management System 102. In addition to the web server 104 and the web site 106 previously shown in FIG. 1, it shows the following modules:

(1) Customer Service Manager 202.
(2) Customer Service Scheduler 204.
(3) Service Agents Scheduler 206.
(4) Scheduled Voice Services Archive 208.
(5) Knowledge Base Manager 210.
(6) Selection-Oriented Knowledge Base 212.
(7) Navigational Archive 214.
(8) User Activity Analyzer 216.
(9) Help Requests Predictor 218
(10) User Registration & Profile Records 220.
(11) Unscheduled Voice Services Archive 222.

The Customer Service Manager 202 is a module that operates as a command and control center to manage and coordinate all the functions performed by the Customer Service Management System. This module supervises the activities of the following modules: Customer Service Scheduler 204, Service Agents Scheduler 206, Scheduled Voice Services Archive 208, Knowledge Base Manager 210, User Registration & Profile Records 220, and Unscheduled Voice Services Archive 222.

The Customer Service Scheduler 204 is a module that operates and maintains the schedules for all customer service voice sessions, including those initiated by "NEED HELP" requests submitted by users searching the Selection-Oriented Knowledge Base 212.

The Service Agents Scheduler 206 is a module that operates and maintains the schedules for all service agents.

The Scheduled Voice Services Archive 208 is a module that maintains records of all voice service sessions scheduled through an appointment or a "NEED HELP" request. In contrast, the Unscheduled Voice Services Archive 222 is a module that maintains records of all voice service sessions that are not associated with an appointment or a "NEED HELP" request and relate to customers that elect to wait on hold for a customer service agent. Because the data in the Scheduled Voice Services Archive 208 is used for the improvement of the performance of the Customer Service Management System 102 it needs to be separated from the voice sessions with customers that elect to wait on hold.

The Knowledge Base Manager 210 is a module that supervises and coordinates the operation of the four modules: Selection-Oriented Knowledge Base 212, Navigational Archive 214, User Activity Analyzer 216, and Help Requests Predictor 218.

The Selection-Oriented Knowledge Base 212 is a module that includes a knowledge base to address inquiries. This knowledge base is preferably supported by a Rooted-Selection-On-Vertex (RSVO) network comprising selection vertices and resolution vertices, described later in this specification. The RSOV network serves as a repository of knowledge organized by classes of inquiries which represent areas of expertise associated with vertices. After a user accesses the customer service web site 106 and clicks on the Site Entrance button 604 of FIG. 6, the Customer Service Management System 102, automatically connects the user to the Selection-Oriented Knowledge Base 212. Thereafter, every action the user takes is guided by the Selection-Oriented Knowledge Base.

The Navigational Archive 214 is a module that includes a database of all user activities within the Selection-Oriented Knowledge Base 212.

The User Activity Analyzer 216 is a module that includes an expert system program to analyze the activities of the users that visit the Selection-Oriented Knowledge Base 212, comprising Navigational Paths, path schedules, and use of "NEED HELP" requests.

The Help Requests Predictor 218 is a module that uses the analysis generated by the User Activity Analyzer 216 to predict, in real-time, the probability that a user will generate a "NEED HELP" request at a given vertex and at given time as the user navigates through the Selection-Oriented Knowledge Base 212. This probability is used by the Knowledge Base Manager 210, to anticipate the demand for qualified agents at each vertex and to generate a look-ahead demand matrix of needed agents versus vertices. This matrix can be updated frequently and then transmitted to the Service Agents Scheduler 206 which can alert Agents-On-Demand to be ready to promptly reply to anticipated "NEED HELP" requests.

The User Registration & Profile Records 220 is a module that includes a database of registration records of those users that register to obtain access to the Customer Service Management System 102 via the Internet. In addition to user identification information the registration records comprise any call-back phone numbers the user may want to provide for customer service sessions.

The Unscheduled Voice Services Archive 222 is a module that includes a database of the customer service sessions requested by those users that do not wish to use the scheduling system and decide to wait on hold until a customer service agent is available.

II. Customer Service Manager

The Customer Service Manager 202 is the main module of the Customer Service Management System 102. It coordinates the operation of all the other modules, including the web server 104. The operation of the Customer Service Manager 202 is described with reference to processes 300, 400, and 500, by which an organization can offer customer service to the users of its products or services. Process 300, depicted in FIG. 3, is described in this section, process 400, depicted in FIG. 4, is described in Section III, and process 500, depicted in FIG. 5, is described in Section IV.

Figure 3:
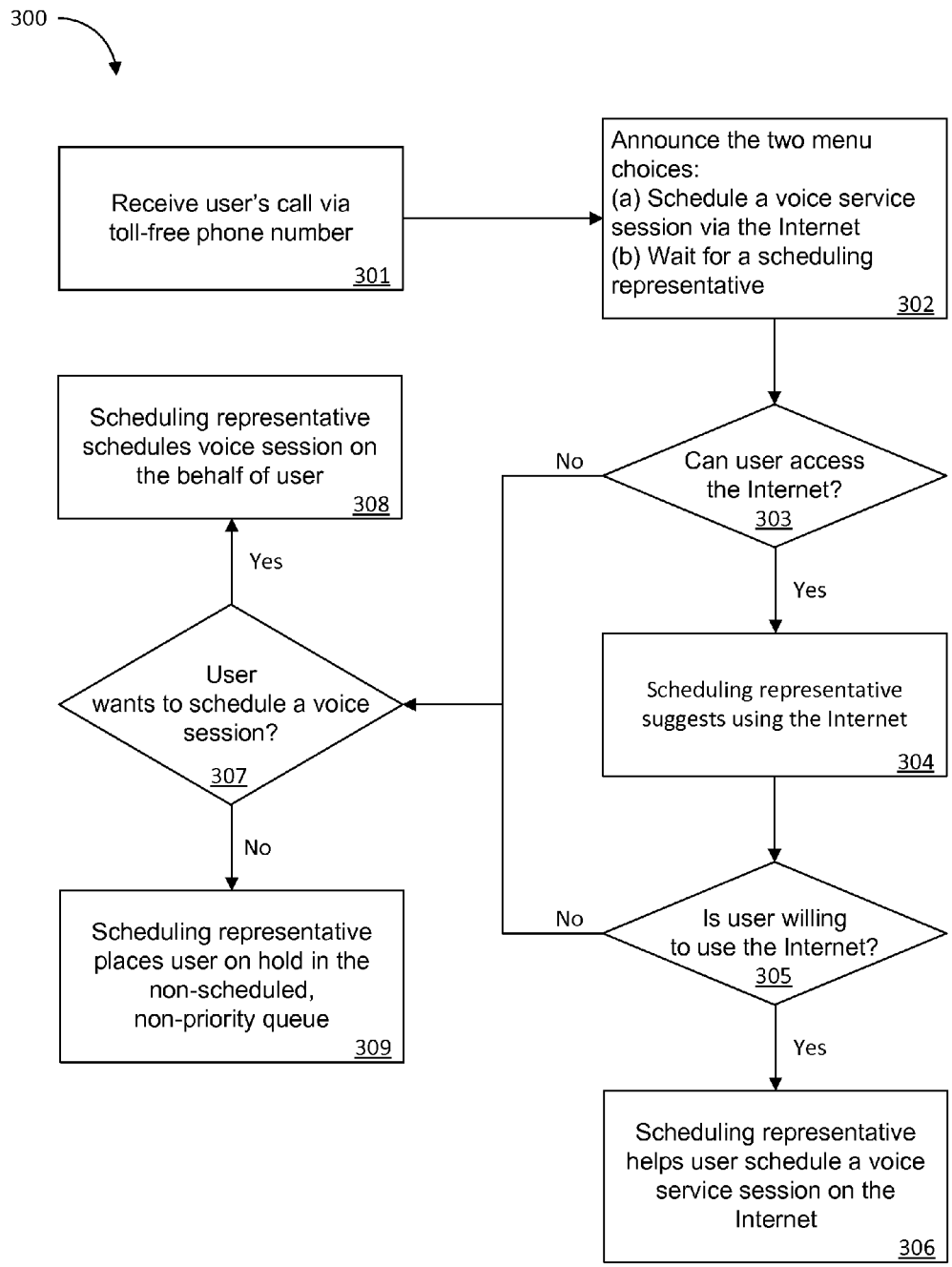
FIG. 3 illustrates a preferred process for managing customer service inquiries.
Figure 4:
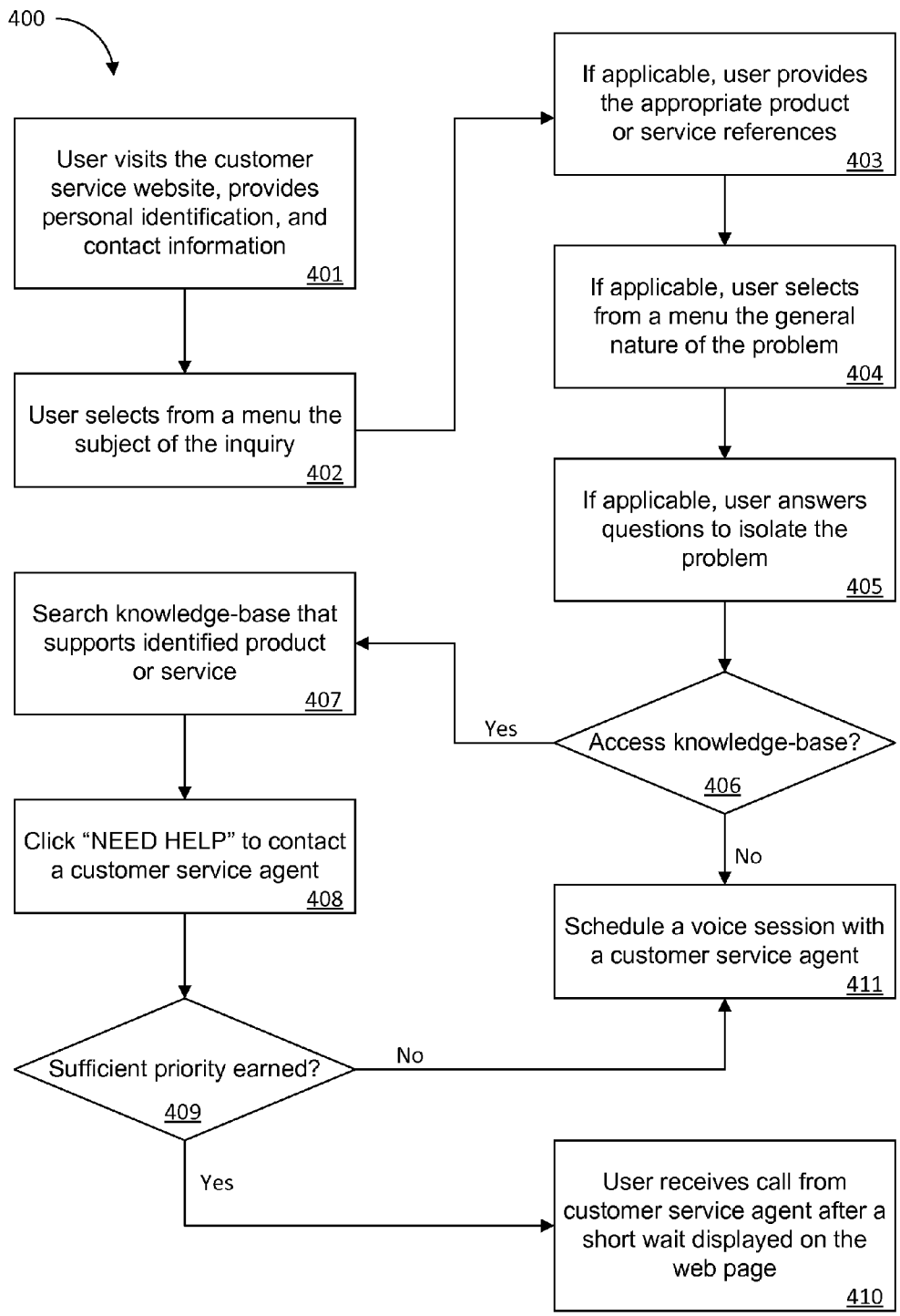
FIG. 4 illustrates a preferred process for scheduling a phone session with a qualified customer service agent.

FIG. 3 illustrates a preferred process 300 for managing customer service inquiries. At a step 301, a call addressed to a toll-free customer service phone number is received by an Interactive Voice Response (IVR) system.

At step 302 the IVR system preferably announces two choices. The first choice advises that if the caller has access to the Internet, a faster phone connection to a customer service agent can be obtained through a web site which is announced by the IVR. The second choice advises the user that a scheduling representative will be available momentarily to schedule a voice session with a qualified customer service agent.

At step 303, the scheduling representative also asks if the user has access to the Internet. An important part of this step is to educate and encourage the user to use the Internet option to the extent possible and overcome the bad personal experiences some users may have had with poorly designed Internet based systems. Preferably, the scheduling representative explains the benefits of the Internet option in terms of efficiency, flexibility, speed, and customer satisfaction. If step 303 is affirmative, at step 304 the scheduling representative suggests using the Internet.

At step 305, the scheduling representative establishes if the user is willing to use the Internet to personally schedule a voice session with a qualified customer service agent. If step 305 is affirmative, at step 306 the scheduling representative provides the user any assistance that may be necessary to help the user schedule a voice session via the Internet. Preferably the scheduling representative takes advantage of the opportunity to properly train the user so that at the next occurrence the user will not need any assistance to schedule a customer service session on the Internet. If step 305 is not affirmative, the process continues at step 307. Likewise, if step 303 is not affirmative, the process also continues at step 307.

At step 307, the scheduling representative asks if the user whishes to schedule a voice session with a qualified customer service agent and preferably emphasizes the advantages of scheduling versus waiting online. If step 307 is affirmative, at step 308 the scheduling representative schedules, on the behalf of the user, a voice session with a qualified customer service agent in accordance with the user's instructions. If step 303 is not affirmative, at step 309 the scheduling representative places the user's call on a queue that services unscheduled inquiries, described later in Section X, to be answered by the first available agent.

The long term goal of this process is to encourage users who have access to the Internet to directly schedule their own customer service voice sessions via the Internet without assistance from a scheduling representative. While the user is on the phone, preferably the scheduling representative also explains many of the other features of the Customer Service Management System 102 described in this invention, including the Selection-Oriented Knowledge Base. Over time, as more and more users realize the advantages and benefits of this system, the reliance on customer service agents should significantly decrease.

III. Customer Service Scheduler

FIG. 4 illustrates a preferred process 400 for scheduling a phone session with a qualified customer service agent. At a step 401, the user visits the customer service web site. For the purposes of this description it is assumed that the web site has provisions for the user to provide unique identification and contact information. Identification and contact information are necessary for the execution of certain steps associated with this process and other processes described later in Section IV. One embodiment of web pages for the user to provide such information is described in Section V with reference to the example illustrated in FIGS. 6, 7A, and 7B.

At a step 402, the user preferably selects from a menu the main subject of the inquiry. At a step 403, the user provides any applicable product or service references. If the inquiry relates to a product such references can be model, serial number, date of purchase or any other information necessary to fully identify the product. If the inquiry relates to a service such references can be user identification, account number or any other information necessary to uniquely identify, for the purposes of the customer service scheduling system, the recipient of the service.

At a step 404, if the inquiry relates to a problem, the user preferably selects from an expandable selection menu the general nature of the problem.

At a step 405, if the inquiry relates to a problem, the user is preferably prompted to answer any applicable questions that may further isolate the problem.

At a step 406, the user is preferably offered the opportunity to decide whether or not to access the Selection-Oriented Knowledge Base before attempting to schedule a phone session with a customer service agent.

If step 406 is affirmative, at step 407 the user accesses and searches the Selection-Oriented Knowledge Base 212 for the identified product or service. At any time during the search the user can continue with step 408 by clicking a "NEED HELP" button to contact a customer service agent. The "NEED HELP" button is preferably prominently displayed on each web page associated with the Selection-Oriented Knowledge Base 212. The "NEED HELP" button increases the level of the user's confidence in the system. It offers the user the comfort that computer intelligence is always supplemented by human intelligence, whenever needed, to efficiently resolve the user's inquiry.

At a step 409, the user's activity while searching the Selection-Oriented Knowledge Base 212, is analyzed by a User Activity Analyzer 216 to determine if the user has earned sufficient priority to receive a priority call from a customer service agent. The User Activity Analyzer 216 is an expert system program which is described later in Section VIII.

If step 409 is affirmative, at step 410 the user receives a call from a customer service agent after a short wait, the duration of which is preferably displayed on the web page.

If step 409 is not affirmative, at step 411 the user can schedule a voice session with a customer service agent in accordance with the process described in Section IV below.

If step 406 above is not affirmative, the process also continues with step 411.

The priority system associated with step 409 rewords users for their efforts in trying to resolve their inquiries without assistance from a customer service agent. If the user makes a considerable effort, the "NEED HELP" request is placed on a very high priority queue to be serviced within a very short time in the order of seconds. On the other end, if the user clicks the "NEED HELP" button immediately after accessing the Selection-Oriented Knowledge Base the priority earned is considered insufficient to place the request on even a low priority queue. In this case the user is linked to the scheduler in accordance with step 411. Preferably the priority system associated with step 409 uses a configurable algorithm described later in Section VIII.

IV. Scheduling a Customer Service Phone Call

FIGS. 5A-D illustrate a preferred process 500 that enables the user to schedule a phone session with a qualified customer service agent. At a step 501, a web page displays a default duration for the phone session the user is requesting. This default duration is predicted by statistical analysis of historical records of voice customer service sessions associated with similar inquiries. These records which are preferably stored in the Scheduled Voice Services Archive module 208 are described in Section XI below. The expected duration of the phone session is an important parameter used by the Customer Service Scheduler 204 to efficiently allocate available resources to service voice session requests submitted by users.

At a step 502, the user is prompted to either accept the default duration or select a different duration. A different duration can be selected from a pull-down menu or entered directly by the user in a duration field.

At a step 503, the web page preferably displays a time-map of available slots for the selected duration. This time-map can show the ranges of time for which agents are available as well as the ranges of time for which all the agents are already booked. This display provides the user a global view of agent availability from which the user can make the most convenient selection.

At a step 504, the web page preferably displays a selection of alternative methods for the user to schedule a voice session with a customer service agent. These alternative methods preferably comprise the following:

(a) Select a specific time-slot corresponding to the projected session duration, based upon agent availability, as shown on the time-map.

(b) Select a FROM-TO segment-of-time during which the user clicks on an "I AM READY" button to trigger the voice session process.

(c) Select a FROM-TO segment-of-time during which the user is willing to accept a call-back to address the inquiry.

(d) Fast-Track option for quick questions.

Alternative (a) matches the availability of the user with the availability of qualified agents. The user can select a convenient time-slot; the user does not have to wait on the phone; and the user's phone line is not tied up. The agents can operate at maximum efficiency because scheduling tends to reduce idle time to insignificant levels.

Alternative (b) applies to the case where the user cannot determine in advance an exact time-slot for the voice service session but there is a FROM-TO time range within which the user will be able to recognize an opportune time to have the voice session. Later, when it is convenient within this time range, the user clicks on a button labeled "I AM READY" on the web page. The user's request is then placed on a high priority queue to be serviced within a very short time. Because these service sessions are expected, the Service Agents Scheduler 206 can adjust the average number of agents needed to maintain the length of the wait below a given limit. However, to simplify the scheduling algorithm and to prevent abuse, the FROM-TO time range can be limited to a specified value which can be configurable. For the benefit of the user the web page can display the expected length of the short wait before voice contact with an agent.

Alternative (c) applies to the case where the user cannot determine in advance an exact time-slot for the voice service session but there is a FROM-TO time range within which it is convenient for the user to receive a call-back from a customer service agent. For example, the user plans to be home between 3:00 PM and 4:30 PM. This alternative is similar to alternative (b) but gives the Customer Service Scheduler 204 more flexibility to set an agent call-back for a time that improves the productivity of the Customer Service Scheduler 204 while complying with the user's need.

Alternative (d) applies to the case where the user has a question that an agent can quickly resolve. The definition of quick is determined by a configurable parameter that sets an automatic limit to the duration of the session, such as 3 minutes for example. The web page displays a warning informing the user that the phone session is subject to automatic termination after the preset time. A recorded message, providing a configurable grace period to give the parties the opportunity to end the session orderly, can be inserted into the conversation at the expiration of the preset time limit. An additional feature may allow the Customer Service Scheduler 204 to extend the time limit if there are no conflicting inquiries that must be serviced. This feature can display any anticipated time of conflict on the agent's browser and leave to the agent's discretion when to end the session prior to the time of conflict.

Figure 5A:
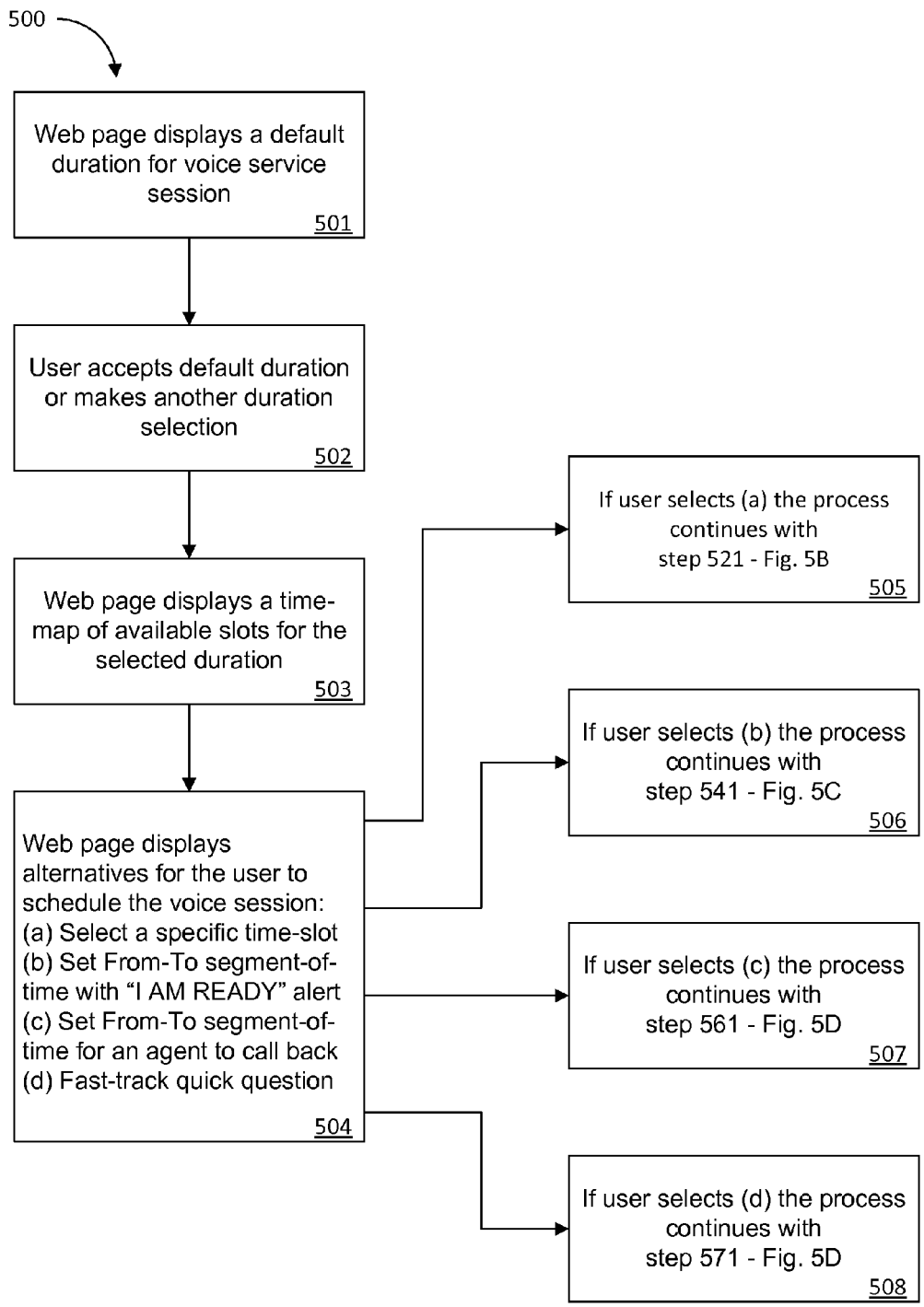
FIGS. 5A-D illustrate a preferred process that enables the user to schedule a phone session with a qualified customer service agent.
Figure 5B:
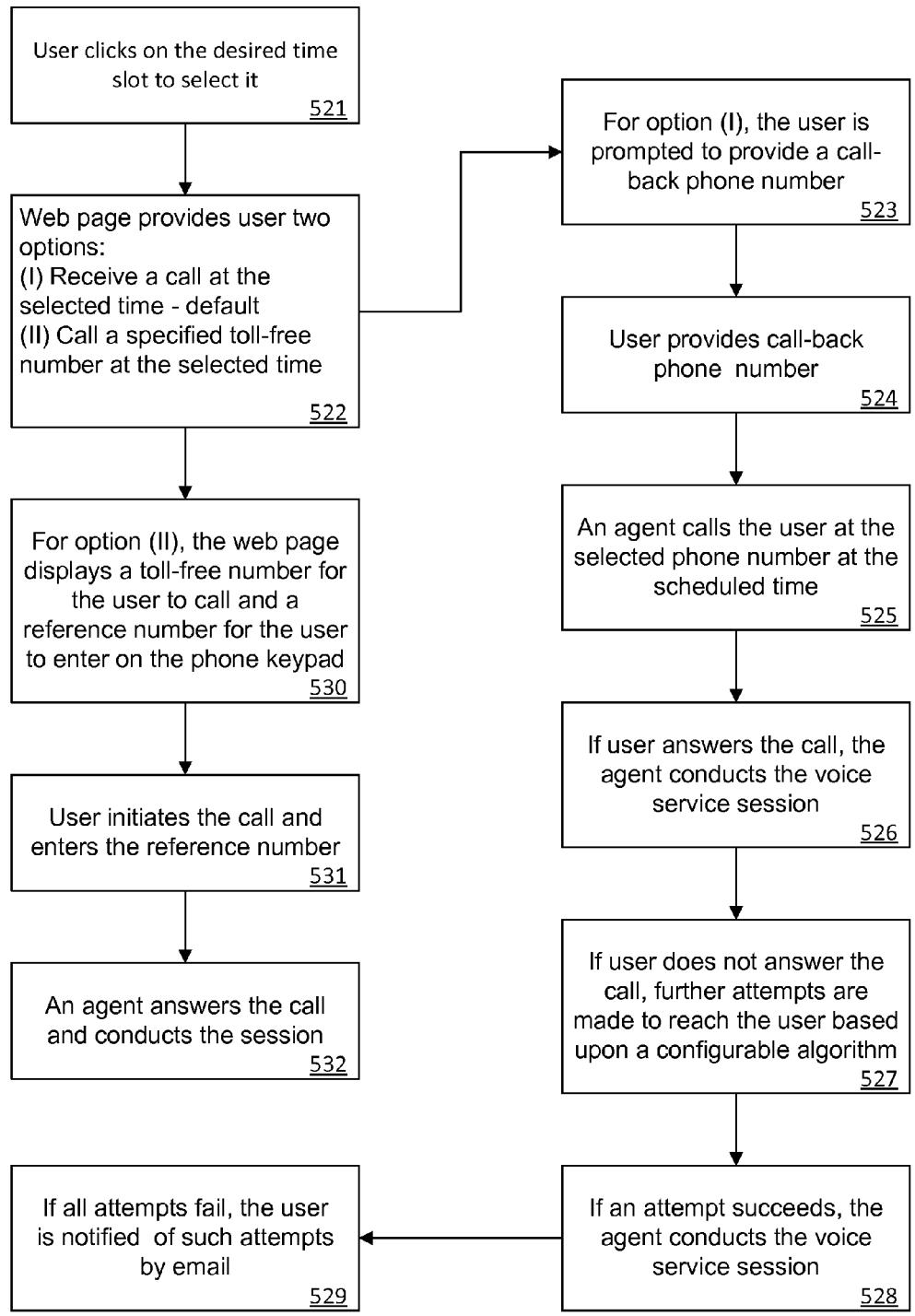

At a step 505, if the consumer selects alternative (a) the process continues with step 521 in FIG. 5B.

Figure 5C:
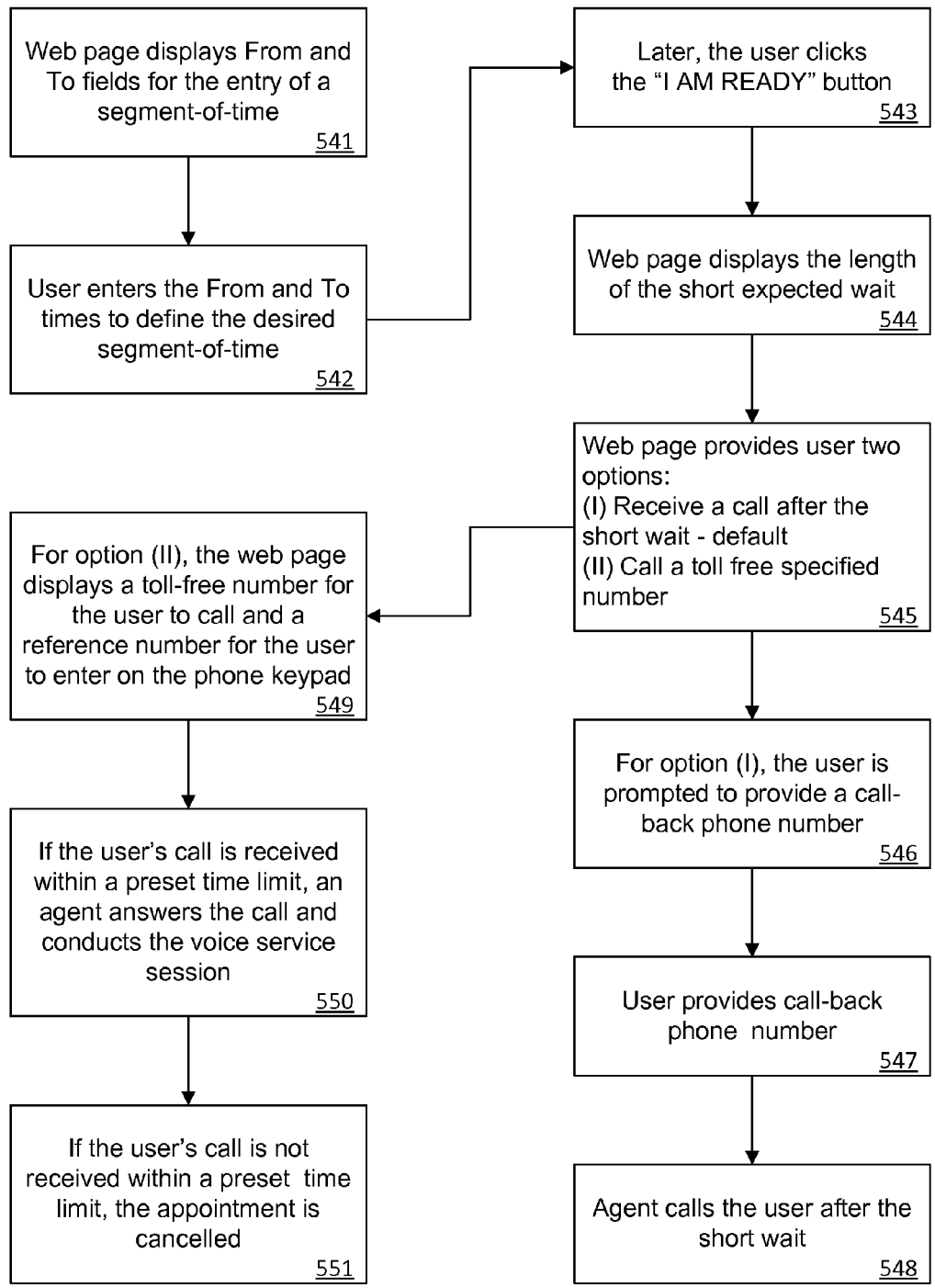

At a step 506, if the consumer selects alternative (b) the process continues with step 541 in FIG. 5C.

Figure 5D:
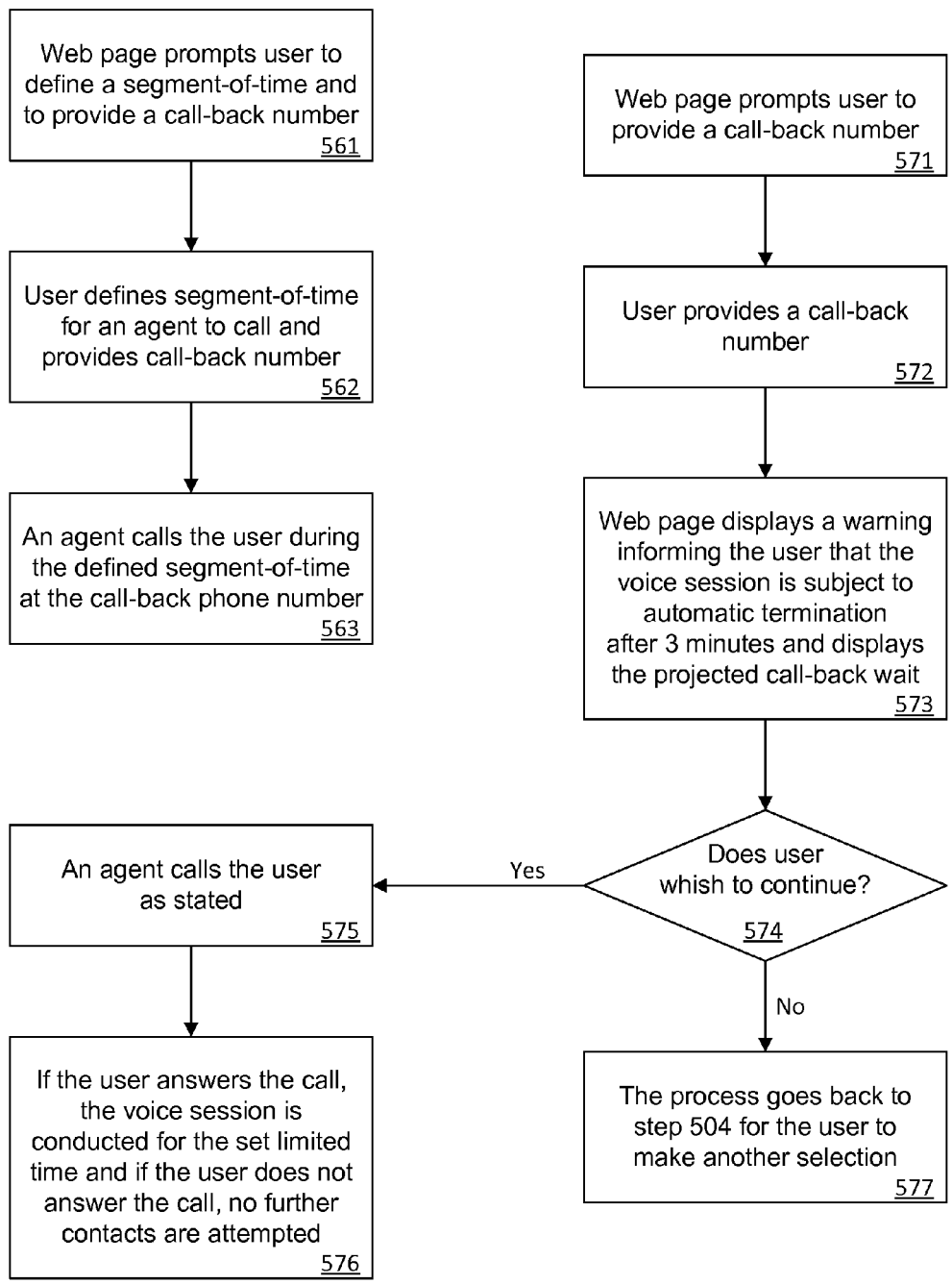

At a step 507, if the consumer selects alternative (c) the process continues with step 561 in FIG. 5D.

At a step 508, if the consumer selects alternative (d) the process continues with step 571 in FIG. 5D.

FIG. 5B illustrates a preferred sub-process associated with alternative (a). At a step 521, the user clicks on the desired time-slot to select it. At a step 522, the web page provides the user two options:

(I) To receive a call at the selected time. This option can be set as the default.

(II) To initiate a call to a specified toll-free number at the selected time.

If the user selects option (I), the process continues with step 523 where the web page prompts the user to provide a call-back phone number.

At step 524, the user provides a call-back phone number. The user can provide the phone number on the web page by selecting from a list of previously supplied contact numbers or by entering the desired number in a designated field.

At a step 525, an agent calls the user at the scheduled time at the number previously provided by the user. At a step 526, if the user answers the call, the agent conducts the voice session to resolve the user's inquiry. At a step 527, if the user does not answer the call, further attempts are made to reach the user based upon a configurable algorithm. For example, call every 2 minutes until the user answers or the originally scheduled time-slot expires. At a step 528, if an attempt succeeds, the agent conducts the voice session subject to any time constraints arising out of the delay in establishing contact. At a step 529, if all attempts fail, the session is cancelled and preferably the user is notified by email of the attempts to establish contact.

If the user selects option (II), the process continues with step 530 where the web page displays a toll-free number for the user to call at the scheduled time and a reference number for the user to enter on the phone keypad. This reference number allows the Customer Service Manager 202 to recognize the user and direct the call to the appropriate agent. At step 531, the user initiates the customer service call to the toll-free phone number and enters the required reference number on the phone keypad. At step 532 an agent answers the scheduled call and conducts the voice session to resolve the user's inquiry.

The sub-process of FIG. 5B does not address the possibility that the user fails to initiate the scheduled call to the toll-free phone number. Such possibility has no practical impact upon the operation of the Customer Service Management System 102 and further there are many conceivable ways of addressing such occurrence. For example, the Customer Service Manager 202 could cancel the scheduled session after a configurable wait and free the allocated agent to address other inquiries.

FIG. 5C illustrates a preferred sub-process associated with alternative (b). At a step 541, the web page displays "FROM" and "TO" fields for the user to specify a segment-of-time. At a step 542, the user enters the "FROM" and "TO" times to specify the desired segment-of-time. Preferably, at this point the Customer Service Manager 202 suspends the user's customer service scheduling session and stores all the information necessary for the user to resume the session at a later time. When it is convenient during the specified segment-of-time, the user can logon again and resume the suspended session. At a step 543, the user clicks the "I AM READY" button. This step communicates to the Customer Service Manager 202 the user's readiness to initiate the customer service voice session. At a step 544, the Customer Service Scheduler 204 preferably displays on the web page the projected length of the short wait before an agent will be available.

At a step 545, the web page provides the user two options:
(I) To receive a call after the short wait. This option can be set as the default.
(II) To initiate a call to a specified toll-free number.

At step 545, if the user selects option (I), the process continues with step 546 where the user is prompted to provide a call-back phone number.

At step 547 the user provides a call-back phone number. This step may be executed through a selection menu that displays alternative phone numbers that may have been previously stored in the User Registration & Profile Records 220 in connection with the user's registration.

At step 548 an agent calls the user after the anticipated short wait and conducts the voice service session. This sub process does not anticipate the possibility that at step 548 the user does not answer the call after clicking on the "I AM READY" button. Such possibility has no practical impact upon the operation of the Customer Service Management System 102 and further there are many conceivable ways of addressing such occurrence. For example, the Customer Service Manager 202 could cancel the session, free the allocated agent to address other inquiries, and notify the user by email that the service call was placed, as requested, but not answered.

At step 545, if the user selects option (II), the process continues with step 549 where the web page displays a toll-free phone number for the user to call and a reference number for the user to enter on the phone keypad when prompted. The reference number is used by the Customer Service Manager 202 to identify the anticipated service session.

At step 550, if the user's call is received within a preset time limit, an agent answers the call and conducts the voice service session.

At step 551, if the user's call is not received within a preset time limit the scheduled session is cancelled.

In alternative embodiments the user can be given the additional flexibility to choose the order of certain steps. For example, the user may be given various choices with respect to when to make the decision between receiving and originating the service call. Such decision could be made before any service sessions are scheduled, as a default; before step 541; after step 542; or at any other point in the process provided the decision is made before the service call takes place. This additional flexibility can be convenient if the user is in a position to select between receiving and originating the service call prior to clicking the "I AM READY" button.

FIG. 5D illustrates two preferred sub-processes. The first is associated with alternative (c) and includes steps 561 through 563. The second is associated with alternative (d) and includes steps 571 through 577.

With reference to alternative (c), at a step 561 the web page displays "FROM" and "TO" fields for the user to enter a segment-of-time during which it is convenient for the user to receive a call-back from a customer service agent. In addition, the web page prompts the user to provide a call-back phone number. To simplify the user's task, the web page can display a selection of numbers the user may have previously entered in the User Registration & Profile Records database. The user can either click on the desired number or enter a new number in a designated field.

At step 562 the user enters in the "FROM" and "TO" fields the desired times that defined the convenient segment-of-time and provides the desired call-back phone number.

At step 563 an agent calls the user during the defined segment-of-time at the call-back phone number provided by the user. This sub process does not anticipate the possibility that at step 563 the user does not answer the call placed by the agent during the segment-of-time defined by the user. Such possibility has no practical impact upon the operation of the Customer Service Management System 102 and further there are many conceivable ways of addressing such occurrence.

For example, the Customer Service Scheduler 204 can make additional attempts to reach the user whenever an opportunity arises as a result of an agent becoming available during the defined segment-of-time. If an attempt succeeds the service session is conducted. If not the service request is cancelled and the user is notified via email of the failed attempts.

With reference to alternative (d), at a step 571 the web page prompts the user to provide a call-back phone number. This step may be executed through a selection menu that displays alternative phone numbers that may have been previously stored in the User Registration & Profile Records 220 in connection with the user's registration. At step 572 the user provides the call-back phone number.

At step 573 the web page displays a warning informing the user that the voice session is subject to automatic termination after a specified duration and displays the projected short wait before the user receives a call-back from a customer service agent. The warning operates as a deterrent against abuse of the Fast-Track option for quick questions. In special circumstances, the length of the short wait may be of importance to the user. The wait is generally kept below a configurable limit, due to the coordinated actions of the Customer Service Scheduler 204 and the Service Agents Scheduler 206.

At step 574, the user is preferably offered the opportunity to decide whether to continue or make another selection. The user may decide that the allocated time for Fast-Track service is too short for the anticipated inquiry or that the displayed wait is not compatible with the urgency of the inquiry.

If step 574 is affirmative, at step 575 an agent calls the user at the call-back phone number provided within the stated short wait. At step 576, if the user answers the call, the voice session is conducted and if the user does not answer the call, preferably the service session is cancelled and no further action is taken.

If step 574 is not affirmative, at step 577 the process goes back to step 504 for the user to make another selection.

V. Online Scheduling of Customer Service

This section illustrates with reference to FIGS. 6-18, a set of example web pages that can be provided by the web site 106 to support the operation of the Customer Service Management System 102.

Figure 6:
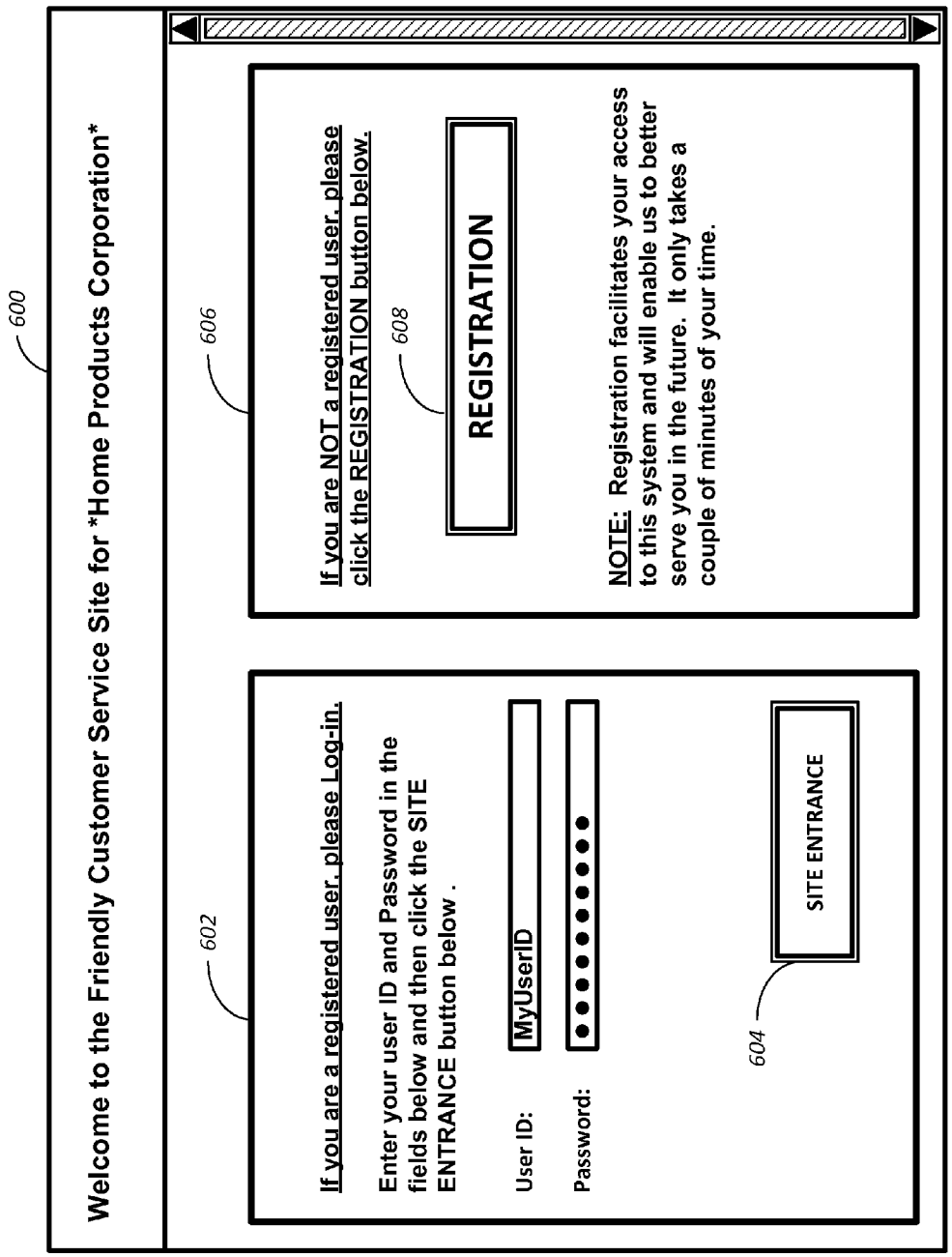
FIG. 6 illustrates an example of a login page in one embodiment of the web site associated with the Customer Service Management System.

FIG. 6 illustrates an example of the login page 600 where a user can execute step 401 of process 400, in one embodiment of the web site 106. This web page shows a Login Window 602, for registered users and a Registration Window 606, for unregistered users. Upon entering the proper identification and authentication information in the Login Window 602, a registered user can access customer service by clicking the 'SITE ENTRANCE" button 604. Unregistered users are directed to the Registration Window 606, where they can access the user registration web page by clicking on the "REGISTRATION" button 608.

Figure 7A:
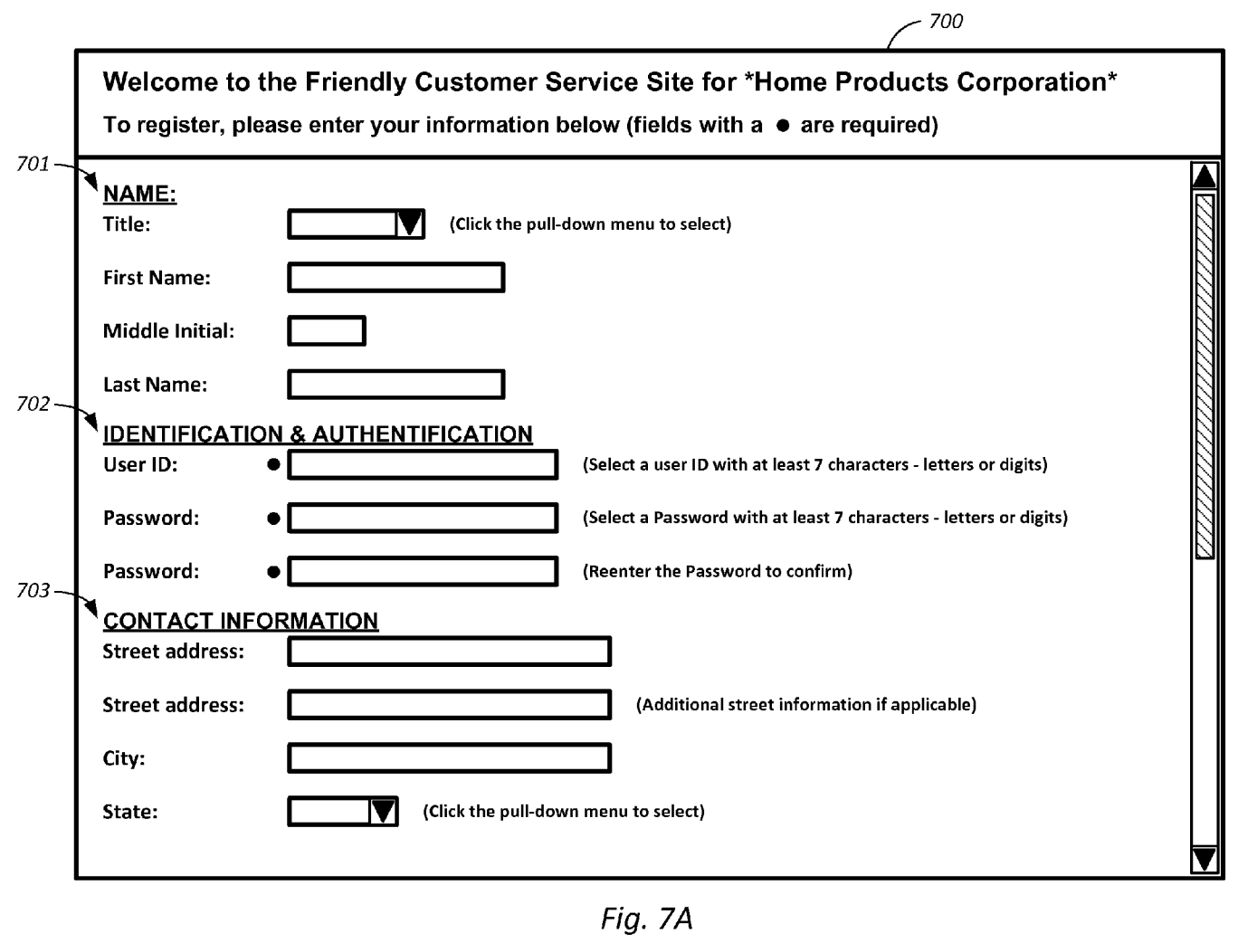

FIGS. 7A-B illustrate an example of a user registration scrolling web page 700 where a user can execute step 401 of process 400, in one embodiment of the web site 106. FIG. 7A shows the upper part of the page and FIG. 7B shows the lower part. This page provides a section for the user's name 701, a section for identification and authentication 702, and a section for contact information 703. The only section that is required is the identification and authentication 702. The user is required to complete these fields before the User Registration & Profile Records module 220 will accept the registration. The Customer Service Management System 102 needs this information to uniquely identify each user. The other sections are not required but help the Customer Service Management System 102 better serve the user when completed. This feature gives users that may be concerned about privacy issues the opportunity to remain anonymous while enjoying most of the benefits provided by the Customer Service Management System 102. An important part of the contact information 703, consists of the call-back phone numbers, which the user can enter in section 704. If the user decides to complete this sub-section, a note 705 asks the user to select one of the phone numbers as the default. Later, when the user schedules a call-back customer service session, the list of the call-back phone numbers, including the pre-selected default, can be displayed on the scheduling web page for the user's selection by a simple click. A "Site Entrance" button 706 provides automatic access to the site upon completion of the registration. An alternate "Register Me" button permits the user to register without entering the site.

FIGS. 8A-D depict an example of a scrolling web page 800 where a user can execute step 402 of process 400, in one embodiment of the web site 106. This web page shows a set of expandable menus such that when the user makes a selection, that selection expands into a sub-menu. The expandable web-based menus, which can be similar in content to the conventional phone menus, used by IVR (Interactive Voice Response) systems, offer significant advantages over their IVR counterparts. First, they are much faster for the user to capture and operate since the human eye and finger are much faster than the voice. Second they can offer the user much richer descriptive and pictorial content with multimedia technology. Third, they can give the user global multilevel menu perspectives that enhance the user's ability to make selections.

Figure 8C:
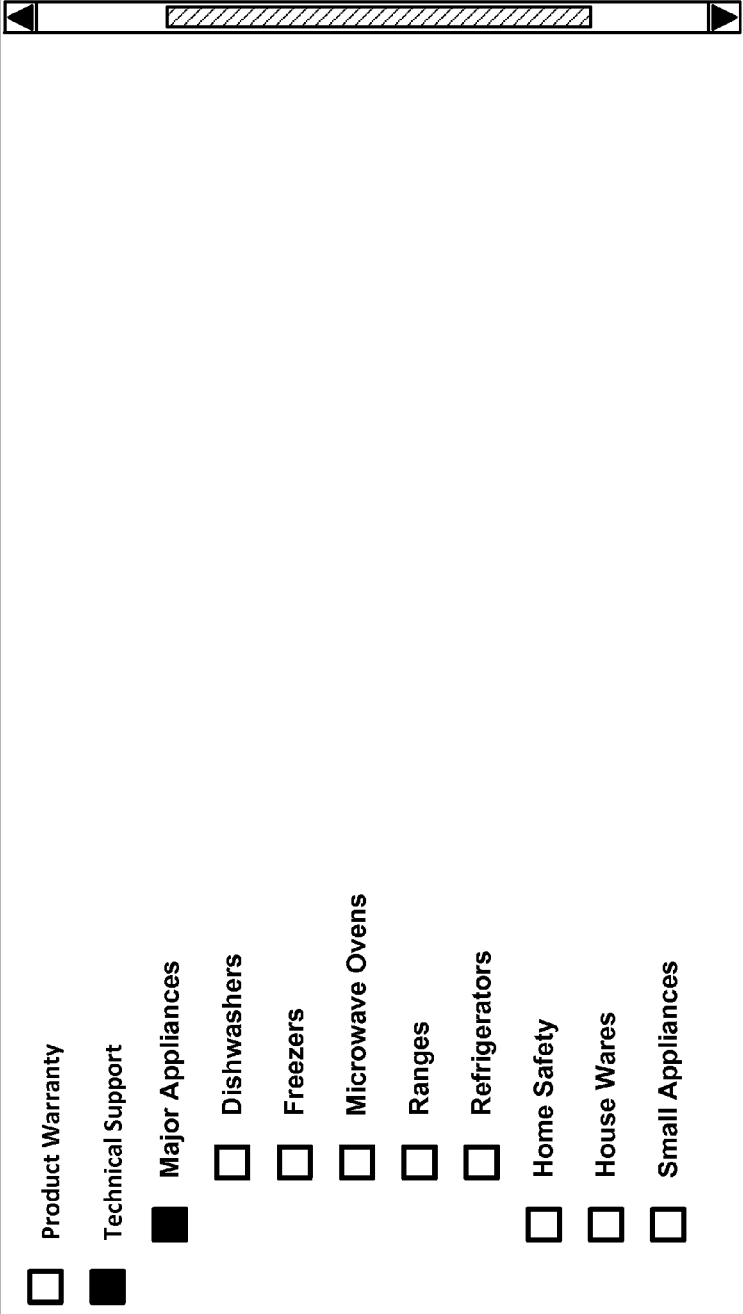

FIG. 8A shows a first level menu. FIG. 8B shows a second level expansion of the menu after the user clicks on "Technical Support." FIG. 8C shows a third level expansion of the menu after the user clicks on "Major Appliances." FIG. 8D shows a third level expansion of the menu after the user clicks on "dishwashers."

FIG. 9 depicts an example of a web page 900 where a user can execute step 403 of process 400, in one embodiment of the web site 106. This page displays a field for the user to enter the model number of the dishwasher 901 and a field for the user to enter the serial number 902. Other information such as date of purchase, service contracts, and warranty period can also be added if appropriate.

FIG. 10 depicts an example of a web page 1000 to identify the general nature of the user's problem in one embodiment of the web site 106. This page displays a single level menu from which the user selected "Water won't pump out of the tub."

Figure 11D:
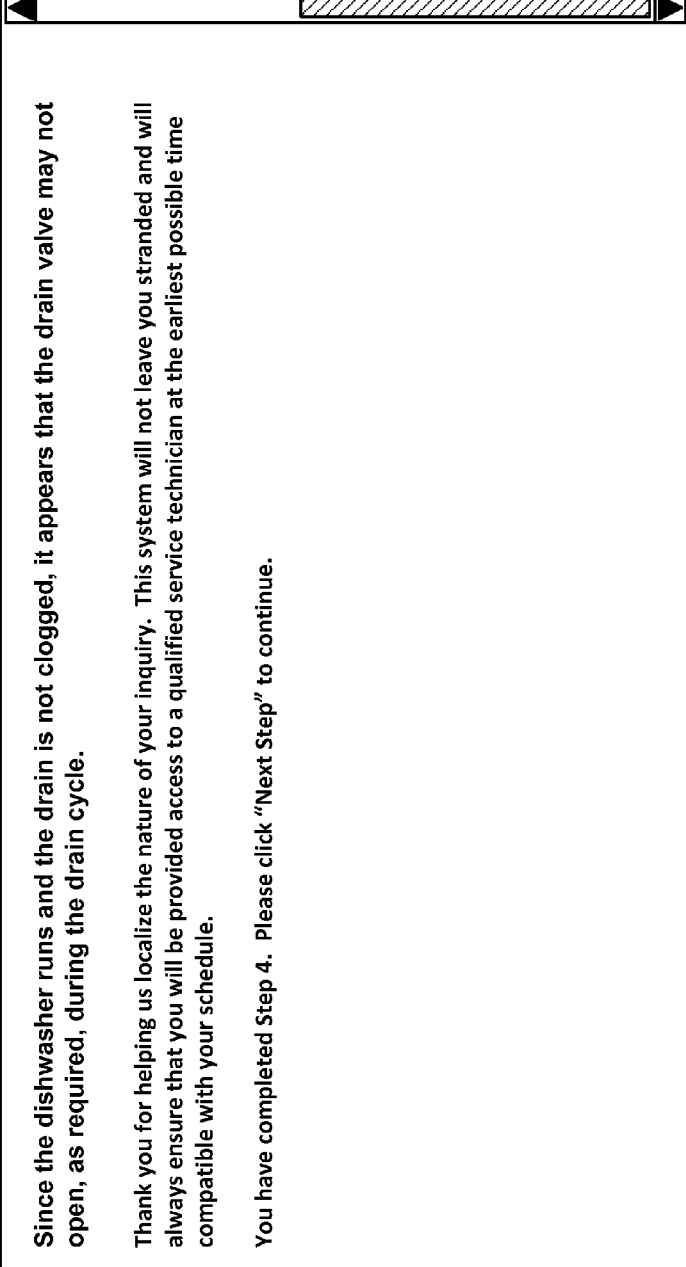

FIGS. 11A-D depict an example of a web page 1100 where step 405 of process 400 is executed. This web page prompts the user to answer multiple choice questions that isolate the problem in one embodiment of the web site 106. FIG. 11A tries to establish where the dishwasher drains. FIG. 11B, after the user selected "Into a kitchen sink air gap," asks if the user has checked the air gap for clogging. In FIG. 11C, the user clicks on "No" upon which the web page 1100 displays instructions on how to inspect and clean the air gap and then asks the user if the air gap was clogged. After the user clicks on the selection "No," the web page 1100 displays the conclusion resulting from the user's answers. FIG. 11D shows the end of the web page 1100 which displays a statement thanking the user for helping localize the nature of the inquiry.

The type of data collected during the steps illustrated in FIGS. 8-11 provides the foundation for the development of the Selection-Oriented Knowledge Base 212 which is described in Section VI below.

FIG. 12 depicts an example of a web page 1200 where step 406 of process 400 is executed. This web page prompts the user to select between scheduling a voice session with a customer service agent and continuing to navigate the Selection-Oriented Knowledge Base in one embodiment of the web site 106.

FIGS. 13-18 depict an example of a scrolling web page where process 500 is executed, referred to as the "Scheduling Page." This process enables the user to schedule a voice session with a customer service agent.

Figure 13B:
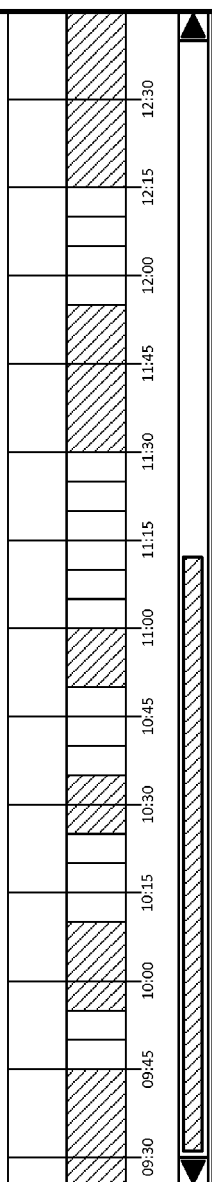

FIGS. 13A-B illustrate the introductory part 1300 of the Scheduling Page. FIG. 13A illustrates how steps 501-503 of process 500 can be executed. It shows the default duration 1301 for the voice session and a time-map window 1302 indicating the times during which an agent can be scheduled to address the user's inquiry. The user can accept the default duration or select another duration by using the pull-down menu or by directly entering the desired value. As the page is scrolled, FIG. 13B still shows the time-map 1302 and also shows a menu 1303 that offers the user four convenient alternatives to schedule a session with a customer service agent. These alternatives illustrate how step 504 of process 500 can be executed.

FIGS. 14A-D illustrate the area 1400 of the Scheduling Page which relates to the first selection in FIG. 13B, where the user selects a specific time-slot corresponding to the projected service session duration based upon agent availability as shown on the time-map.

Figure 14A:
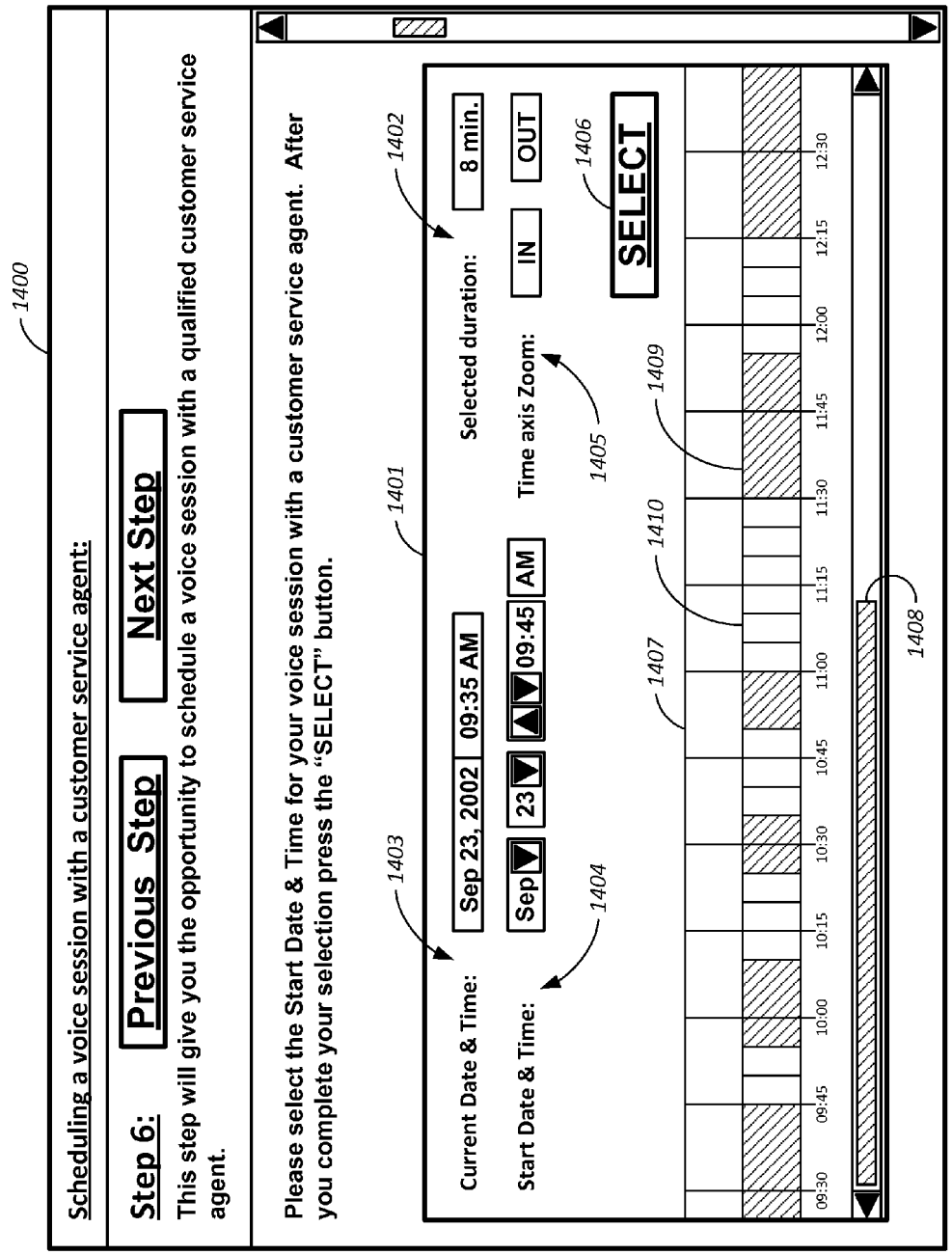
Figure 14B:
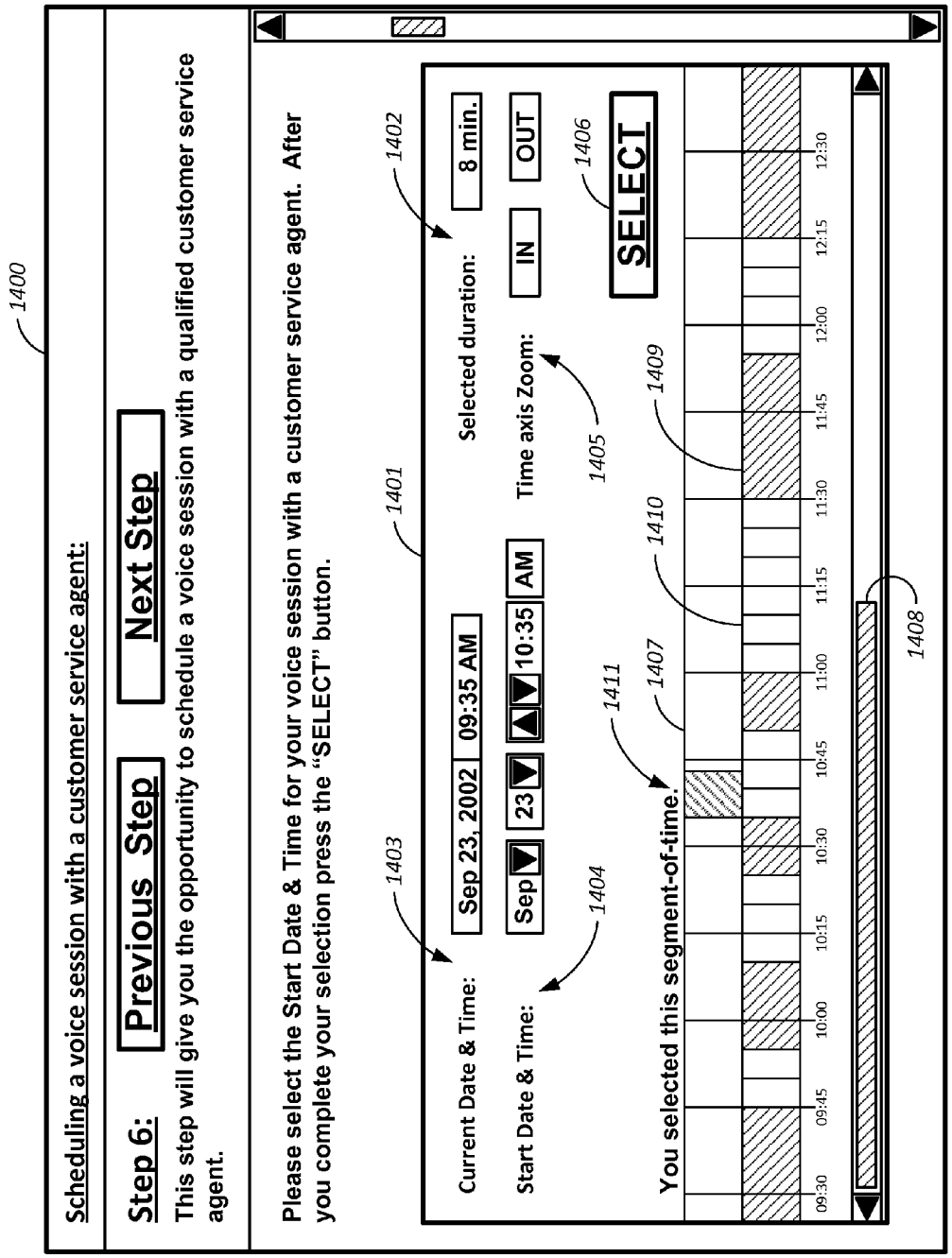

FIGS. 14A and 14B illustrate how step 521 of process 500 can be executed.

FIG. 14A displays the appearance of the page before the user makes any entries. It shows the applicable time-map window 1401, the selected duration for the phone session 1402, the current date and time 1403, and the fields for the user to enter the desired start date and time 1404. By default, the start date and time can be set, as shown, to the earliest opening associated with the selected session duration. It is important to realize that agents are likely to be available sooner for short sessions than for long sessions.

The time-map window 1401 also shows the time axis zoom 1405, the "SELECT" button 1406, the time-map 1407 and the scroll bar 1408. The time axis zoom can adjust the amount of time that is visible in the time-map 1407. The time axis scale is shown in blocks of 5 minute resolution. These blocks, which preferably can be adjusted to one minute resolution, provide an alternative method to select the start time by clicking on the corresponding block. The "SELECT" button 1406 is for the user to press after all the selections are completed. In the time-map 1407 the hatched blocks of time 1409 represent the periods during which all agents are booked and the clear blocks of time 1410 represent the periods during which agents are available.

FIG. 14B displays the appearance of the page after the user makes the desired entries. It shows, on the upper part of the time-map, the selected segment-of-time 1411 for the phone session with a customer service agent.

Figure 14D:
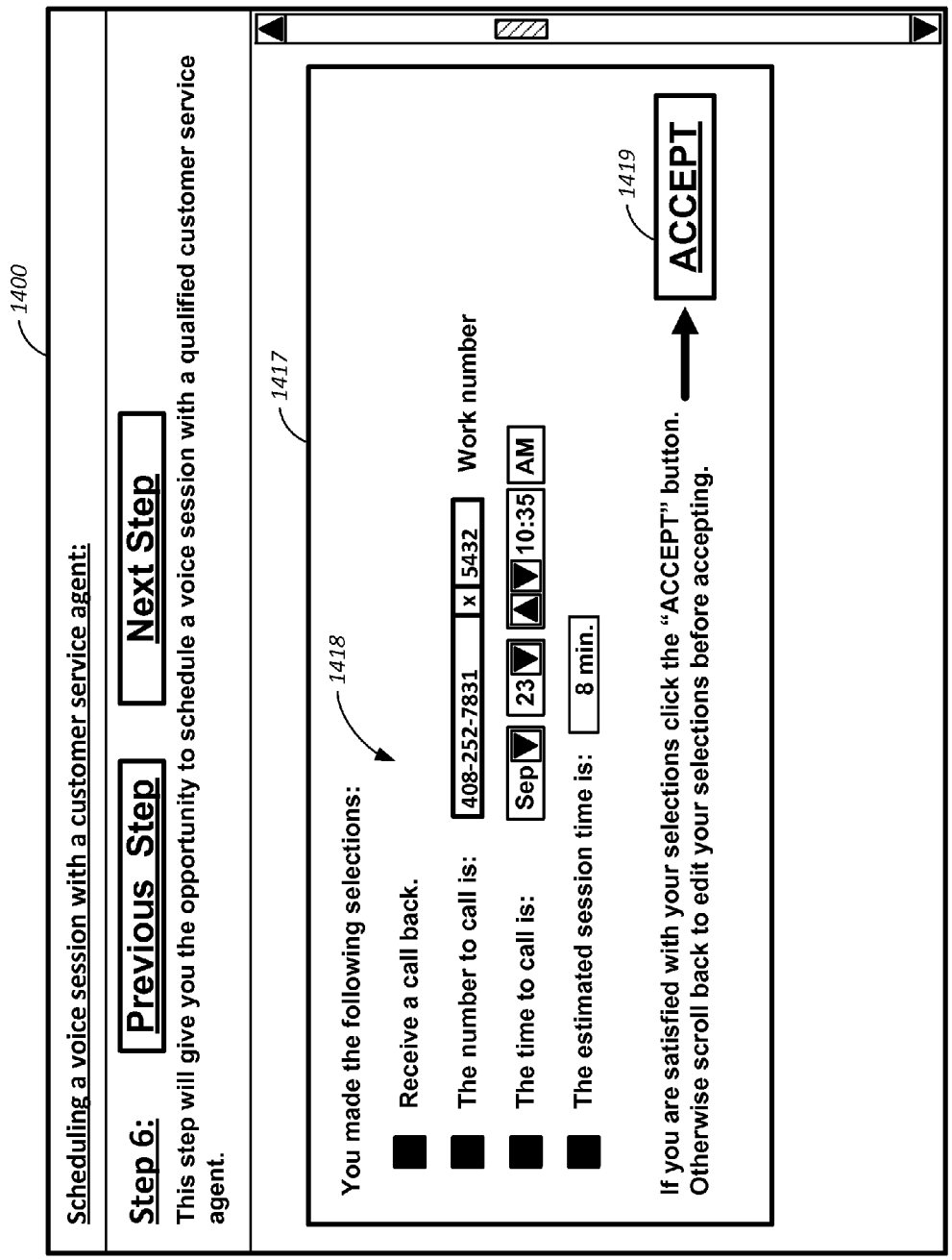

FIGS. 14C and 14D illustrate how steps 522, 523, 524, and 530 of process 500 can be executed.

FIG. 14C displays the area 1412 of the Scheduling Page where the user makes the selection between receiving and originating the call for the customer service session. The selection for the user to receive a call 1413 lists all the call-back phone numbers, provided by the user, which are stored in the User Registration and Profile Records 220. This selection can also include a provision for the user to enter a different phone number. If the user's profile contains a default number, that number can be pre-checked if the user makes this selection. The selection for the user to originate the call 1414 lists the tool-free number to call 1415 and a reference code 1416 for the user to enter upon a prompt by the answering IVR system. This reference code is used by the Customer Service Scheduler 204 to recognize the scheduled session and direct the call to the agent assigned to that session.

FIG. 14D displays the area 1417 of the Scheduling Page which contains a recap of the user's selections 1418 and an "ACCEPT" button 1419 for the user to click if the selections are acceptable.

FIGS. 15A-D illustrate the area 1500 of the Scheduling Page which relates to the second selection in FIG. 13B, where the user selects a FROM-TO segment-of-time during which the user clicks on an "I AM READY" button to trigger the voice session process.

Figure 15A:
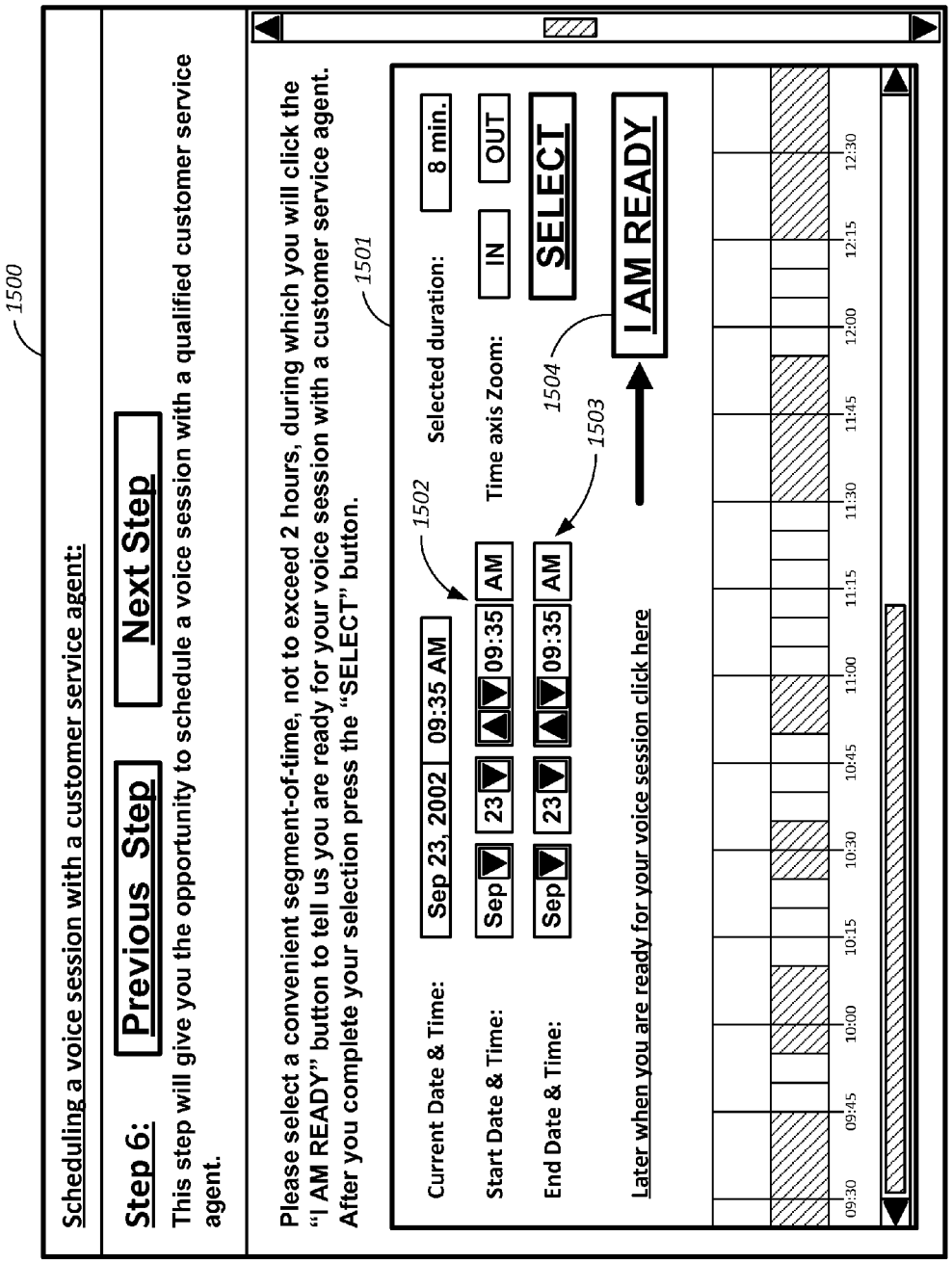
Figure 15B:
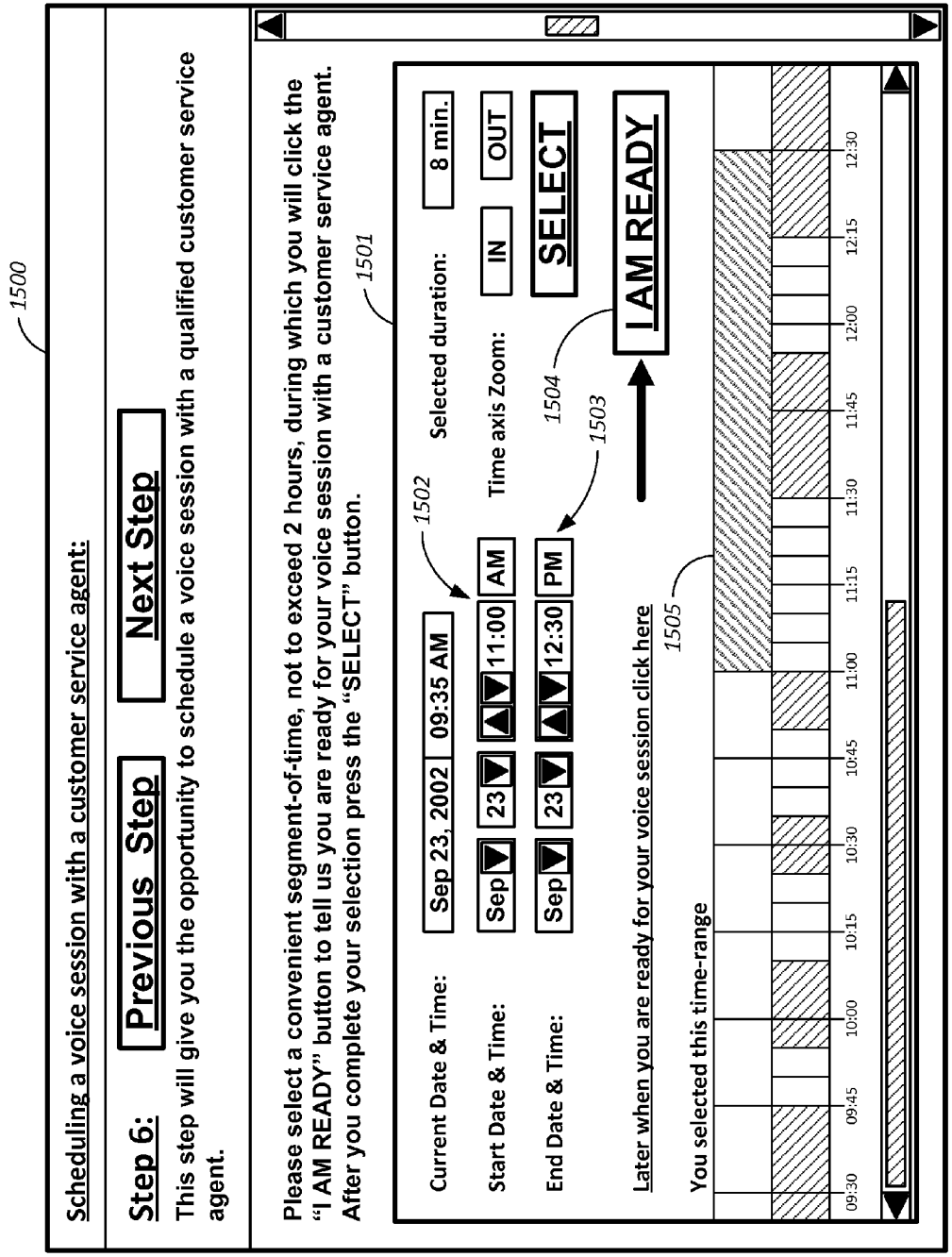

FIGS. 15A and 15B illustrate how steps 541, 542, and 543 of process 500 can be executed.

FIG. 15A displays the appearance of the page before the user makes any entries. It shows the applicable time-map window 1501 and the fields for the user to define the desired segment-of-time by entering the start date and time 1502 and the end date and time 1503. It also shows the "I AM READY" button 1504, which when clicked by the user during the selected segment-of-time causes the user's inquiry to be placed on a high priority queue to be serviced within a very short time.

FIG. 15B displays the appearance of the page after the user makes the desired entries. It shows, on the upper part of the time-map, the selected segment-of-time 1505 during which the phone session with a customer service agent can be initiated on the click of the "I AM READY" button 1504.

Figure 15D:
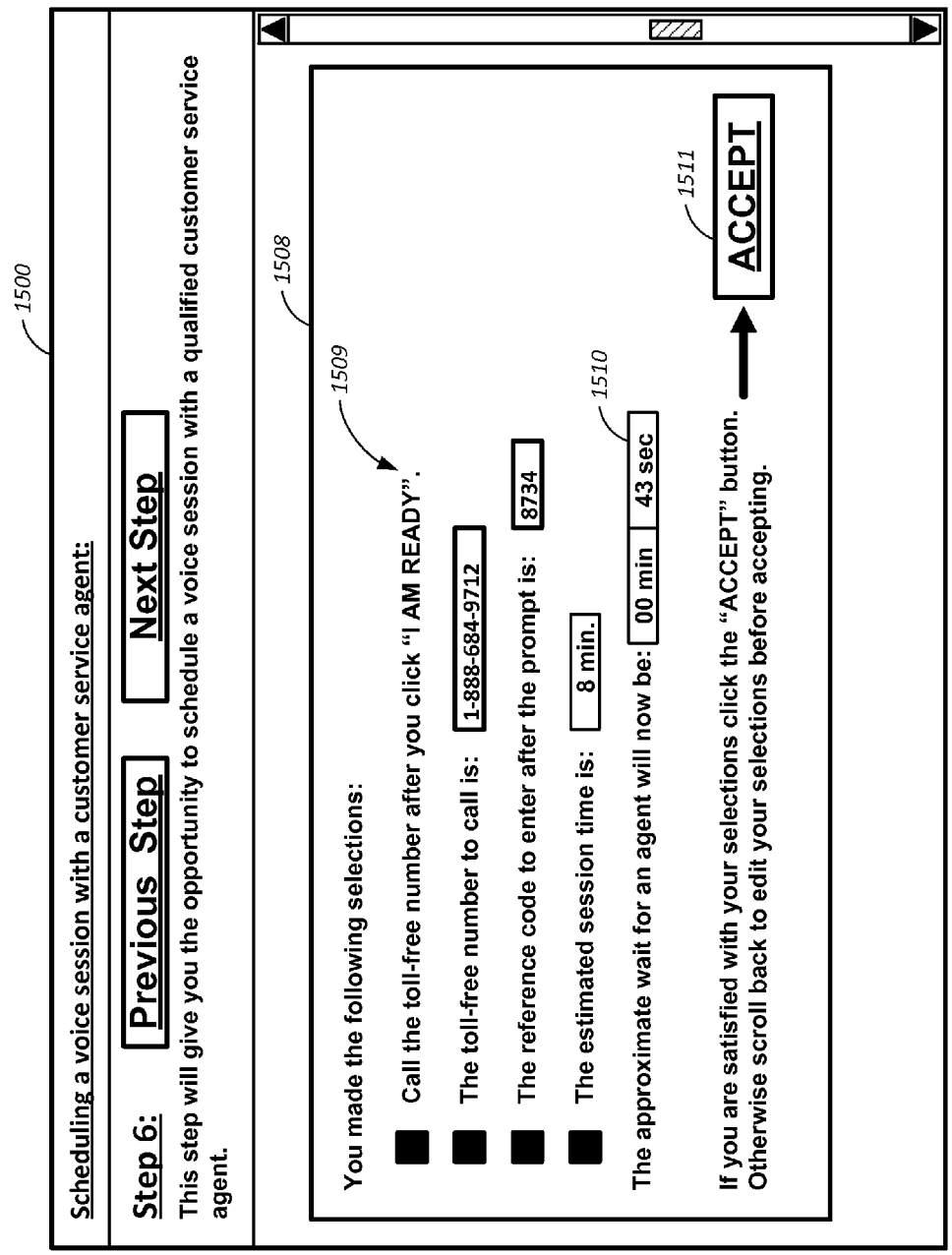

FIGS. 15C and 15D illustrate how steps 544-547 and 549 of process 500 can be executed.

FIG. 15C displays the area 1506 of the Scheduling Page where the user makes the selection between receiving and originating the call for the customer service session. This area is similar to the area 1412 of FIG. 14C with the addition of a field that displays a projected short wait for an agent to become available 1507.

FIG. 15D displays the area 1508 of the Scheduling Page which contains a recap of the user's selections 1509, a field that displays an updated value for the projected short wait 1510, and an "ACCEPT" button 1511 for the user to click if the selections are acceptable.

FIGS. 16A-D illustrate the area 1600 of the Scheduling Page which relates to the third selection in FIG. 13B, where the user selects a FROM-TO segment-of-time during which an agent can call the user to conduct the voice service session. These FIGS. 16A-D illustrate how steps 561 and 562 of process 500 can be executed.

Figure 16A:
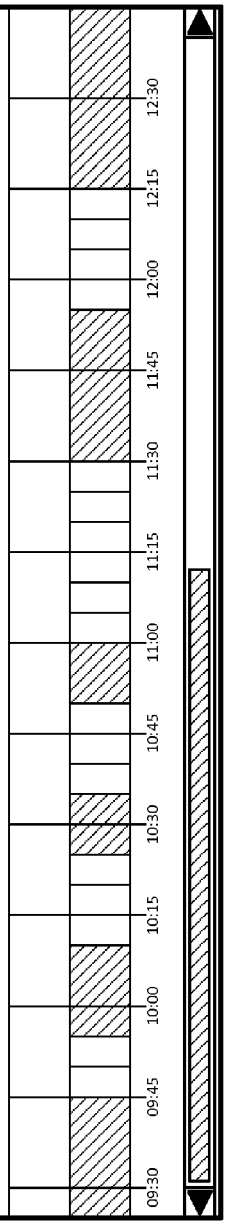

FIG. 16A displays the appearance of the page before the user makes any entries. It shows the applicable time-map window 1601 and the fields for the user to define the desired segment-of-time by entering the start date and time 1602 and the end date and time 1603.

Figure 16B:
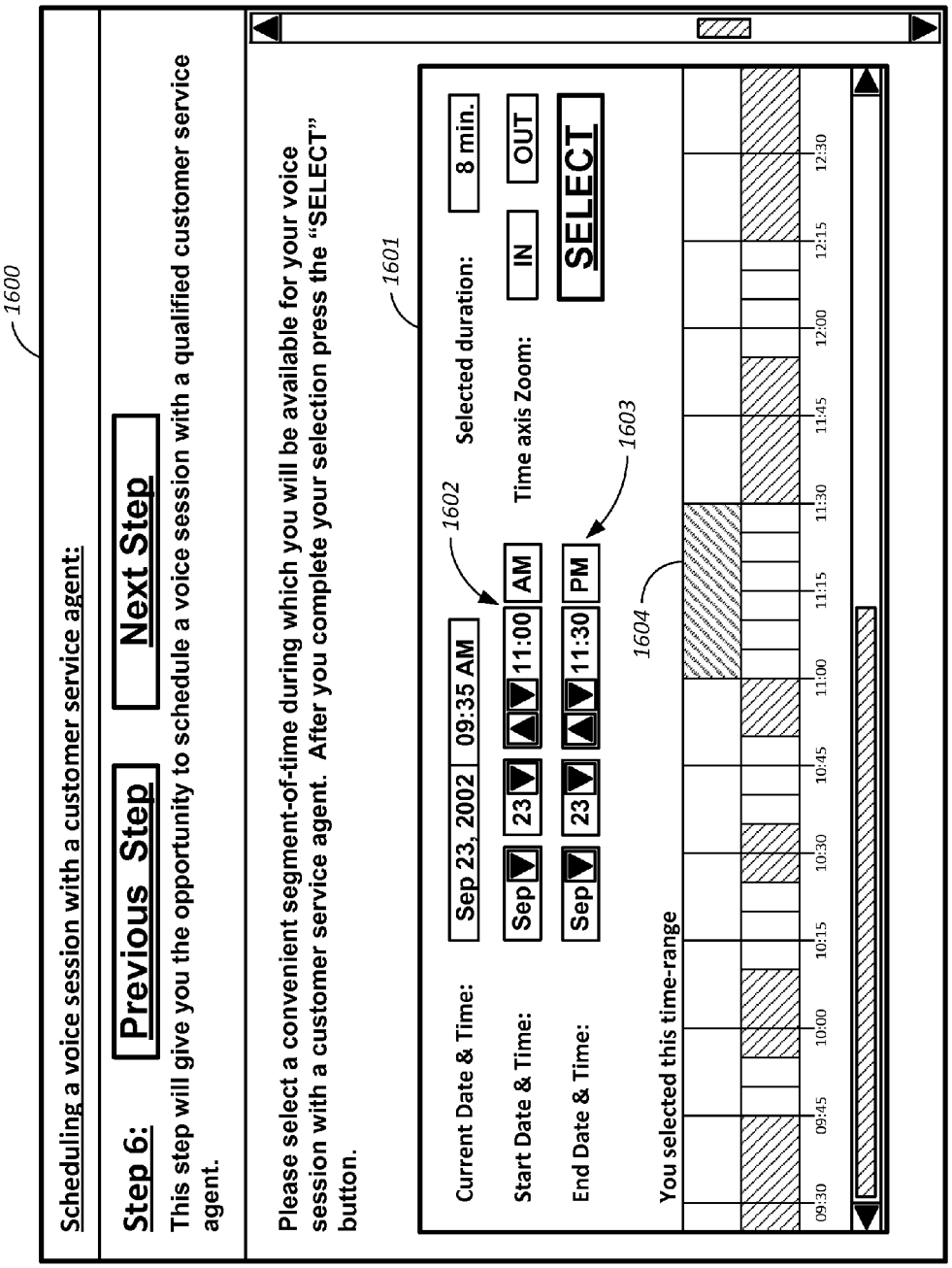

FIG. 16B displays the appearance of the page after the user makes the desired entries. It shows, on the upper part of the time-map, the selected segment-of-time 1604 during which a customer service agent can call the user to conduct the voice service session.

FIG. 16C displays the area 1605 of the Scheduling Page where the user makes the selection of a call-back phone number.

Figure 16D:
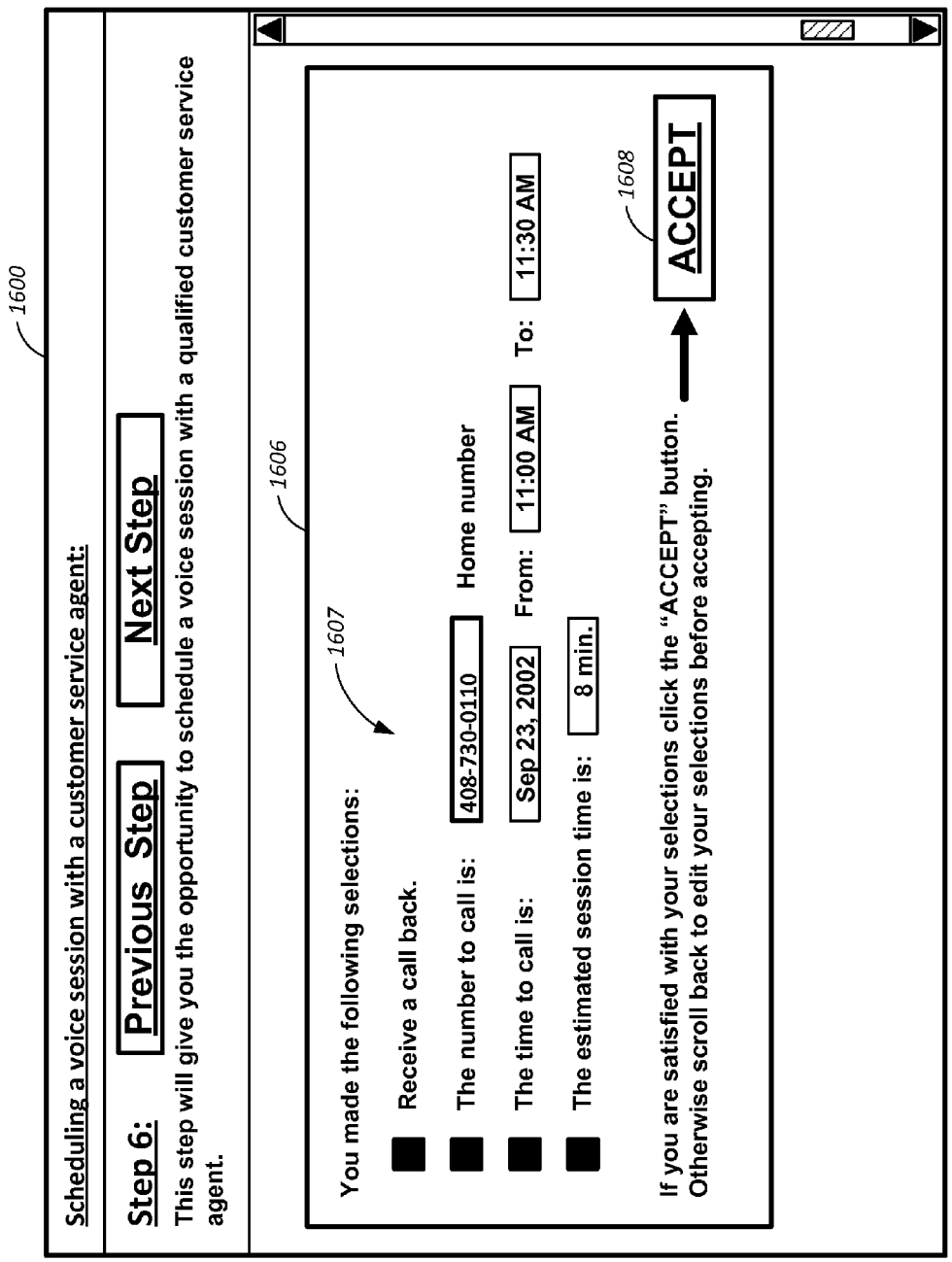
Figure 17:
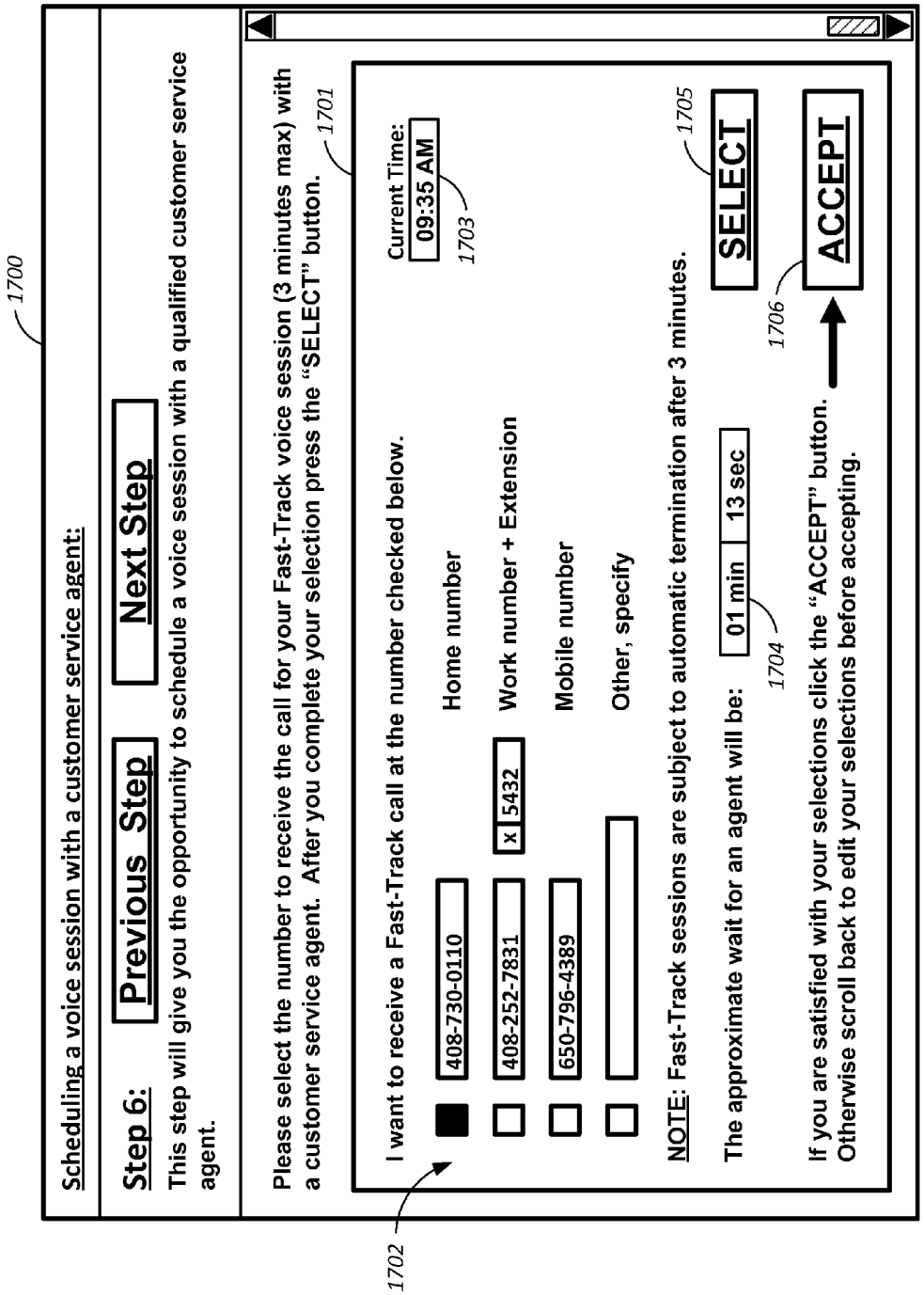
FIG. 17 depicts an example of the fourth selection in FIG. 13B.

FIG. 16D displays the area 1606 of the Scheduling Page which contains a recap of the user's selections 1607 and an "ACCEPT" button 1608 for the user to click if the selections are acceptable FIG. 17 illustrates the area 1700 of the Scheduling Page which relates to the fourth selection in FIG. 13B, when the user selects the "Fast-track" option for a quick question. This Figure illustrates how steps 571-574 and 577 of process 500 can be executed. It displays a window 1701 for the user to make the required entries. This window shows the user selections for a call-back phone number 1702, the current time 1703, the approximate wait for an agent 1704, a "SELECT" button 1705, and an "ACCEPT" button 1706.

VI. Selection-Oriented Knowledge Base

Human beings tend to experience significant difficulty in expressing thoughts or observations in a uniform manner that is independent of the thinker or observer. If ten people observing exactly the same event were independently asked to describe the event, the most likely outcome would be ten diverse descriptions with little in common. On the other end, human beings possess natural interpretive capabilities that tend to be relatively uniform and extremely powerful, far exceeding the performance of the most advanced expert systems presently available.

The conventional approach used by expert systems to conduct a search of a knowledge base is to use search criteria provided by the user to identify portions of the knowledge base content that match such criteria. The criteria typically consist of key words, groups of keywords, or logical combinations of keywords. However, such criteria are generally inadequate to represent what the user really has in mind. This is because the meaning and the interpretation of a word are highly dependent on the context in which the word is used, and such context is not provided to the expert system by the user. Often the context extends to a significant amount of other knowledge stored in the user's mind, which may have been cumulated over long time. It would be very impractical, if not impossible, to convey such knowledge to an expert system. For example, an "inside joke" which can only be interpreted by a limited number of people who are privileged to the context within which such joke has meaning, could not possibly be interpreted by an expert system. This is because the context often involves knowledge that even the people privileged to the context may not be able to describe in words.

The Selection-Oriented Knowledge Base 212 interacts with the user in accordance with a two step process. The first step is to clearly identify the mental object the user has in mind. The second step is to find the information the user may be seeking, related to that mental object.

The Selection-Oriented Knowledge Base 212 integrates the power of expert systems with the interpretive capabilities of human beings to provide an effective high performance knowledge base to fully identify the mental object the user has in mind. The Selection-Oriented Knowledge Base 212 does not place upon the user the burden of describing the mental object. Instead, it helps the user's thinking process by displaying a sequence of intuitively recognizable menu selections that eventually lead to mental object the user has in mind. To take full advantage of the human senses and interpretive capabilities, each of the menu selections can be presented by any available type of multimedia format comprising text, graphics, and sound. After the mental object is clearly identified any related issues can be appropriately addressed either directly by knowledge stored in the Selection-Oriented Knowledge Base or via links to any other knowledge base that may contain the desired knowledge.

The Selection-Oriented Knowledge Base 212 relies on the following two conditions:
  (1) The mind of the user has insufficient information to satisfy the user with respect to all the properties associated with the mental object the user has in mind; otherwise there would be no need to consult the knowledge base.
  (2) The mind of the user has sufficient information in terms of some properties associated with the mental object the user has in mind to be able to express a significant part of that mental object.

The Selection-Oriented Knowledge Base provides a system to access the interpretive capabilities of human beings which enable them to easily recognize an object presented to their senses when a counterpart of that object is present in their mind as a mental object (you know it when you see it). The Selection-Oriented Knowledge Base combines this system with an iterative selection process to identify the mental object the user has in mind. The Selection-Oriented Knowledge Base starts with a general mental object that contains the mental object the user has in mind. Then it presents to the user a selection of more specific mental objects, each obtained by adding to the general mental object at least one more property to make each selection distinct. Upon each selection by the user it continues to present to the user new selections that are progressively more specific, until the mental object the user has in mind is fully recognized.

The infrastructure to support the Selection-Oriented Knowledge Base 212 can be provided by a special type of Activity On Vertex (AOV) network. An AOV network is a directed graph in which the vertices represent tasks or activities and the edges represent precedence relations between the tasks. A more detailed description of an AOV network can be found in E. Horowitz, S. Sahni, and S. Anderson-Freed, *Fundamentals of Data Structures in C*. New York, N.Y.: Computer Sciences Press, 1993, p 303-309.

In one embodiment of this invention, two special types of AOV networks are used to support the Selection-Oriented Knowledge Base 212. These networks, called Selection-On-Vertex (SOV) and Rooted-Selection-On-Vertex (RSOV), respectively, are defined below.

While the Selection-Oriented Knowledge Base 212, the Selection-On-Vertex (SOV) network, and the Rooted-Selection-On-Vertex (RSOV) network will be described within the context of customer service inquiries it is to be understood that such context is merely illustrative of, and not restrictive on, the broad scope of these three aspects of this invention which can apply to other types of knowledge bases or inquiries.

This specification is described with reference to a Rooted-Selection-On-Vertex (RSOV) network because it offers the convenience of a single point of entry. However it is to be understood that an implementation can use the Selection-On-Vertex (SOV) network which provides for multiple points of entry or any other type of data structure by which this invention may be practiced.

To facilitate the description of the Selection-Oriented Knowledge Base 212 and make it clearer for the reader, the following definitions will be used:

Definition: A Property of an object is used in the context herein to refer to a quality, trait, feature, attribute, characteristic, peculiarity, mark, etc., present in the object.

Definition: A Mental Object of an object is a non-empty set of Properties of the object which can be envisioned in a person's mind.

Definition: Within the context of Mental Objects, the "Universe of Discourse" is the set of all Mental Objects which a human being can envision.

Definition: A Class of Mental Objects is a subset of the Universe of Discourse such that all its elements have at least one Property in common.

Definition: A Proper Sub-Class of Mental Objects of a Class of Mental Objects is the set of those elements of the Class of Mental Objects which have at least one Property in common that is not present in the other elements of the Class of Mental Objects.

Definition: An Inquiry is a request for information expressed as a mental object.

Definition: Within the context of Inquiries, the "Universe of Discourse" is the set of all inquiries that can be made.

Definition: A Class of Inquiries is a subset of the Universe of Discourse such that all its elements have at least one property in common.

Definition: A Proper Sub-Class of a Class of Inquiries is the set of those elements of the Class of Inquiries which have at least one Property in common that is not present in the other elements of the Class of Inquiries.

Definition: A Selection Vertex is a vertex that represents a Class of Mental Objects and in which the activity is the selection of one of a plurality of Proper Sub-Classes of the Class of Mental Objects.

Definition: A Root Vertex is a Selection Vertex that has no predecessor.

Definition: A Resolution Vertex is a vertex that has no successor and in which the activity is the recognition that a Mental Object has been satisfactorily identified.

Definition: A Selection-On-Vertex (SOV) network is an Activity On Vertex (AOV) network with the following properties:

(1) Has at least one Root Vertex.
(2) Each vertex that is not a Root Vertex is either a Selection Vertex or a Resolution Vertex.
(3) Each immediate successor of a Selection Vertex represents the Proper Sub-Class of Mental Objects associated with the corresponding selection in the Selection Vertex.

Definition: A Rooted-Selection-On-Vertex (RSOV) network is a Selection-On-Vertex (SOV) network with exactly one Root Vertex.

Definition: A Path is a sequence of at least two distinct vertices, each adjacent to the next. A Path with exactly two vertices is also called an edge.

Definition: A Proper Sub-Path of a Path is a partial sequence of distinct vertices of the Path, each adjacent to the next, which contains fewer vertices than the Path.

Definition: The Path Length of a Path is the number of vertices in the Path minus one.

Definition: A Navigational Path is a Path that starts at a Root Vertex and ends at a Resolution Vertex.

Definition: A Shortcut of a Path is an edge that connects two non-adjacent vertices of that Path.

Definition: A Shared Shortcut of a Group of Paths is a Shortcut of each Path in the Group.

Definition: An Express Path of a Navigational Path is the Path obtained by applying at least one Shortcut to that Navigational Path.

Definition: The Current Vertex is the vertex currently being visited by the user, along the Navigational Path that the user is following.

Definition: The Current Time is the calendar time, expressed as date and time-of the-day, at which the user arrives at the Current Vertex.

Definition: The Navigational Library of a given Selection-On-Vertex (SOV) network is the set of all the distinct Navigational Paths that can be defined for that network.

Definition: A Path Schedule of a given Path for a given user is a chronological record of the dates and times at which that user visits each succeeding vertex in the Path.

Definition: The Navigational Archive of a given Selection-On-Vertex (SOV) network for a specified time period is the complete record of all the Navigational Paths followed by users over that time period. This record comprises items such as the Navigational Path identification, the user identification, the Path Schedule of each user, etc.

Definition: An Evolving Path is a Proper Sub-Path of a Navigational Path that starts at a Root Vertex and ends at the Current Vertex the user is visiting.

Definition: The Weight of an Evolving Path is the count of the number of active users currently on that Evolving Path.

Definition: A Potential Path of an Evolving Path is a Navigational Path of which the Evolving Path is a Proper Sub-Path.

Definition: A Discernable Path is a Proper Sub-Path of no more than NDiscern Potential Paths, where NDiscern is a configurable integer.

Definition: A Rooted Discernable Path is a Discernable Path that starts at a Root Vertex.

Definition: A Successor Path of an Evolving Path is a Path that starts at the Current Vertex and ends at a Successor Vertex of the Current Vertex.

Definition: The Resolution Probability of a specific Resolution Vertex is equal to the count of the Navigational Paths in the Navigational Archive that end at that Resolution Vertex, divided by the total count of all Navigational Paths in the Navigational Archive.

Definition: The Hit Probability of a Potential Path of an Evolving Path is equal to the count of that Potential Path in the Navigational Archive divided by the total count of all Potential Paths of that Evolving Path, in the Navigational Archive.

Definition: The Combined Hit Probability of a Group of Potential Paths of an Evolving Path is equal to the sum of the Hit Probabilities of the Potential Paths in the Group.

Definition: The Basic Menu of a Selection Vertex is a selection menu that consists of the titles of the each of the vertices that are immediate successors of that Selection Vertex.

Definition: The Supplemental Menu of a Selection Vertex is a selection menu that consists of the titles of one or more vertices that are successors but not immediate successors of that Selection Vertex.

Definition: The symbol RefP denotes a configurable reference parameter to which a multiple of the Hit Probability of a Potential Path can be compared.

Definition: The symbol RefP0 is an initial value selected for RefP.

Definition: A Frequent Path denotes a Potential Path of an Evolving Path with a Hit Probability at least equal to RefP/NFP where "NFP" (Number of Frequent Paths) is a small configurable integer equal to at least 1 and at most MNFP and where MNFP (Maximum Number of Frequent Paths) is a configurable integer equal to at least 1 and typically no more than 4.

Definition: A Frequent Path Set is a set of Potential Paths, each of which is a Frequent Path for a given value of NFP.

Definition: A Preferred Path is a Potential Path of an Evolving Path with a Hit Probability at least equal to RefP/NPP where "NPP" (Number of Preferred Paths) is a small configurable integer equal to at least (1+MNFP) and at most (MNFP+MNPP) and where MNPP (Maximum Number of Preferred Paths) is a small configurable integer equal to at least 1 and typically no more than 5.

Definition: A Preferred Path Set is a set of Potential Paths, each of which is a Preferred Path for a given value of NPP.

Definition: The Current Time at a given Vertex is the calendar time at which the user arrives at that Vertex.

Definition: The Search Time of a Path, for a given user, is the difference between the Current Time at the last Vertex of the Path and the Current Time at the first Vertex of the Path.

Definition: The Mean Search Time (MST) of a Path is the mean of a sample of Search Times of that Path.

Definition: The NEED HELP Generation Time (NHGT) is the time span from the moment a user arrives at a Vertex and the moment the NEED HELP request is generated.

Definition: The Mean NEED HELP Generation Time (MNHGT) is the mean of a sample of NEED HELP Generation Times.

Definition: The Optimum RefP is the value of RefP for which the Mean Search Time is minimum.

Definition: DeltaRefP is a configurable value by which RefP can be decremented or incremented to seek the Optimum RefP.

Definition: A State, in the evolution of an implementation of the Selection-Oriented Knowledge Base 212, is a complete specification of the Selection-Oriented Knowledge Base that is in effect over a finite period of time called the Life Cycle of the State. The specification comprises the topological configuration of the Selection-On-Vertex network and all the operating parameters that uniquely characterize the Selection-Oriented Knowledge Base during the Life Cycle of that specific State.

Definition: A vertex is designated as Tagged if it is a potential candidate for upgrade.

Definition: The symbol NT is a configurable natural number that denotes the maximum number of vertices that can be designated as Tagged during the Life Cycle of a particular State.

Definition: The Search Effort is a real number that quantifies, in accordance with a given criterion, the amount of effort made by a user to reach the Current Vertex, while navigating the Selection-Oriented Knowledge Base.

Definition: The variable RT is used to express future time relative to the Current Time at the Current Vertex.

Definition: A Relative Time Unit (RTU) is a configurable unit associated with the variable RT. Examples of Relative Time Units are 10 seconds, 20 seconds, 1 minute, etc.

Definition: A Selection-Oriented Knowledge Base is a knowledge base preferably configured as a Selection-On-Vertex (SOV) network, whereby a user can convey to the Selection-Oriented Knowledge Base the Mental Object the user has in mind by following a Path along the Selection-On-Vertex (SOV) network and making the desired selections at each Selection Vertex visited until a Resolution Vertex is reached. If the Mental Object the user has in mind represents an Inquiry, the Resolution Vertex can further point the user to the resolution of the Inquiry.

Figure 18:
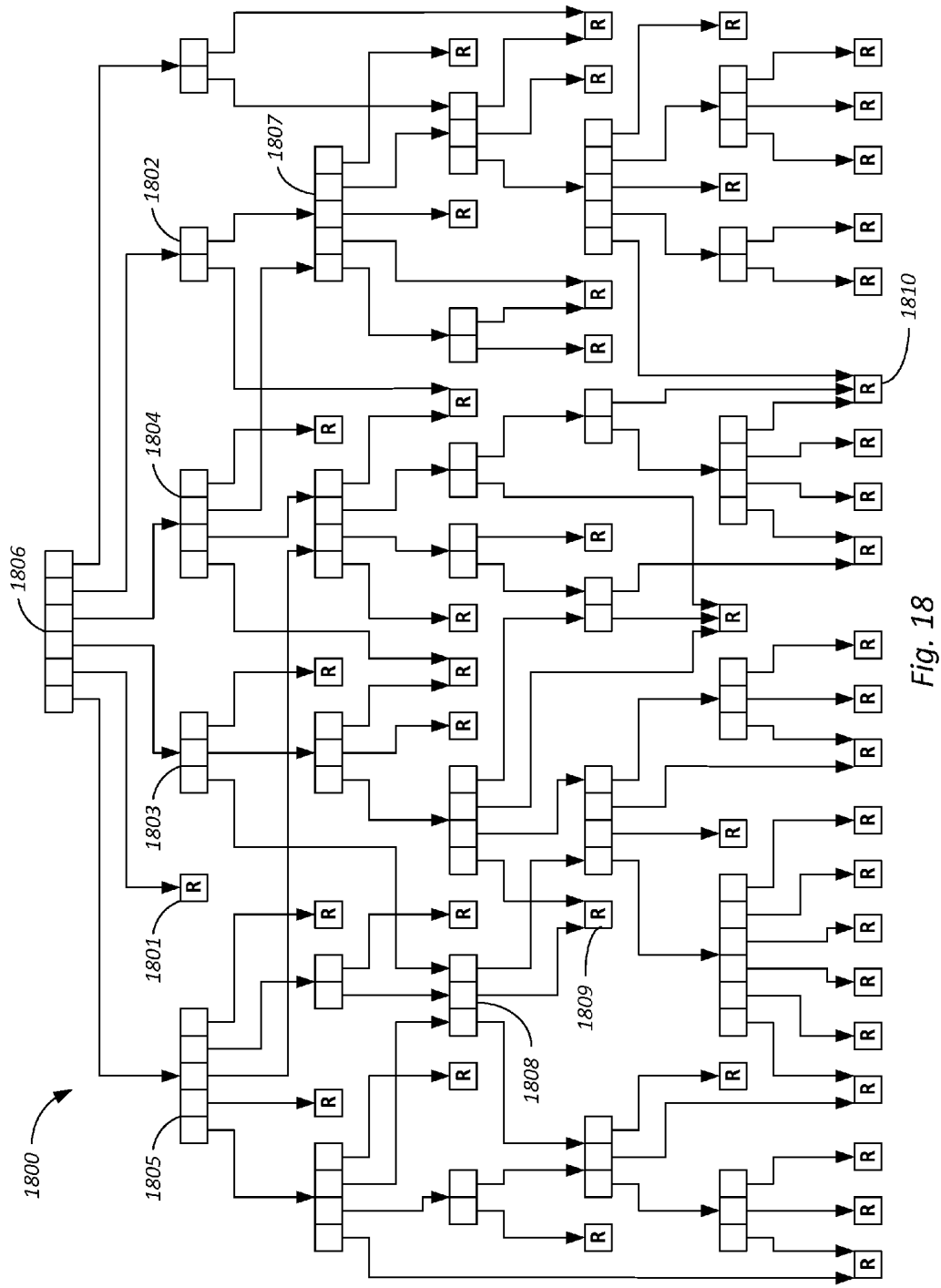
FIG. 18 depicts an illustrative diagram of the Rooted-Selection-On-Vertex (RSVO) network that supports the Selection-Oriented Knowledge Base in one embodiment of the present invention.

FIG. 18 provides an illustration of a Rooted-Selection-On-Vertex network 1800. It shows a plurality of Resolution Vertices, such as Resolution Vertex 1801, which are all labeled with the letter "R", and have no successors. It shows a plurality of Selection Vertices, such as Selection Vertices 1802 through 1806, with 2 through 6 successors, respectively. The Root Vertex 1806 is a Selection Vertex which has no predecessor. In accordance with the definition of the Rooted-Selection-On-Vertex network, any vertex, other than the Root Vertex or one of its immediate successors, may have more than one immediate predecessor. Examples of vertices with multiple immediate predecessors are Selection Vertex 1807, Selection Vertex 1808, Resolution Vertex 1809 and Resolution Vertex 1810. This topology provides alternative paths that lead to the same vertex, a feature that significantly increases the flexibility of the Selection-Oriented Knowledge Base 212. If a user makes a poor selection at any vertex the desired destination can still be reached, in most cases, through an alternate path. Although the alternate path may be longer than the optimal path, it is likely to be much shorter than a path that involves retracing some steps back to the point where the poor selection was made. From the user's perspective, an alternate path tends to be more appealing than the sense of waste of time associated with retracing steps.

Figure 19:
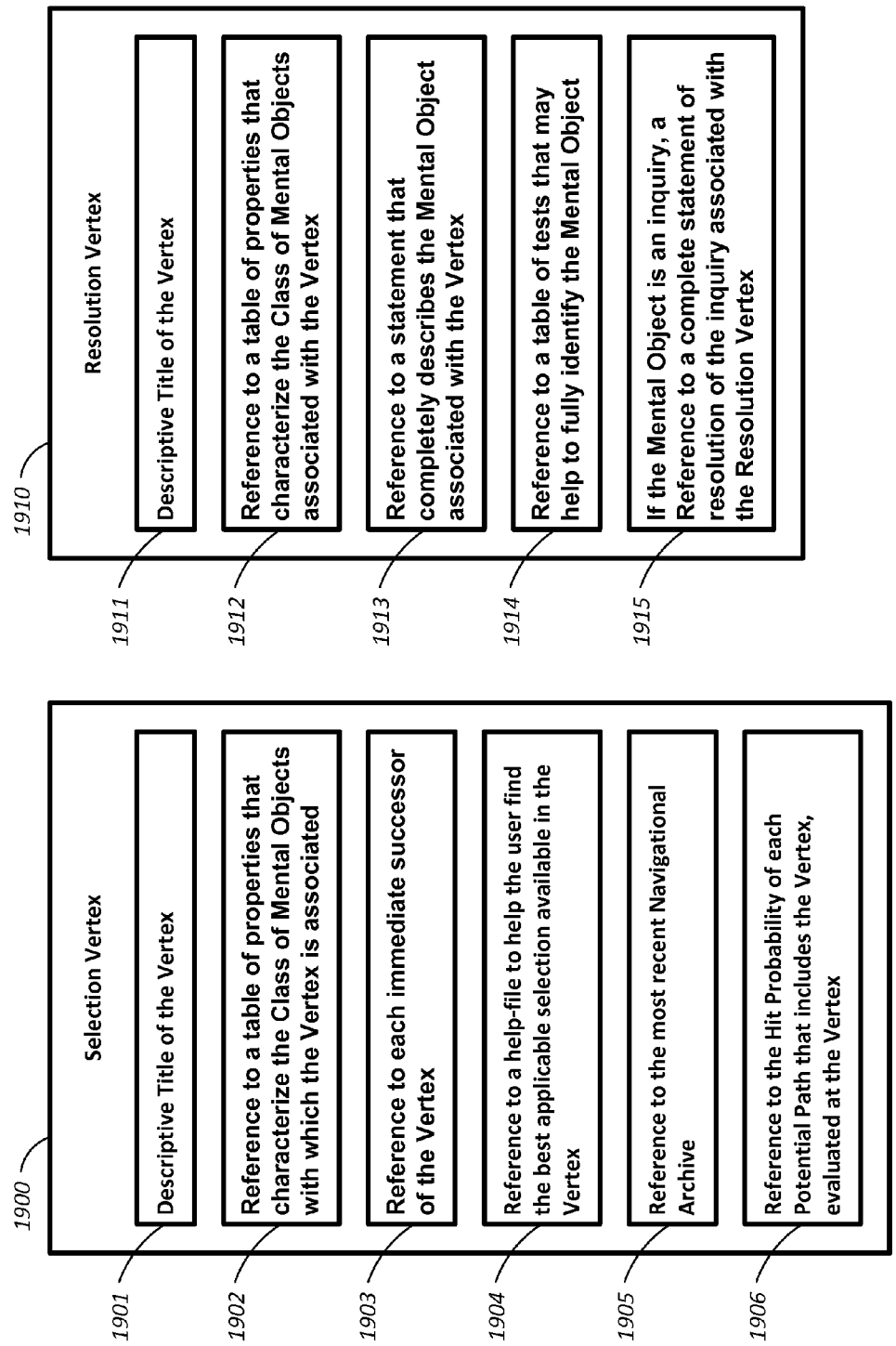
FIG. 19 depicts the typical configuration of a Selection Vertex and a Resolution Vertex of the Rooted-Selection-On-Vertex (RSVO) network that supports the Selection-Oriented Knowledge Base in one embodiment of the present invention.

FIG. 19 illustrates a block diagram of one embodiment of a Selection Vertex 1900 and a Resolution Vertex 1910. The Selection Vertex 1900, preferably includes a descriptive title of the subject vertex 1901, a reference to a table of properties that characterize the Class of Mental Objects with which the subject vertex is associated 1902, a reference to each immediate successor of the subject vertex 1903, a reference to a help-file to help the user find the best applicable selection available in the subject vertex 1904, a reference to the most recent Navigational Archive 1905, and a reference to the Hit Probability of each Potential Path that includes the subject vertex, whereby the Hit Probability can be evaluated at the subject vertex.

The Resolution Vertex 1910, preferably includes a descriptive title of the subject vertex 1911, a reference to a table of properties that characterize the Class of Mental Objects with which the subject vertex is associated 1912, a reference to a statement that completely describes the Mental Object associated with the subject vertex 1913, a reference to a table of tests that may help to fully identify the Mental Object 1914, and, if the Mental Object is an Inquiry, a reference to a complete statement of resolution of the Inquiry associated with the subject vertex 1915.

The descriptive titles 1901 and 1911 can be used to identify the Current Vertex. These descriptive titles can be displayed on the web page associated with the Current Vertex while the user is navigating the Selection-Oriented Knowledge Base 212. They can also be used to generate and display the selection menu on the web page associated with each specific Selection Vertex 1900. This can be done by scanning the immediate successors of the Current Vertex to extract their respective titles. Further, it provides the flexibility to dynamically manipulate the order of the selections of the Basic Menu.

The references to tables of properties 1902 and 19012 are used to appropriately narrow the scope of each Mental Object. As the user proceeds through a path starting at the Root Vertex 1806, for each new vertex visited, the scope of the Class of Mental Objects associated with that vertex is more specific than that of the previous vertex. Eventually the user reaches a Resolution Vertex where the associated class has exactly one element and relates to one specific Mental Object. At the Resolution Vertex all the properties that uniquely identify the Mental Object have been established enabling the user to fully recognize the Mental Object. If the Mental Object is an Inquiry, then the appropriate resolution of the inquiry can be provided.

The references to the immediate successors of the subject Current Vertex 1903 are associated with the edges that start at the subject Current Vertex and end at each of its immediate successors. These references can be used as an adjacency list that facilitates the movement from one vertex to the next.

The reference to a help-file to help the user find the best applicable selection available in the Current Vertex 1904 can be called from the web page where the user makes the selection. Typically this is done through a button labeled "Details" that the user can click. This help-file can provide additional details about each menu selection. In addition, it can provide suggestions in the form of "if then" statements where the "if" is associated with a guess of what the user may have in mind and the "then" is associated with the suggested menu selection.

The reference to the most recent Navigational Archive 1905 can be used by the User Activity Analyzer 216, to generate suggestions that can be included in the help-file 1904.

The reference to the Hit Probability of each Potential Path that includes the Current Vertex provides access to the statistical data necessary to anticipate the Mental Object the user has in mind. For each Potential Path that includes the Current Vertex the Hit Probability is preferably stored in a table that can be periodically updated to maintain the Selection-Oriented Knowledge Base 212 current.

The reference to a statement that completely describes the Mental Object associated with the subject Resolution Vertex 1913 can be used to display, on the web page associated with that Resolution Vertex, a confirmation of the Mental Object for the benefit of the user. If the Mental Object is an Inquiry, it can display a confirmation of the Inquiry before a resolution of the Inquiry is displayed. Such confirmation can clarify any potential misunderstanding that may have occurred between the user and the Selection-Oriented Knowledge Base 212.

The reference to a table of tests that may help to fully identify the Mental Object 1914 can be used, in the case of an Inquiry, to identify what prompted the user to submit the Inquiry. This information can also be used by the User Activity Analyzer 216 to predict user behavior. In addition it can be used to determine if a deficiency in a product or service is responsible for the Inquiry, in which case the information collected can be extremely valuable in any effort to correct such deficiency.

The reference to a complete statement of resolution of the Inquiry associated with the subject Resolution Vertex 1915 can be used to facilitate the display of the resolution on the web page associated with that Resolution Vertex, for the benefit of the user.

Figure 20A:
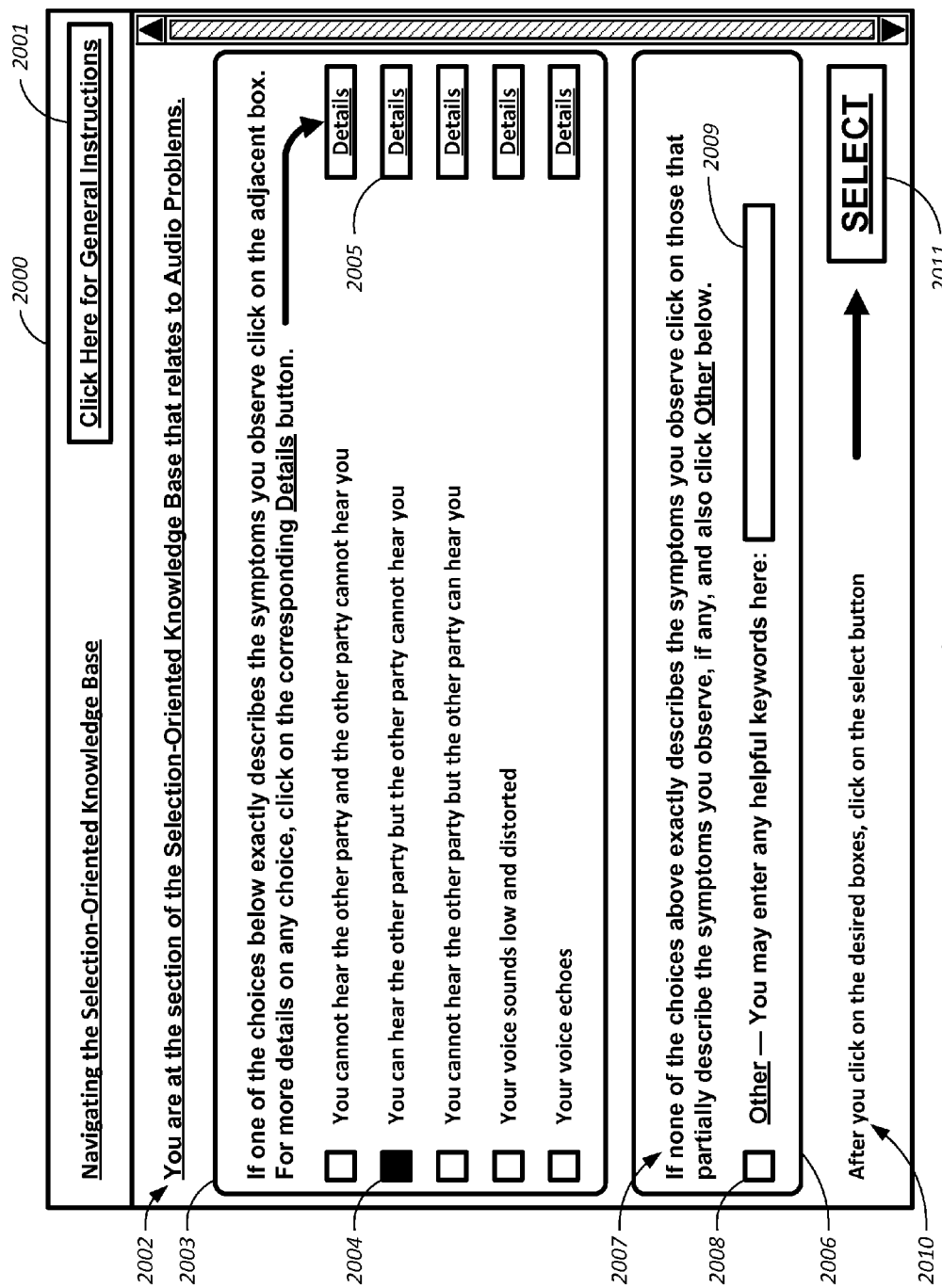
FIGS. 20A-B depict an example of web pages for a Resolution Vertex that show the resolution of the inquiry in one embodiment of the web site associated with the Customer Service Management System.
Figure 20B:
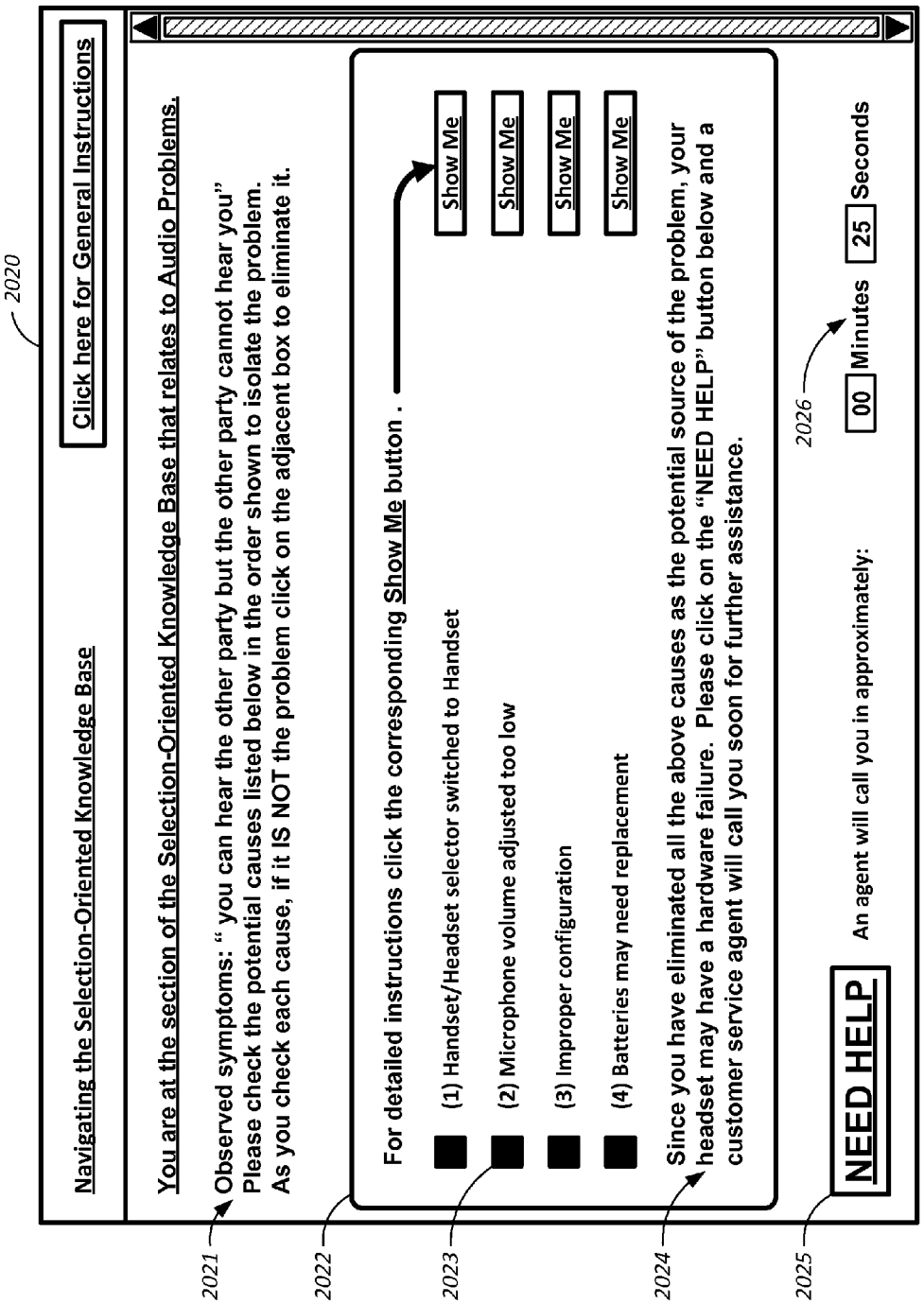

FIGS. 20A-B show two example web pages that are used to illustrate some aspects of the Selection-Oriented Knowledge Base 212 in the following set of hypothetical circumstances. A user accesses the customer service web site of a company that supplies telephone headsets to inquire about a headset malfunction. After visiting several vertices, the user eventually arrives at a vertex where one of the selections clearly expresses the symptoms the user is observing.

FIG. 20A illustrates a web page 2000 from one embodiment of the Selection-Oriented Knowledge Base 212. To obtain general instructions the user can, at any time, click a button 2001. The page has a title 2002 that describes, for the benefit of the user, the vertex currently being visited. A menu box 2003 contains several menu selections among which the user may find the one that exactly expresses the malfunction the user is observing 2004. For each menu selection, there is a "Details" button 2005 which, when clicked, provides the user additional details about that selection.

Another special box 2006, addresses the case where none of the menu selections in the menu box 2003 correctly describes what the user is observing. It contains a statement 2007 explaining such case and instructing the user to click on "Other" 2008 as the alternative. The selection "Other" provides a natural language text box 2009 for the user to enter any helpful keywords that may help the Selection-Oriented Knowledge Base 212 better identify what the user has in mind. After the user makes the desired selections a statement 2010 instruct the user to click on the "SELECT" button 2011 to complete the selection process.

Preferably, all the menus contain the special selection "Other" to ensure that the user never encounters a dead-end. In the Selection-Oriented Knowledge Base 212, the user's inquiry is either correctly represented by one of the specific menu choices listed or falls in the general category labeled "Other" which includes all the other possibilities.

This feature addresses one of the most important aspects of this invention which is the integration of machine power and human interpretation capability to cost effectively address users inquiries. In accordance with this aspect, the resolution of an inquiry is addressed by the Selection-Oriented Knowledge Base 212, up to the point where the Selection-Oriented Knowledge Base 212 can guide the user to an appropriate resolution of the inquiry. After that point the resolution of the inquiry is transferred to a qualified agent that seamlessly extends the Selection-Oriented Knowledge Base 212 and provides the user the needed help.

The seamless transfer of the resolution is supported by the Help Requests Predictor module 218 described in Section IX below. Using anticipated "NEED HELP" forecasts, the Customer Service Scheduler 204 is able to schedule an agent to call a user within seconds after a "NEED HELP" request is generated. From the user's perspective, this feature can make the response to customer service inquiries appear seamless.

FIG. 20B illustrates another web page 2020 from one embodiment of the Selection-Oriented Knowledge Base 212 which is displayed after the user clicks the SELECT button 2011 of FIG. 20A. A statement 2021 restates the observed symptoms and asks the user to eliminate various potential causes that could explain the observed symptoms. A box 2022 lists several potential causes that could explain the observed symptoms, such as (2) Microphone adjusted too low 2023. In this example, since the user eliminated all the potential causes listed, the web page displays a statement 2024 suggesting a likely explanation for the observed symptoms and recommending that the user clicks the NEED HELP button 2025. In this case the resolution of the inquiry is seamlessly transferred to an agent that will contact the user within the approximate time shown on the display window 2026. The circumstances just described provide an example of the seamless resolution of user's inquiries Another significant aspect of the Selection-Oriented Knowledge Base 212 is that its acquisition of knowledge can take place by an evolutionary process in which the user plays a very important role. The Selection-Oriented Knowledge Base 212 starts with a Setup Phase during which the Root Vertex, all of its immediate successors, and any number of additional vertices can be created from previously available knowledge.

The Setup Phase is followed by a Learning Phase during which a significant amount of knowledge is added. Part of this knowledge is automatically collected during the process by which users navigate through the vertices of the Selection-Oriented Knowledge Base. Another part is collected by agents that respond to scheduled voice customer service sessions and "NEED HELP" requests. Additional details regarding the collection of such knowledge are provided later in Sections VII and XI.

At the completion of the Learning Phase, the Selection-Oriented Knowledge Base reaches a stage of maturity whereby no further knowledge can be cost effectively added. This happens when the residual inquiries that require agent assistance are practically limited to those few that rarely occur. There is a crossover point where the investment to develop the appropriate knowledge to address residual inquiries has no payback when equated to the cost of the customer service agents necessary to address such residual inquiries. Such crossover point establishes the completion of the Learning Phase. The Selection-Oriented Knowledge Base 212 can be provided with appropriate algorithms that compute and compare the costs and automatically establish this crossover point for the benefit of system managers responsible for the operation of the Selection-Oriented Knowledge Base.

Once the Learning Phase is declared complete, the Selection-Oriented Knowledge Base enters the Maintenance Phase during which no significant effort is applied to knowledge development. The maintenance work is essentially limited to edits and updates to reflect any changes in the environment in which the knowledge base operates including changes in user behavior.

One significant aspect of the Learning Phase is that it consists of a discrete sequence of States of the Selection-Oriented Knowledge Base whereby each State in the sequence reflects an improved level of knowledge and performance over the previous State. For each State, a separate State Navigational Archive is generated over the Life Cycle of that State. The information collected in a State Navigational Archive provides the foundation to generate upgrades for the next State. Preferably, the minimum length of the Life Cycle of a State is determined by the amount of information that needs to be archived to satisfy sample size requirements for statistical analysis. The maximum length of the Life Cycle of a State can be determined by cost versus benefit analysis of potential upgrades waiting to be deployed.

The upgrades from one State to the next involve any changes that may be deemed appropriate to improve the operation of the Selection-Oriented Knowledge Base 212, and can comprise the following:

(1) Topological changes of the Selection-On-Vertex network such as addition and deletion of vertices, addition of new edges to create Shortcuts and Express Paths, etc.

(2) Upgrades of the descriptive titles of certain vertices to resolve misunderstandings uncovered from the analysis of NEED HELP requests and user suggestions.

(3) Upgrades of the properties that characterize certain Classes of inquiries to resolve misunderstandings uncovered from the analysis of NEED HELP requests and user suggestions.

(4) Upgrades of the help files of certain Selection Vertices.

(5) Upgrades of the inquiry descriptions and resolutions associated with certain Resolution Vertices.

(6) Adjustments of the various configurable parameters of the Selection-Oriented Knowledge Base.

With respect to topological changes, the addition of Shortcuts and Express Paths is justified when the Navigational Archive of the current State indicates that a Proper Sub-Path of a Navigational Path Experiences very heavy traffic. In this case a Shortcut can be created by the addition of a new edge that directly links the first and last vertices of the Proper Sub-Path. This addition creates an Express Path which has two beneficial effects. First, the Selection-Oriented Knowledge Base operates faster. This is because the web pages associated with the intermediate vertices need not be displayed for all the users that follow the Express Path. Second, the frequently selected menu items that, without the Express Path, were presented to the user at a later vertex are now presented to the user in an earlier vertex. This option tends to make the user's search faster and easier.

Another significant aspect of the Learning Phase is that all vertices are continuously monitored for the number of NEED HELP requests they generate. At the end of the Life Cycle of each State, a total of NT vertices with the highest incidence of NEED HELP requests can be designated as Tagged. The natural number NT is preferably configured to reflect the developmental resources that can be dedicated to upgrade Tagged vertices. This approach establishes a priority system for the upgrade of vertices that optimizes the rate of improvement of the Selection-Oriented Knowledge Base, over time, for a given set of resources. When the upgrade work is declared complete a date and time can be selected for the transfer of the Selection-Oriented Knowledge Base from the current State to a new State. Once the new State is in effect a new State Navigational Archive is preferably started for the new Sate. In addition a copy of the previous State Navigational Archive can be created and adjusted to reflect, to the extent possible, the data it would have contained had the upgrades introduced by the new State been in effect during the previous State. These adjusted State Navigational Archives can provide valuable data for the initial operation of the new State while the new State Navigational Archive has insufficient data to perform meaningful statistical analysis.

The upgrade of Tagged vertices relies on the analysis of data associated with NEED HELP requests which includes information stored in the Scheduled Voice Services Archive 208. Preferably, voice service agents are instructed to collect information describing the reasons why the user encountered difficulties. The analysis tries to identify the potential deficiencies that triggered the requests. For Selection Vertices, the analysis focuses on the respective Classes of Inquiries that need to be improved off-line to address the deficiencies. For Resolution Vertices the analysis focuses on either improving the identification of the Mental Object or Inquiry the user has in mind or spawning new vertices associated with new Classes of Mental Objects or Inquiries that may have to be created to properly address such Mental Objects or Inquiries. The creation of new Mental Objects or Inquiries may involve tests the user is asked to perform to further narrow and identify the issue that confused the user.

Figure 21:
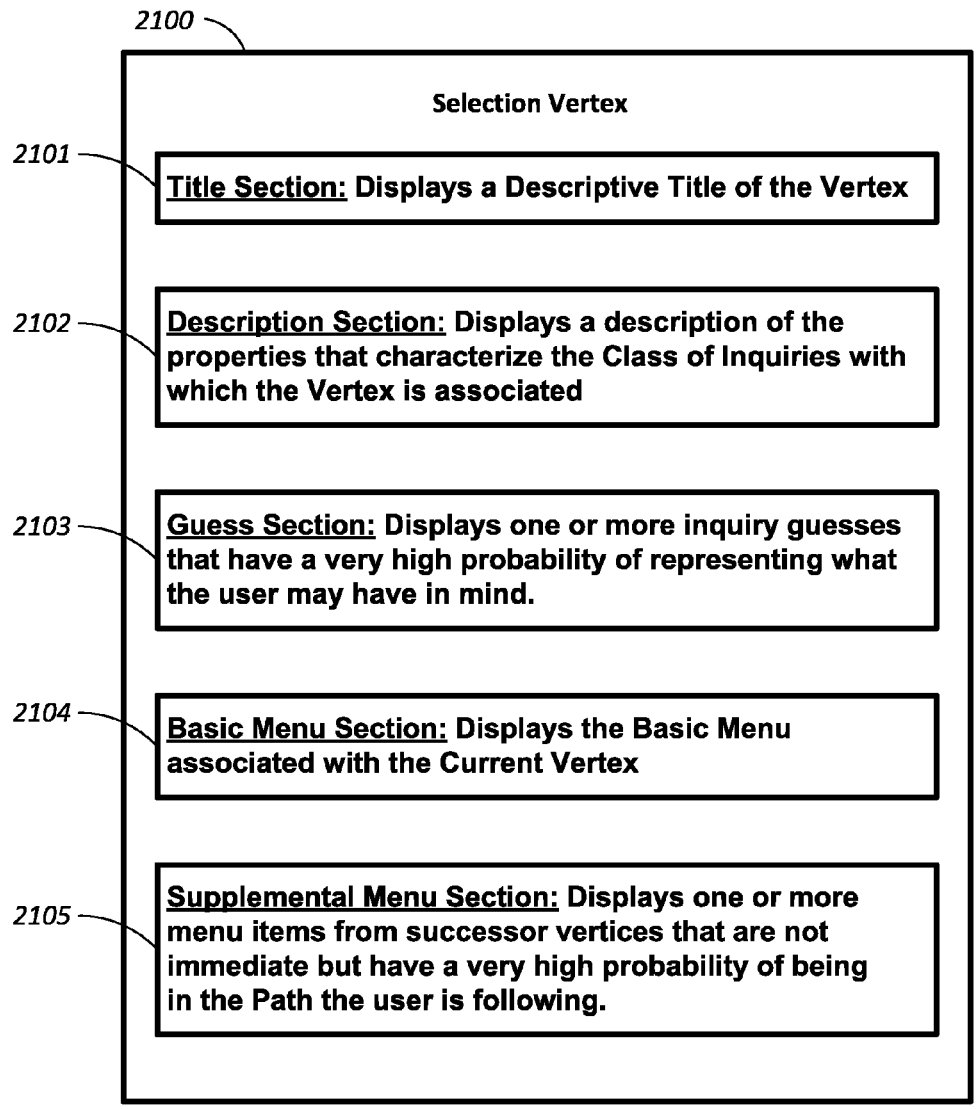
FIG. 21 shows an outline of the various sections that can be displayed in the web page for a typical Selection Vertex.
Figure 22A:
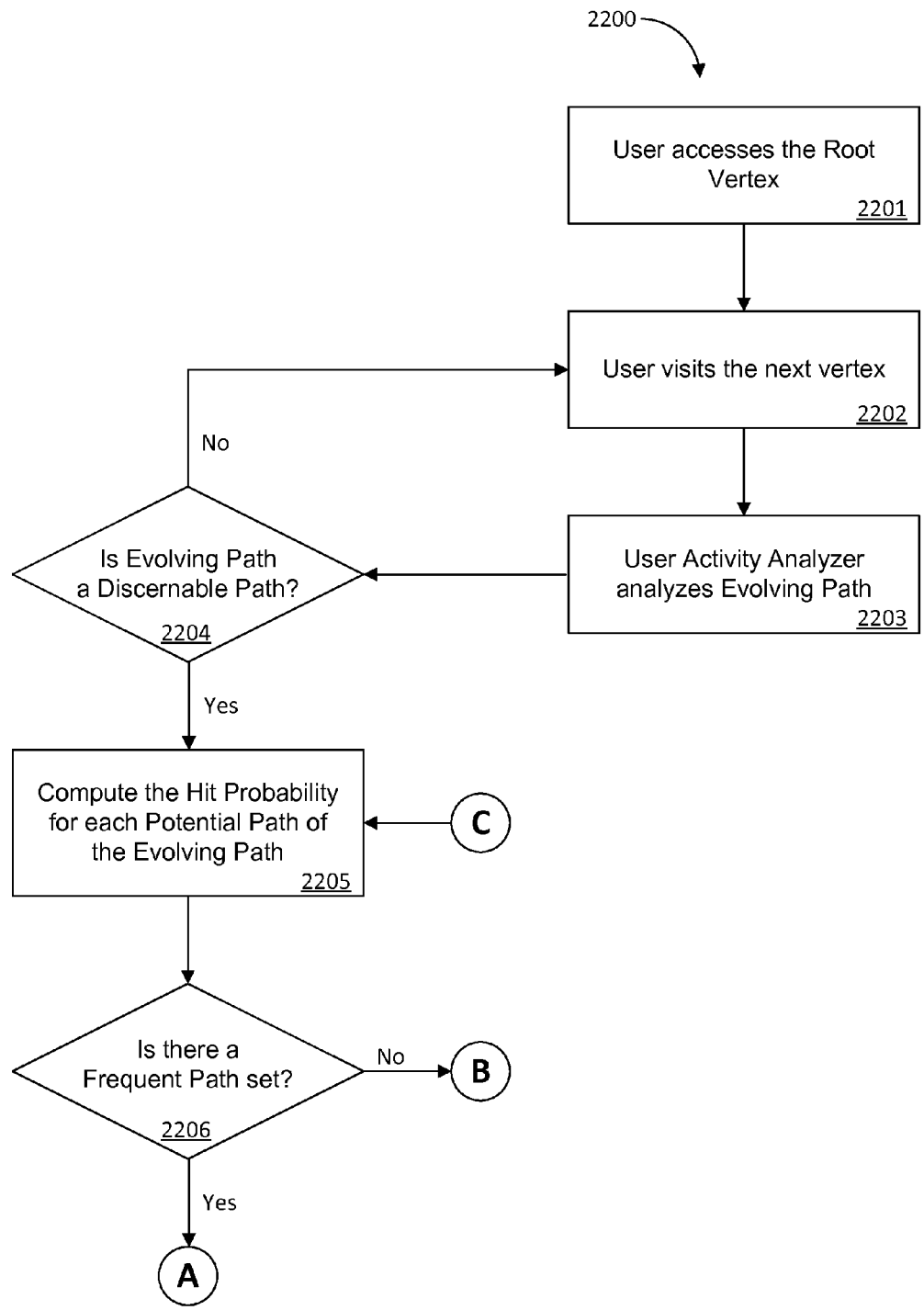
FIGS. 22A-B illustrate a preferred process that improves the search speed and ease of use of the Selection-Oriented Knowledge Base.
Figure 22B:
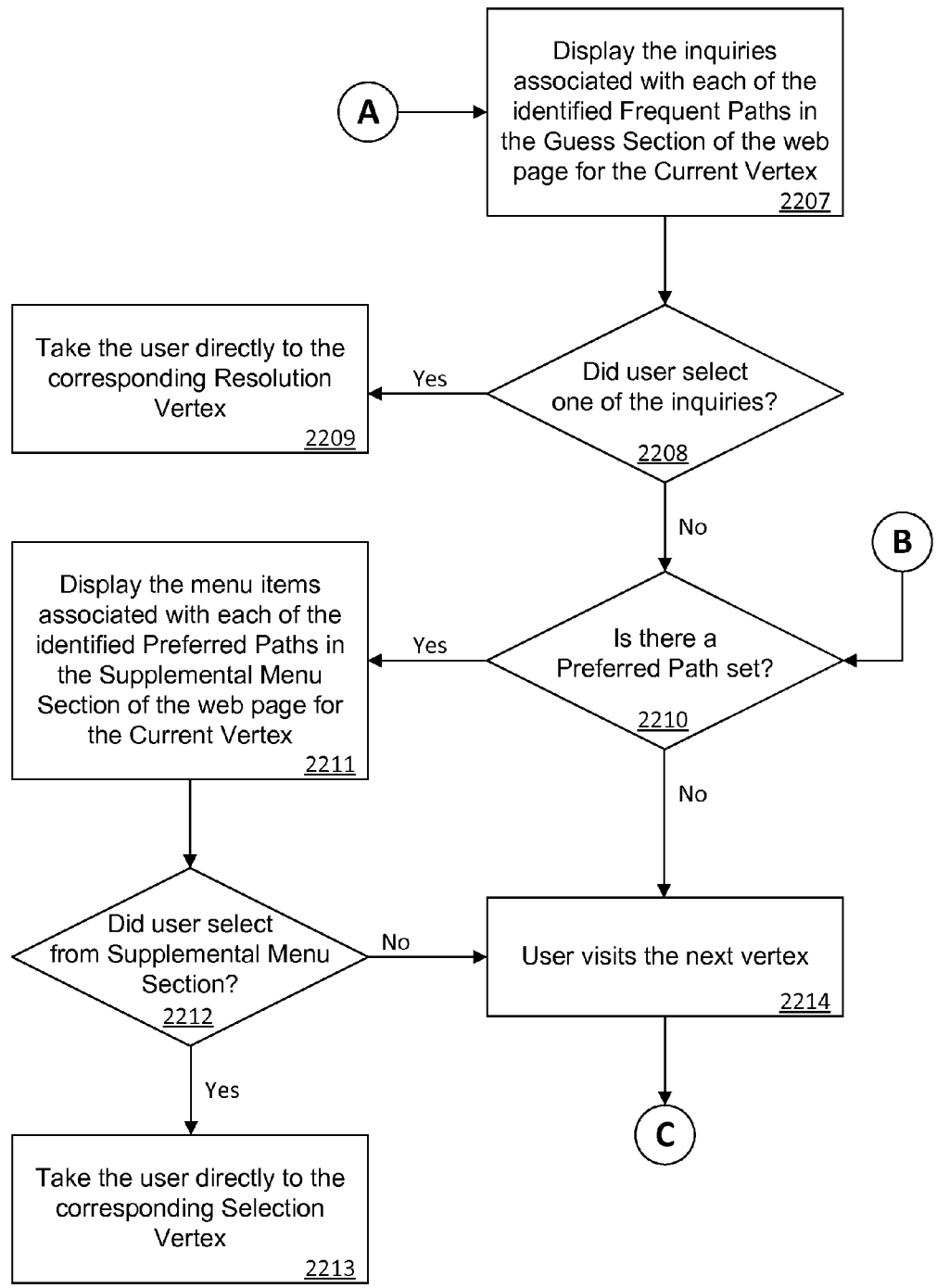

Another significant aspect of the Selection-Oriented Knowledge Base 212 relates to a method and process to improve performance in terms of search speed and ease of use. The method relies upon knowledge acquired in past States, the current State, and the Evolving Path the user is following, to make predictions about the potential Mental Object or Inquiry the user has in mind. FIGS. 21 and 22A-B help explain this method. FIG. 21 shows an outline 2100 of various sections 2101-2105 that can be displayed in the web page of a Selection Vertex. Two of these sections illustrate the following basic actions by which the search speed and ease of use can be improved:

(1) Displaying in the Guess Section 2103 of the Current Selection Vertex, one or more guesses with a very high Hit Probability of representing the Mental Object or Inquiry the user has in mind, and then letting the user accept one of the guesses or reject all guesses. These guesses are associated with Frequent Paths that may have been detected.

(2) Displaying in the Supplemental Menu Section 2105 of the Current Selection Vertex, one or more entries from the menus associated with potential successor vertices that are not immediate successors but belong to a Preferred Path that may have been detected.

FIGS. 22A-B illustrate a process 2200 to provide the aforementioned improvements in accordance with one embodiment of this invention. Starting with FIG. 22A, at step 2201 the user accesses the Root Vertex to search the Selection-Oriented Knowledge Base 212. At step 2202, the user visits the next vertex. At step 2203 the User Activity Analyzer 216 analyzes the Evolving Path. At step 2204, the User Activity Analyzer 216 determines if the Evolving Path is a Discernable Path. If step 2204 is affirmative, the process continues with step 2205, otherwise the process goes back to step 2202.

At step 2205, the User Activity Analyzer 216 computes the Hit Probability for each Potential Path of the Evolving Path. At step 2206 the User Activity Analyzer 216 determines if at least one Frequent Path Set has been detected. If step 2206 is not affirmative, the process continues with step 2210. If step 2206 is affirmative, the process continues with step 2207.

At step 2207 the Selection-Oriented Knowledge Base 212 displays, in the Guess Section 2103 of the web page for the Current Selection Vertex, a menu of the Mental Objects or Inquiries associated with each of the identified Frequent Paths. The Guess Section also displays a selection indicating that none of the displayed Mental Objects or Inquiries are applicable. In addition, the Guess Section can provide a conditional statement advising that if one of the inquiries displayed exactly reflects what the user has in mind, select that inquiry by clicking on the corresponding box. If not, click on the box corresponding to the not applicable case.

At step 2208, the User Activity Analyzer 216 analyzes the user's response to determine if the user selected one of the Mental Objects or Inquiries displayed. If step 2208 is affirmative the process continues with step 2209. At step 2209 the Selection-Oriented Knowledge Base 212 takes the user directly to Resolution Vertex associated with the selected Mental Object or Inquiry. If step 2208 is not affirmative the process continues with step 2210.

At step 2210, the User Activity Analyzer 216 determines if a Preferred Path Set has been detected. If step 2210 is not affirmative, the process continues with step 2214, where the user visits the next vertex. If step 2210 is affirmative, the process continues with step 2211.

At step 2211 the Selection-Oriented Knowledge Base 212, displays, in the Supplemental Menu Section 2105 of the web page for the Current Selection Vertex 2100, the menu items that are associated with each of the identified Preferred Paths. This Supplemental Menu Section 2105 contains a statement suggesting to the user that one of the selections in this section may represent what the user has in mind more closely than the selections in the Basic Menu Section 2104. The user can select from the Supplemental Menu Section 2105 or from the Basic Menu Section 2104.

At step 2212 the User Activity Analyzer 216, analyzes the user selection to determine if the user made a selection from the Supplemental Menu Section. If step 2212 is not affirmative, the process continues with step 2214, where the user visits the next vertex. If step 2212 is affirmative, the process continues with step 2213. At step 2213 the Selection-Oriented Knowledge Base 212 takes the user directly to the corresponding Selection Vertex. From step 2214, the process goes back to step 2205.

Figure 23:
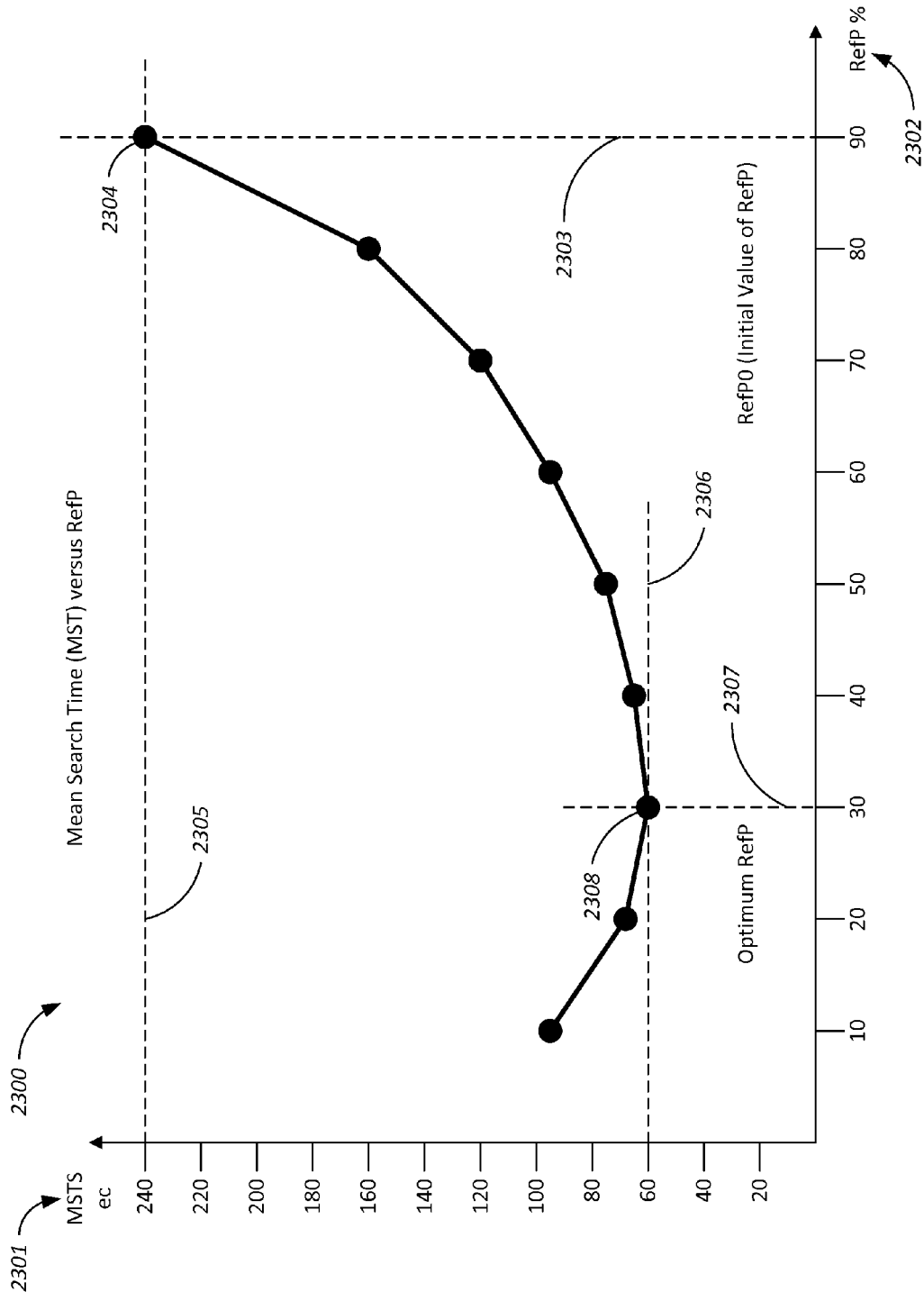
FIG. 23 shows an illustrative graph of Mean Search Time versus a configurable reference parameter, RefP.

Another significant aspect of the Selection-Oriented Knowledge Base 212, is a method by which the configurable parameter RefP can be automatically adjusted to the value Optimum RefP for which the Mean Search Time is reduced to a minimum. FIG. 23 shows an illustrative graph 2300 of Mean Search Time (MST) 2301 versus RefP 2302 which helps describe such method in one embodiment of this invention.

Initially RefP is set to a very high value, close to 100%, denoted as RefP0. For example, the value selected for RefP0 2303 can be 90% as shown in FIG. 23. After a suitable statistical sample is collected, the corresponding Mean Search Time (MST) is computed. The corresponding data point 2304 is illustrated in graph 2300 for RefP0 equal to 90% 2303 and MST equal to 240 seconds 2305. In view of the fact that RefP0 is very high, only a small number of users will experience the benefits of process 2100 to improve Search Time. However, the few users that benefit will experience very significant reductions in Search Time, because the guesses presented to these few users have a very high probability of being correct.

Next the value of RefP is decremented by a configurable value, DeltaRefP, and again a statistical sample is collected, from which a new MST is computed. Because more users are now exposed to the benefits of process 2100, it is expected that the MST will decrease. This cycle of decrementing RefP, collecting a statistical sample of Search Times, and computing MST is then repeated for as long as the value of MST continues to decrease.

Eventually, after a number of repetitions of the cycle the value of MST starts to increase. This is because users waste more time reviewing unlikely guesses than the time gained by selecting the few likely ones. This difficulty could be partially circumvented by displaying on the web page, next to each guess, the corresponding Hit Probability. Further the guesses could be sorted in descending order of Hit Probability. However such approach lacks simplicity and demands from the user a higher level of judgment, which is impractical.

The minimum Mean Search Time (MST) is represented in FIG. 23 by data point 2308. For this data point, the value of RefP 2307, called the Optimum RefP, is equal to 30% and the corresponding value of MST is equal to 60 seconds. The Selection-Oriented Knowledge Base can automatically seek this minimum by measuring MST for values of RefP above and below the suspected minimum data point 2308.

Since the value of Optimum RefP can be affected by numerous external factors, including fluctuations or changes in user behavior, the automatic seek for the minimum MST can be repeated at regular intervals to ensure that the Selection-Oriented Knowledge Base is continually operating at the highest level of search efficiency. Another efficiency monitor that can be used is a moving average of the Mean Search Time for every Path in the Navigational Library.

VII. Navigational Archive

The Navigational Archive module 214 is the repository for the navigation records of all the users that search the Selection-Oriented Knowledge Base 212. These records, which contain extremely valuable data, preferably comprise the following items:

(1) The sequence of vertices visited by the user upon each access to the Selection-Oriented Knowledge Base 212. This sequence, called a Path, starts at the Root vertex 1806 and can end on any vertex.

(2) The date and time of each access to the Selection-Oriented Knowledge Base 212.

(3) The Path Schedule expressed in terms of the arrival time at each visited vertex in the path, including the Root Vertex.

(4) The user identification provided by the user during the registration process. This is not the user's name. Users that wish to remain anonymous do not need to provide personal information during the registration process.

(5) If a "NEED HELP" request is generated by the user at a vertex, the identification of the subject vertex and the date and time of the "NEED HELP" request.

The Navigational Archive records are preferably stored in a database where they can be easily accessed for off-line and real-time analysis. The User Activity Analyzer 216, the Help Requests Predictor 218, and the people responsible for the upgrades of the Selection-Oriented Knowledge Base 212 are some of the more frequent users of the Navigational Archive 214. The Navigational Archive also provides, in combination with the Scheduled Voice Services Archive 208, very valuable information for research and analysis of customers.

As described in the previous Section, during the Learning Phase a separate State Navigational Archive is created for each State of the Learning Phase. In one embodiment of this invention, these State Navigational Archives and the adjusted copies thereof discussed in the previous Section are all part of the Navigational Archive module 214.

VIII. User Activity Analyzer

While the main purpose of the Selection-Oriented Knowledge Base 212 is to store knowledge, the main purpose of the User Activity Analyzer 216 is to analyze user activities to develop knowledge. The knowledge is developed by first capturing and identifying certain user behavioral patterns and then translating the information obtained into useful knowledge.

The data stored in the Navigational Archive module 214 and the Scheduled Voice Services Archive module 208 is analyzed by the User Activity Analyzer 216 to produce information that can be used by the Knowledge Base Manager 210 to improve the performance of the Customer Service Management System 102. The analysis can be classified into two basic categories: off-line and real-time. The analysis can be tailored for each organization operating a Customer Service Management System 102, although it should be similar for organizations in the same type of business.

The information produced by off-line analysis can encompass a large number of items, some of which are:

(1) Distributions of the number of Selection-Oriented Knowledge Base accesses in the calendar time domain. Examples are: the number of accesses for each hour of the day, day of the week, and week of the year, all expressed versus time. This item serves as a monitor of the customer service activity processed by the Customer Service Management System.

(2) Distributions of the number of "NEED HELP" requests for the entire Selection-Oriented Knowledge Base in the calendar time domain. Examples are: the number of "NEED HELP" requests for each hour of the day, day of the week, and week of the year. This item serves as a monitor of the performance of the Customer Service Management System. As the Selection-Oriented Knowledge Base evolves from State to State, the number of "NEED HELP" requests should decrease significantly.

(3) Distributions of the frequency of "NEED HELP" requests in the time and vertex domains. Examples are: the frequency of "NEED HELP" requests for each individual vertex, expressed in requests per minute, hour, or day. This item can be used for a variety of purposes; in particular it can be used to select vertices to be Tagged for upgrade as described in Section VI.

(4) Distributions of the length of the voice service session associated with each "NEED HELP" request in the vertex domain. Examples are: the length of the voice service session associated with a "NEED HELP" request for each individual vertex. This item can be used by the Customer Service Scheduler 204 to estimate the number of agents required to maintain the response to "NEED HELP" requests below the Maximum Acceptable Response Time (MART).

(5) Distribution of outcomes for each search of the Selection-Oriented Knowledge Base in the calendar time domain. These outcomes can be expressed as a successful search without the use of a "NEED HELP" request, a successful search with the use of a "NEED HELP" request, an unsuccessful search, and an abandoned search.

(6) Distributions of Navigational Path usage in the Navigational Path domain.

(7) Distributions of Path Schedules in the Navigational Path domain.

(8) Distributions of NEED HELP requests in the Vertex domain.

The information produced by real-time analysis can also encompass a large number of items, some of which are:

(9) Potential Path identification whereby the Evolving path is compared with Navigational Paths from the Navigational Library to identify those for which the Evolving Path is a Proper Sub-Path.

(10) Discernable Path recognition, whereby the Evolving path is analyzed to determine if it is a Discernable Path.

(11) Frequent Path detection whereby each Potential Path of the Evolving Path is tested to determine if it is a Frequent Path.

(12) Preferred Path detection whereby each Potential Path of the Evolving Path is tested to determine if it is a Preferred Path.

(13) Prediction of the Path Schedule of a Potential Path whereby the Path Schedule associated with the Evolving Path is compared with the distribution of the Path Schedules of that Potential Path to identify the most likely Path Schedule the user is following.

(14) Computation of priority for a NEED HELP request. As described in Section III with reference to step 409 of process 400, this computation is used to determine if a user has earned sufficient priority to qualify for a priority call from a customer service agent.

As discussed in Section VI, a significant aspect of this invention is the seamless integration of the Selection-Oriented Knowledge Base and the customer service agent to resolve user's Mental Objects or Inquiries. This is accomplished by the NEED HELP request which allows the customer service agent to take over, almost instantly, after the Selection-Oriented Knowledge Base runs out of resources to address the user's Mental Object or Inquiry. More precisely, it is the Selection-Oriented Knowledge Base that NEEDS HELP to resolve the Mental Object or Inquiry. The NEED HELP button is also used as an incentive for users to resolve their Mental Objects or Inquiries by making an honest effort to search the Selection-Oriented Knowledge Base. The incentive algorithm rewards the users that make the biggest effort by responding faster to their NEED HELP requests. At the same time, the algorithm must protect the Selection-Oriented Knowledge Base from abuse by unscrupulous users. For example, a user could access the Selection-Oriented Knowledge Base, visit one vertex and immediately click the NEED HELP button without trying to resolve the Mental Object or Inquiry.

The algorithm requires a quantifiable measure of the amount of effort made by the user to search the Selection-Oriented Knowledge Base. This quantifiable measure, called the Search Effort, is first translated by the algorithm into a priority level, which is then used by process 400 to make the decision associated with step 409.

In one embodiment of this invention, the Search Effort is measured in terms of the number of vertices visited and the total time spent to reach the Current Vertex, in accordance with the formula:

Search Effort=[Evolving Path Length]*(1+[Current Search Time]/[Mean Search Time])

The range of anticipated values for the Search Effort is divided into contiguous sub-ranges which can be mapped one-to-one to a finite set of priority levels. These priority levels can then be mapped one-to-one to priority service queues managed by the Service Agents Scheduler 206. Table 2400 of FIG. 24 provides an illustration of such mapping. This table assumes a typical search time of 15 seconds per vertex and is based on the case where the Current Search Time is equal to the Mean Search Time. Under these conditions, the Search Effort becomes equal to twice the number of vertices visited.

Row 2401, shows the Search Effort sub-ranges, from less than 10 to over 80. Row 2402 shows the typical number of vertices visited by the user at the time the NEED HELP button is clicked. Row 2403 shows the typical search times ranging from less than 1 minute and 15 seconds to over 10 minutes. Row 2404 shows the priority levels ranging from L1 to L6. The Search Efforts of row 2401 are mapped to these priority levels. Finally, row 2405 shows the priority service queues that are mapped to the various priority levels. Each of these queues is characterized by a Maximum Acceptable Response Time (MART) to a NEED HELP request. As explained in Section IX, these queues are adequately staffed to ensure that the MART specification is respected.

When the priority level is equal to L1, the user does not qualify for service under one of the priority queues as indicated by the "Not Applicable" label on row 2405 of table 2400. This is to preclude abuse of the NEED HELP button to circumvent scheduling a voice service session in accordance with process 400 of FIG. 4. As shown in step 409, the Service Agents Scheduler 206 needs a priority value to determine if the user qualifies for the NEED HELP request. If affirmative the user is assigned to the priority queue corresponding to the priority level earned. If not affirmative, the user is directed to Customer Service Scheduler 204 to schedule a voice session with a customer service agent.

As the Selection-Oriented Knowledge Base evolves over time, it is expected that the User Activity Analyzer 216 will also evolve with new types of analysis that may be needed to address new situations that may be encountered in the many potential deployments of the Customer Service Management System.

IX. Help Requests Predictor

The Help Requests Predictor 218 is a module that predicts forthcoming NEED HELP requests. As mentioned previously, this module uses the analysis generated by the User Activity Analyzer 216 to predict, in real-time, the probability that a user will generate a "NEED HELP" request at a given vertex as the user navigates through the Selection-Oriented Knowledge Base 212. This probability is used by the Help Requests Predictor 218, to generate a look-ahead demand matrix of the anticipated agents needed versus Vertex and time. This matrix can be updated frequently and then transmitted to the Service Agents Scheduler 206 which can alert Agents-On-Demand to be ready to promptly reply to anticipated "NEED HELP" requests.

One significant aspect of the Help Requests Predictor is a NEED HELP Probability Database (NHPD). For each Successor Vertex of each Potential Path of each possible Evolving Path, the NEED HELP Probability Database stores a pair of values (P, RT) for the variables P and RT. The variable P represents the probability that a NEED HELP request will occur at that Successor Vertex. The variable RT represents the relative time expressed in Relative Time Units (RTU) during which the potential NEED HELP request is expected to occur relative to the Current Time at the Current Vertex.

The three parameters, Evolving Path, Potential Path, and Successor Vertex, constitute a three dimensional matrix, designated as the EP/PP/SV space for the convenience of this description. Each point of this space can be derived from the topology of the Selection-On-Vertex network, once that topology is established.

The probability P associated with each point of the EP/PP/SV space can be derived from statistical analysis of the data stored in the Navigational Archive. The time RT can be estimated by two simple operations. The first operation is adding the following two values:

(1) The Mean Search Time (MST) of the Successor Path associated with the subject point of the EP/PP/SV space.
(2) The Mean NEED HELP Generation Time (MNHGT) associated with the subject point of the EP/PP/SV space.

The second operation is to convert the above sum into Relative Time Units (RTU) to obtain the value of RT.

To illustrate, assume the Evolving Path is EP1355, the Potential Path is PP93, and the Successor Vertex is V36. Assume further that RT is measured in Time Units of 10 seconds, such that (RT=1) represents the segment from 1 to 10 seconds, (RT=2) represents the segment from 11 to 20 seconds, (RT=3) represents the segment from 21 to 30 seconds, etc. An example of the pair of variables stored in the NEED HELP Probability Database for the point (EP1355, PP93, V36) is (0.00137, 3), indicating that during Time Unit (RT=3) (from 21 to 30 seconds) there is a 0.137% probability that a NEED HELP request will be generated at Vertex V36. If the Mean Search Time (MST) is 17 seconds and the Mean NEED HELP Generation Time (MNHGT) 9 seconds, the sum of these two times is 26 seconds, which falls between 21 and 30 seconds and equates to a value of 3 for the variable RT.

For speed of execution, the EP/PP/SV space can be mapped onto another three dimensional space, called the EP/RT/SV space, in which the parameter Potential Path is replaced by the relative time RT. This mapping can be performed by executing the following process for each (Evolving Path, Successor Vertex) pair:

(1) In the EP/PP/SV space, identify the set of all the points for a given (Evolving Path, Successor Vertex) pair. Each of these points corresponds to a different Potential Path and is associated with a pair of values (P, RT).
(2) Partition the identified set of points into disjoint subsets such that each subset contains all the points with the same value of RT.
(3) For each subset calculate the sum SP of all the values of P in the subset.
(4) In the EP/RT/SV space, associate with the point defined by the given Evolving Path, Successor Vertex, and the value of RT corresponding to the subject subset, the sum SP calculated above.

Figure 25:
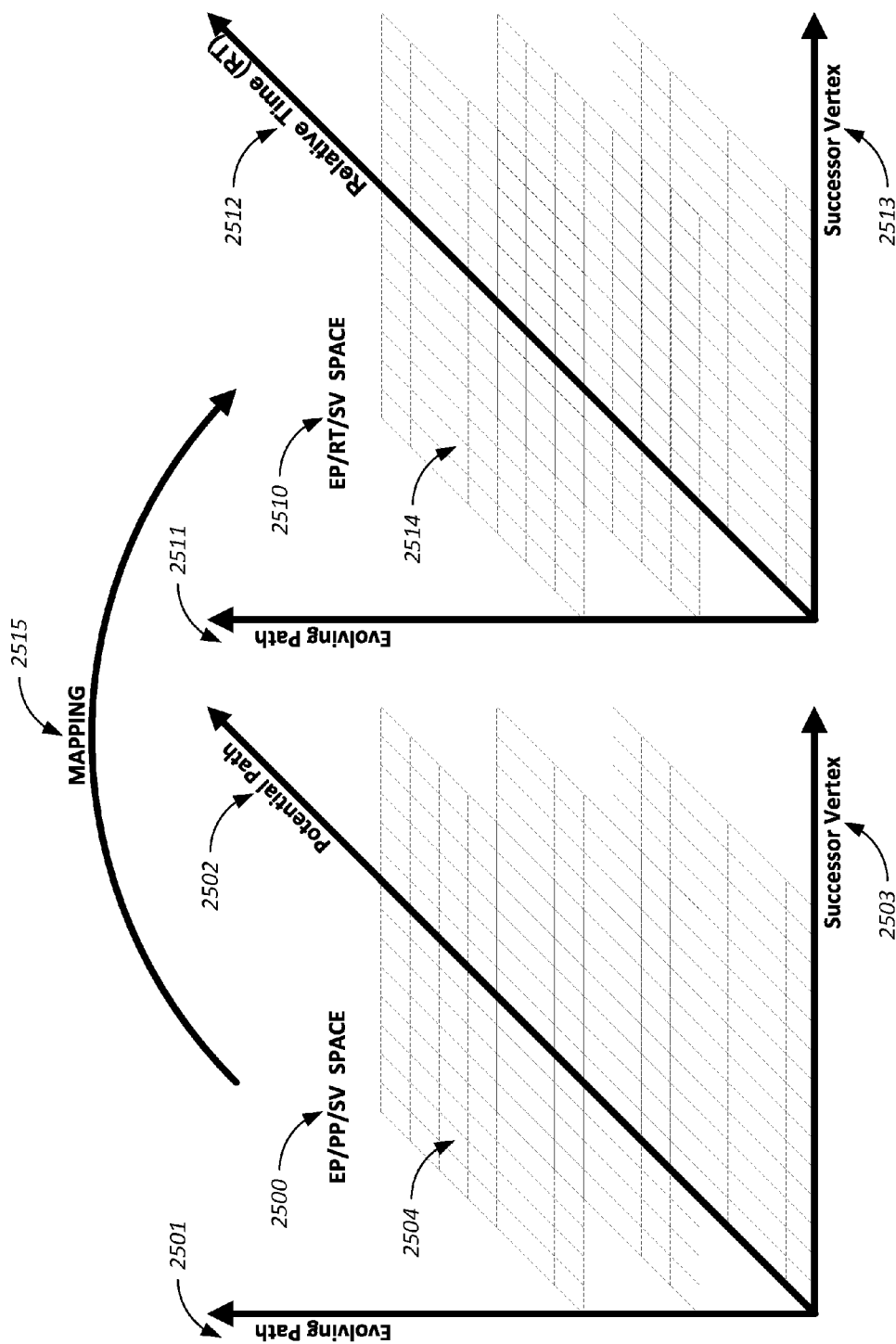
FIG. 25 illustrates the mapping of the EP/PP/SV space onto the EP/RT/SV space.

FIG. 25 shows an illustration of the above mapping. On the left, the EP/PP/SV space 2500 is defined by the parameters Evolving Path 2501, Potential Path 2502, and Successor Vertex 2503. On the right, the EP/RT/SV space 2510 is defined by the parameters Evolving Path 2511, Relative Time (RT) 2512, and Successor Vertex 2513. FIG. 25 also shows on the left several (Potential Path/Successor Vertex) planes 2504 and on the right several (Relative Time (RT)/Successor Vertex)

planes 2514, which represent two dimensional matrices. The mapping 2515 uses the mapping function defined above to map the EP/PP/SV space 2500 onto the EP/RT/SV space 2510.

The EP/RT/SV space 2510 includes all the possible combinations of the parameters Evolving Path, Successor Vertex, and RT, and for each combination provides the sum SP of the probabilities that a NEED HELP request will be generated. The EP/RT/SV space 2510 is a quasi-static space which remains constant between periodic updates of the EP/RT/SV space. Such periodic updates depend upon the rate of change of the data in the Navigational Archive. If the new data cumulated since the last update is comparable to the previous data, monthly updates may be adequate. Otherwise, weekly, daily, or more frequent updates may be necessary.

Figure 26:
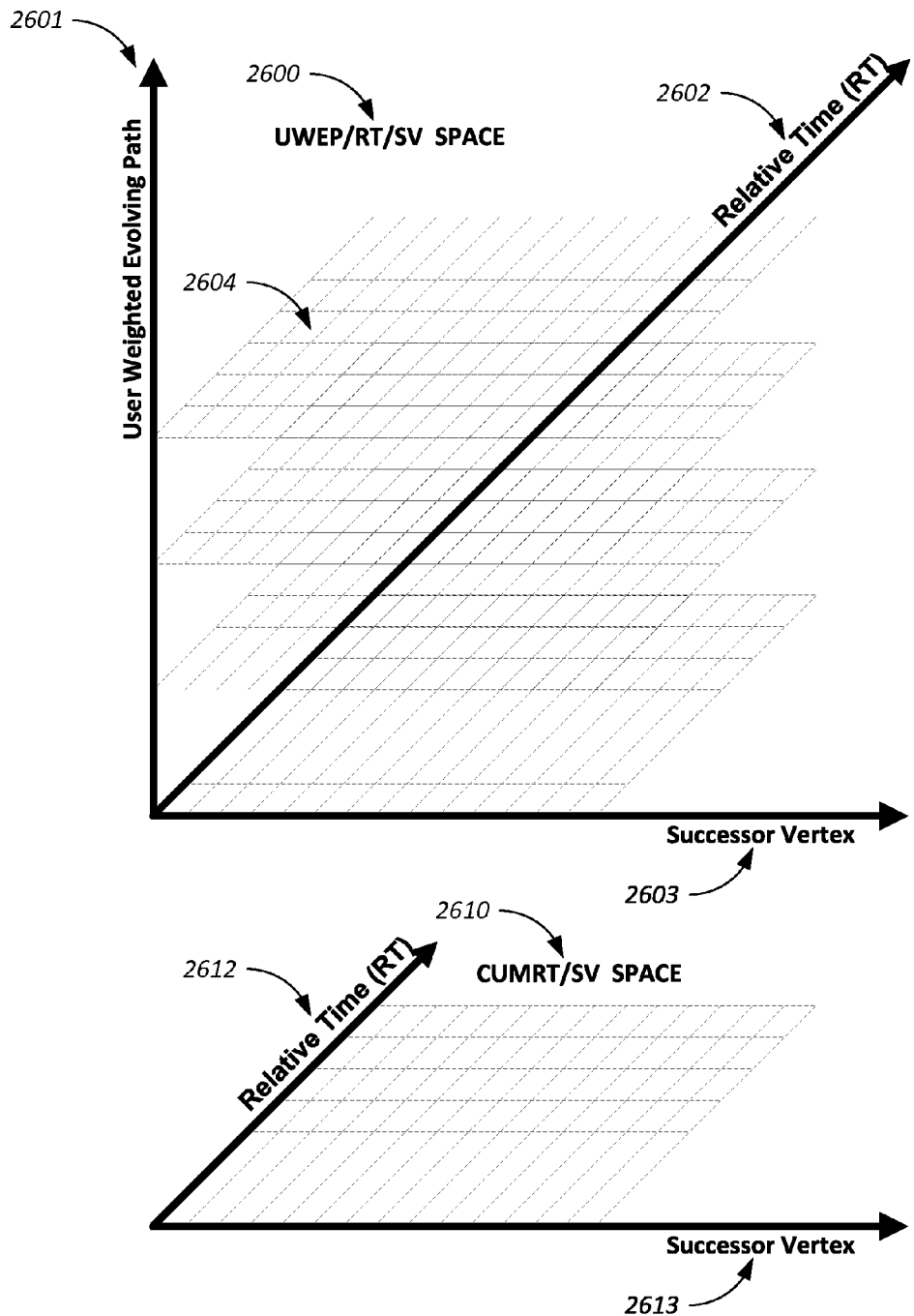
FIG. 26 illustrates the UWEP/RT/SV space and the CUMRT/SV space.

The prediction of NEED HELP requests for all active users searching the Selection-Oriented Knowledge Base in real-time, can be performed by a User-Weighted dynamic version of the EP/RT/SV space. FIG. 26 illustrates this space called UWEP/RT/SV space 2600, which is also a three dimensional matrix. Each User-Weighted Evolving Path on this space is associated with two items. The first is a list containing the identification of every active user currently on that User-Weighted Evolving Path. The second is the count of the number of users on the list, called the Weight of that User Weighted Evolving Path.

As each user moves from one Vertex to the next, the identification of that user is transferred from the list associated with the previous User Weighted Evolving Path to the list associated with the new User Weighted Evolving Path. In addition, the Weight of the previous User Weighted Evolving Path is decremented by one and the Weight of the new User Weighted Evolving Path is incremented by one.

FIG. 26 shows the UWEP/RT/SV space 2600, the User Weighted Evolving Path 2601, the Relative Time (RT) 2602, the Successor Vertex 2603, and several (Relative Time/Successor Vertex) planes 2604. The complete set of all the (Relative Time/Successor Vertex) planes constitutes a three dimensional matrix. A vertical column in this matrix contains, in each plane, the sum SP associated with the respective pair of values (Relative Time, Successor Vertex) for all the possible User Weighted Evolving Paths.

FIG. 26 also shows a two dimensional space designated as CUMRT/SV space 2610, the associated Relative Time (RT) 2612 dimension, and the associated Successor Vertex 2613 dimension. This space constitutes a two dimensional matrix in which each element is the weighted sum of the corresponding column in the UWEP/RT/SV space 2600. Such weighted sum is computed by summing, over the column, the values of SP multiplied by the Weight of the respective User Weighted Evolving Path.

The CUMRT/SV space is a complete representation of the sum of probabilities for NEED HELP requests in the (Relative Time/Successor Vertex) domain. The elements of the associated two dimensional matrix are sums of probabilities which represent the expected demand, called Demand Factor, for customer service agents at that Relative Time and Successor Vertex.

To illustrate, assume that for a RT=6 RTU and Successor Vertex=SV237, the entry is Demand Factor=4.38. This Demand Factor can be expressed by the sum (1+1+1+1+ 0.38). In this sum each value 1 can be interpreted as representing a sum of probabilities that is equal to 1, indicating that one agent is expected to be needed to service the users associated with the probabilities in that sum. With respect to the value 0.38 it can be interpreted as indicating that 0.38 agents are necessary to satisfy this portion of the Demand Factor. Depending upon the circumstances, the Service Agents Scheduler 206 may determine that an addition agent is required to satisfy this portion of the Demand Factor. Alternatively, the Service Agents Scheduler 206 may combine this portion of the Demand Factor with portions of Demand Factors associated with other elements of the matrix with the same Relative Time, to allocate an additional agent.

As users navigate through the Selection-Oriented Knowledge Base they progress from one User Weighted Evolving Path to another in the UWEP/RT/SV space 2600. In this space, each (Relative Time/Successor Vertex) plane 2604 provides a complete matrix of the probabilities that a user currently listed on the corresponding User Weighted Evolving Path will generate a NEED HELP request at a possible Successor Vertex during some future Relative Time Unit (RTU).

The transfers of user identifications from one User Weighted Evolving Path to another and the updates of the respective Weight of each User Weighted Evolving Path are executed at regular intervals. The interval, called Update Interval, is used to synchronize the computation, as explained below with reference to FIG. 26.

The CUMRT/SV space 2610 needs to be frequently updated to reflect asynchronous movements of active users from one Vertex to another. In one embodiment of this invention, the update is performed at the end of each consecutive Update Interval using two buffers denoted "Update Buffer A" and "Update Buffer B" to facilitate this description. During one Update Interval, all the user movements received by the Web Server 104 are stored by the Help Requests Predictor 218 in "Update Buffer A" to be executed at the end of that Update Interval. During the next Update Interval, all the user movements received by the Web Server 104 are stored by the Help Requests Predictor 218 in "Update Buffer B" to be executed at the end of that Update Interval.

While "Update Buffer A" is receiving data, the user movements in "Update Buffer B" are processed to update the CUMRT/SV space 2610. This processing involves the following four steps:

(1) Reflect each user movement in the UWEP/RT/SV space 2600 by adding that user's identification to the new User Weighted Evolving Path and deleting it from the old one.
(2) Compute the revised Weight of each User Weighted Evolving Path.
(3) Perform the calculation of the weighted sum of each column in the matrix of UWEP/RT/SV space 2600.
(4) Empty the corresponding Update Buffer.

At the end of the Update Interval, "Update Buffer B" starts receiving data while the data stored in "Update Buffer A" is processed. The Update Interval between consecutive updates of the CUMRT/SV space 2610 needs to be longer than the time required for the execution of the four steps listed above. As a practical matter, the Update Interval can be at least 10 seconds because the Service Agents Scheduler 206 does not need more accurate forecasts to operate efficiently. The Update Interval can be a configurable parameter which can be optimized for each specific implementation.

X. Service Agents Scheduler

The Service Agents Scheduler 206 is the module that coordinates and manages customer service agents and schedules their activities. As mentioned previously, one aspect of this invention, relates to the use of multiple Priority Queues whereby the number of agents assigned to each Priority Queue is adjusted dynamically to ensure that the response time for each Priority Queue does not exceed a critical configurable limit associated with that Priority Queue, called the Maximum Acceptable Response Time (MART).

FIG. 27 shows a table 2700 that exemplifies how the Priority Queues are coordinated with the various activities requiring the support of customer service agents. The first two rows are title rows that identify and characterize the six Queues used in this example. Row 2701 shows the Queues identified by level, from L1 to L6. Level L1 is considered a low priority queue and Level L2 through Level L6 are all considered high priority queues. Row 2702 shows the Maximum Acceptable Response Time (MART) for each Priority Queue. In this example the MART for the low priority queue, L1, is intentionally set to a long period, 30 minutes in this example, whereas the MARTs for the high priority queues L2 through L6 range from 90 seconds to 15 seconds respectively. The idea behind this strategy is to provide the flexibility necessary to adjust to large fluctuations in demand by occasionally sacrificing the response time of the low priority queue, while maintaining the fast response of the high priority queues. In practice this strategy can work well because a very large percentage of the users will take advantage of the automated features of the Customer Service Management System and qualify for the high priority queues. The small remaining percentage of the users that do not take advantage of the automated features of the Customer Service Management System are not concerned about fast responses and are not likely to object to a longer wait on the phone, on hold. So long as the response time of queue L1 is below 30 minutes, the Service Agents Scheduler 206 is allowed to allocate agents from queue L1 to other queues, as needed, to comply with the MART specifications of the high priority queues. This allocation process is general and encompasses all queues, whereby agents can be dynamically moved from one queue to another as necessary to ensure that all queues are within the respective MART specification. The allocation is dynamically performed by the Service Agents Scheduler 206 in real-time.

Row 2703, relates to those customer service voice sessions that have been scheduled by users through the web site 106 in accordance with steps 521-528 (see FIG. 5B) of process 500. These sessions are scheduled to start at a specific time and need to be serviced promptly as scheduled. To comply with this requirement they are allocated to the highest Priority Queue, L6, with a MART of 15 seconds.

Row 2704 relates to those customer service voice sessions that have been scheduled by users through the web site 106 in accordance with steps 541-551 (see FIG. 5C) of process 500. These sessions are scheduled to start shortly after the user clicks the "I AM READY" button. To comply with this requirement they can be allocated to Priority Queues L3 through L5 which have MART values ranging from 60 to 30 seconds.

Row 2705 relates to those customer service voice sessions that have been scheduled by users through the web site 106 in accordance with steps 561-563 (see FIG. 5D) of process 500. These sessions have a relatively long time segment during which they may be addressed by a callback and can be allocated to any of the Priority Queues L1 through L6 at the convenience of the Customer Service Scheduler 204. When the selected time segment for a particular session is reached, in real-time, the Customer Service Scheduler 204 may upgrade that session to higher priorities to ensure that it is addressed before the end of the specified time segment.

Row 2706 relates to those customer service voice sessions that have been scheduled by users through the web site 106 in accordance with steps 571-577 (see FIG. 5D) of process 500. These are FAST TRACK sessions that require a callback shortly after they are scheduled. To comply with this requirement they can be allocated to Priority Queues L3 through L5 which have MART values ranging from 60 to 30 seconds.

Row 2707 relates to NEED HELP requests generated by users searching the Selection-Oriented Knowledge Base. As described in Section VIII, these requests are allocated to one of the Priority Queues L2 through L6, in accordance with the Search Effort made by the user.

Row 2708 relates to unscheduled customer service voice sessions requested by users that do not wish to use the scheduling system and decide to wait on the phone until a customer service agent is available. These sessions are preferably allocated to Priority Queue L1 with a MART of 30 minutes. As mentioned previously, these users are not likely to object to the wait since that is what they elected to do. During periods of average demand the wait will tend to be shorter than that associated with conventional call centers because the Customer Service Management System processes the workload much faster. However during periods of peak demand the wait may be longer because fewer agents are allocated to the low priority queue to ensure that the high priority queues all operate within specifications.

Based upon statistical analysis of the data stored in the Navigational Archive 214, the Scheduled Voice Services Archive 208, and the Unscheduled Voice Services Archive 222, the Customer Service Manager 202 can develop reasonable projections of the total number of agents needed to meet the allocations of table 2700. These projections can be detailed to include the agents required by each Priority Queue for each hour of the day, day of the week, and week of the year. If applicable, such projections can also detail the type of agent in terms of topic of expertise. The topic of expertise can be expressed by the Vertices of the Selection-On-Vertex network for which the agent is certified to provide assistance to users. Preferably, most implementations maintain a matrix of agents versus the vertices for which each agent is certified. This matrix is used by the Service Agents Scheduler 206 to ensure that a qualified agent is allocated to each case.

One aspect of this invention relates to the use of two types of agents to minimize the labor costs associated with customer service agents and adjust to demand fluctuations in real-time. The first type, called Regular Agent, is the agent that works a regular schedule and is paid for the scheduled time. The second type, called Agent-On-Demand, is the agent that signs up, on short notice, for time segments that need to be covered and is paid for the time-segments worked. Agents-On-Demand need to be registered with the Service Agents Scheduler 206, and be certified in at least one vertex.

Figure 28:
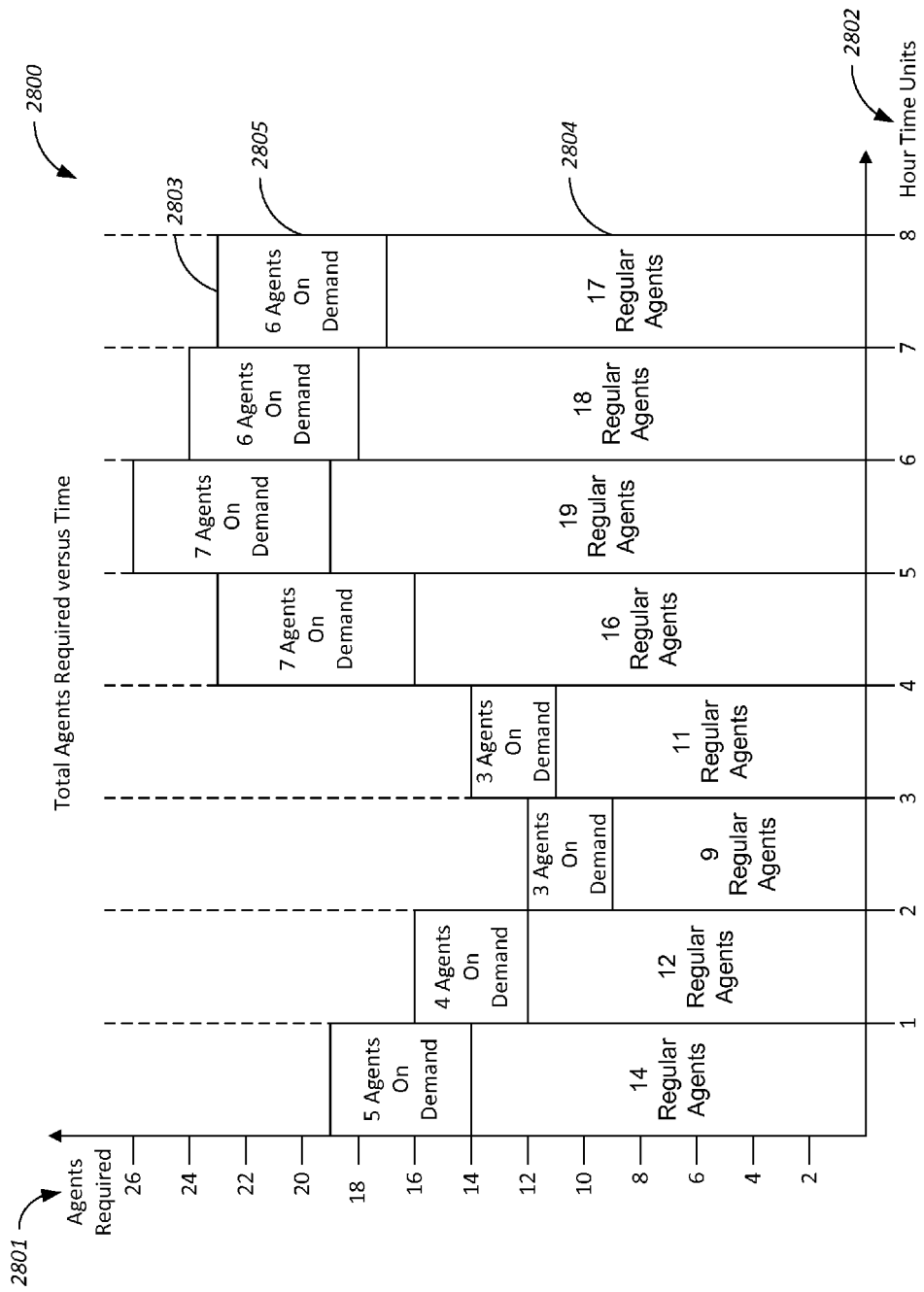
FIG. 28 depicts an illustrative graph of the number of Regular Agents and Agents-On-Demand versus time, expressed in Hour Time Units.

In one embodiment of this invention, the scheduling of the two types of agents is coordinated in accordance with a method described with reference to FIG. 28. This figure shows an illustrative plot 2800 of Agents Required 2801, during each time segment of one hour, versus time expressed in Hour Time Units 2802.

To ensure that a sufficient number of agents will be available for a particular time segment, the total number of Agents Required per vertex can be set to the expected value derived from statistical analysis of historical data plus the margin of error of that expected value. Of the total number of Agents Required per vertex, a number equal to the expected value minus the margin of error can consist of Regular Agents and a number equal to twice the margin of error can consist of Agents-On-Demand. In these computations, the numbers for both types of agents are rounded to the ceiling of the computed value.

Using this method, the Regular Agents have nearly 100% probability of being continuously busy despite the finite margin of error. The Agents-On-Demand, which are not expected to work continuously, cover the margin of error. In the example of FIG. 28, the time segment for Hour Time Unit 8, which covers the time segment from 7 to 8, requires a total of 23 agents 2803 consisting of 17 Regular Agents 2804 and 6 Agents-On-Demand 2805.

The Agents-On-Demand can sign up for specific time-segments that need to be covered. FIG. 29 shows an example of a web page 2900 that can be used for Agents-On-Demand to sign up for these time segments. It displays the title of the web page 2901, a statement explaining the purpose of the web page 2902, an explanation of the compensation schedule 2903, a statement explaining how to sign up 2904, and a window with a real-time map of time slots that need to be covered 2905.

The window 2905 contains a field for the current date and time 2906, buttons for time axis zoom 2907, a time axis 2908, a scroll bar 2909, and displays the time map with a row of cross hatched time segments that need to be covered by Agents-On-Demand 2910. In this example the time segments are 15 minutes in duration. However, the duration of the time segments is preferably a configurable parameter that is adjusted for each specific set of circumstances. In addition, the window 2905 shows three rows labeled "B" 2911, "C" 2912, and "D" 2913 that display the applicable components of the compensation schedule for each time segment.

The Agents-On-Demand that wish to sign up for time segments to be serviced after receiving an alert from the Service Agents Scheduler 206, need to logon to the Customer Service Management System Web Site 106, click on the desired time slots to select them, and click on the SIGN UP button 2914 to confirm their selections.

Preferably, the compensation of the Agents-On-Demand is based upon an algorithm that provides the needed incentive to ensure best performance at minimum cost. In this example the web page displays for each of the time segments shown, the base compensation, the premium for each call serviced, and the premium for each minute of calls serviced. This algorithm has the flexibility to automatically adjust the three components of the compensation such as to optimize the incentive. Based upon this algorithm, agents are motivated not to extend the service calls beyond a reasonable limit as it could be the case if the compensation was based strictly on call duration. Agents are also motivated to spend sufficient time with the customer which might not be the case if the compensation was based strictly on the number of service calls. The Service Agents Scheduler 206 can maintain a data base of the number of agents who sign up for time slots versus the three components of the compensation, the time of the day, and the day of the week. From this data base, the Service Agents Scheduler 206 can develop the required function expressing the number of agents that sign up for time slots versus each the three components of compensation for the various times of the day and days of the week. This function can then be used to automatically adjust the compensation components.

The Agents-On-Demand can pre-register for periods of time during which they may be interested in signing up for potential time segments to be serviced. The Agents-On-Demand can also be equipped with a paging device through which the Service Agents Scheduler 206 can alert these agents that certain time segments in the forthcoming hours need to be filled. The Service Agents Scheduler can display updates of the Agents-On-Demand sign up web page at regular pre-specified times such as every hour on the hour.

The service agreement for Agents-On-Demand can provide for these agents to have their computer continuously logged on to the Customer Service Management System Web Site 106 during the time segments for which they signed up. Further the agents must be available to receive and acknowledge instructions that may be provided to them via their Web Browser 142. Such instructions can include all the pertinent information about the customer to be serviced and the precise time of the call.

After the agent acknowledges receipt of the instructions, the Customer Service Scheduler 204 can automatically place the call on the behalf of the agent. If the call is answered by the customer, the agent conducts the service session and enters the required information on the web browser. If the customer does not answer the call, the agent reports on the web browser the unsuccessful attempt to reach the customer and waits for further instructions.

XI. Voice Services Archives

In one embodiment of this invention, the Customer Service Management System 102 maintains two archives to store relevant information pertaining to customer service voice sessions.

The first is the Scheduled Voice Services Archive 208 which stores information related to customer service voice sessions associated with the intelligent coordination of the Customer Service Management System. These voice sessions include those scheduled in accordance with process 500 of FIG. 5A and those predicted by the Help Requests Predictor 218, as shown in the following list:
 (1) Sessions with a specific start time.
 (2) Sessions set for an "I Am Ready" callback within a specified time segment.
 (3) Sessions set for a callback any time within a specified time segment.
 (4) Sessions associated with Fast-Track callbacks.
 (5) Sessions associated with NEED HELP requests.

The second is the Unscheduled Voice Services Archive 222 which stores information related to traditional calls received by a toll free number from customers that decide to wait on the phone until a customer service agent is available.

The two archives are intentionally kept separate to preserve the integrity of statistical analysis of the data stored in the Scheduled Voice Services Archive 208, in which the customer service voice sessions are associated with the intelligent coordination of the Customer Service Management System.

XII. Distributed Customer Service Centers

Another aspect of this invention relates to Distributed Customer Service Centers whereby the agents can operate from any location, including agents operating from their own home. The Distributed Customer Service Centers can include any number of distinct Customer Service Centers and any number of agents working from home.

Preferably each agent is equipped with a computer and a Voice Over IT type phone to facilitate communication with the Customer Service Management System through the web server 104. This configuration also improves the integration of the customer service agents with the various modules of the Customer Service Management System with which the agents need to interact.

The Distributed Customer Service Centers can resort to several neglected sectors of the educated labor force, such as housewives and retires, that may enjoy working from home, to staff agent positions.

XIII. Collaborative Customer Support Centers

Another aspect of the invention relates to Collaborative Customer Support Centers. In accordance with this aspect, groups of service agents can be cross-trained, organized, and coordinated to provide customer service and technical support for multiple brands of products of the same type.

Preferably, service agents that provide technical support are organized in teams of experts whereby each team specializes in at least one category of products or equipment. Since different brands of a given category of products or equipment tend to share many similarities, it is cost-effective to cross train support technicians to support a variety of brands. The Customer Service Management System 102 can provide a special applications program to coordinate the operation of Collaborative Customer Support Centers, whereby a plurality of participating providers of a given type of product or equipment share a pool of technical support technicians. The larger the number of participants the more efficient and cost-effective the system can be. The technicians need not be all at one central location. Instead, through the use of the Distributed Customer Service Centers described above, Collaborative Customer Support Centers can be deployed whereby the technicians can be physically distributed over a plurality of geographic locations. The coordination of the operation of such Collaborative Customer Support Centers can be performed by the Customer Service Management System 102 as described in this specification.

XIV. User-Agent Co-Browsing

Another aspect of the invention, relates to a co-browsing method that allows agents and users to see the same web page during a voice service session. In accordance with this method the voice service agent enters, in a dedicated field, a link to a web page the agent wants the user to see and then tells the user to click on a "SHOW ME" button to display that page on the user's browser. Such web page is then used to facilitate the verbal communication between the agent and the user.

XV. Directory of Subscriber Institutions

Another aspect of the invention relates to a web based Directory-of-Subscribers where the user can browse institutions that subscribe to the Customer Service Management System and select the institution of interest. In response to the selection by the user, the Customer Service Management System displays the customer service web page related to that institution.

XVI. Conclusion

While certain preferred embodiments have been described and shown in the accompanying drawings, it is to be understood that such embodiments are merely illustrative of, and not restrictive on, the broad invention. Other embodiments that are apparent to those of ordinary skill in the art, including embodiments that do not provide all of the features and advantages set forth herein, are also within the scope of this invention. Further, it is to be understood that this invention is not limited to the specific construction and arrangements shown and described since various modifications or changes may occur to those of ordinary skill in the art without departing from the spirit and scope of the invention. Accordingly, the scope of the invention is defined by the claims that follow. In the claims, a portion shall include greater than none and up to the whole of a thing. In the method claims, reference characters are used for convenience of description only, and do not indicate a particular order for performing the method.

What is claimed is:

1. A user support system comprising:
a host system;
a selection oriented knowledge base executing on the host system, the selection oriented knowledge base configured as a user-navigable directed graph comprising a plurality of nodes wherein each node is configured to provide information for display on a web page, and wherein for at least some of the nodes, the web page displays, in association with the information, a user-selectable option to establish a communication session with a live representative;
a navigational archive executing on the host system, the navigational archive configured to log paths through the selection oriented knowledge base traversed by users navigating the selection oriented knowledge base, and in association with the logged paths and nodes within the paths, to log user-selections of options to establish a communication session with a live representative;
a help requests predictor executing on the host system, the help requests predictor configured to:
for each node of a first plurality of nodes within the selection oriented knowledge base, count a number of active users that are browsing the node, and
for each node of a second plurality of nodes within the selection oriented knowledge base:
determine, based upon the logged paths and selections in the navigational archive, at least one probability that a user selects an option at the node to establish a communication session with a live representative, and
provide a predicted demand for service agents at the node based on the at least one probability that a user selects an option at the node to establish a communication session with a live representative and based on at least one of the counts of numbers of active users; and
a service agents scheduler executing on the host system, the service agents scheduler configured to use the predicted demand provided by the help requests predictor for the second plurality of nodes to allocate live service agents to handle user communication sessions for the second plurality of nodes.

2. The user support system of claim 1, wherein the navigational archive is further configured to log:
times at which users transition to nodes, and
times for user-selections of options to establish a communication session with a live representative.

3. The user support system of claim 2, wherein the help requests predictor is further configured to provide the predicted demand for service agents at the node as a function of time.

4. The user support system of claim 1, wherein the help requests predictor is further configured to determine, for each of a plurality of pairs of nodes comprising a first node selected from the first plurality of nodes and a second node from the second plurality of nodes, a likelihood that an active user browsing the first node will traverse the second node.

5. The user support system of claim 4, wherein the help requests predictor is further configured to provide the predicted demand for service agents as a function of time.

6. The user support system of claim 1, wherein:
the navigational archive is further configured to determine a score representative of effort an active user has expended in browsing the selection oriented knowledge base, and the service agents scheduler is further configured to use the score to prioritize a connection of the active user, over other active users, to a live service agent.

7. The user support system of claim 1, wherein the host system is configured to:
   display a reference code on a web page in response to a user request to establish a communication session with a live representative;
   receive the reference code in response to a prompt to a user to provide the reference code in association with a setup of a communication session with a live representative; and
   use the received reference code to identify a user session associated with the web page.

8. A method for providing user support, the method comprising:
   providing a host system;
   operating a selection oriented knowledge base on the host system, the selection oriented knowledge base configured as a user-navigable directed graph comprising a plurality of nodes wherein each node is configured to provide information for display on a web page, and wherein for at least some of the nodes, the web page displays, in association with the information, a user-selectable option to establish a communication session with a live representative;
   logging paths through the selection oriented knowledge base traversed by users navigating the selection oriented knowledge base;
   logging, in association with the logged paths and nodes within the paths, user-selections of options to establish a communication session with a live representative;
   for each node of a first plurality of nodes within the selection oriented knowledge base, counting a number of active users that are browsing the node;
   for each node of a second plurality of nodes within the selection oriented knowledge base:
      determining, based upon the logged paths and selections in the navigational archive, at least one probability that a user selects an option at the node to establish a communication session with a live representative, and
      providing a predicted demand for service agents at the node based on the at least one probability that a user selects an option at the node to establish a communication session with a live representative and based on at least one of the counts of numbers of active users; and
   using the predicted demand for service agents for the second plurality of nodes to allocate live service agents to handle user communication sessions for the second plurality of nodes.

9. The method of claim 8, further comprising:
   logging times at which users transition to nodes, and
   logging times for user-selections of options to establish a communication session with a live representative.

10. The method of claim 9, wherein the predicted demand for service agents at the node is provided as a function of time.

11. The method of claim 8, further comprising determining, for each of a plurality of pairs of nodes comprising a first node selected from the first plurality of nodes and a second node from the second plurality of nodes, a likelihood that an active user browsing the first node will traverse the second node.

12. The method of claim 11, wherein the predicted demand for service agents is provided as a function of time.

13. The method of claim 8, further comprising:
   determining a score representative of effort an active user has expended in browsing the selection oriented knowledge base, and
   using the score to prioritize a connection of the active user, over other active users, to a live service agent.

14. The method of claim 8, further comprising:
   displaying a reference code on a web page in response to a user request to establish a communication session with a live representative;
   receiving the reference code in response to a prompt to a user to provide the reference code in association with a setup of a communication session with a live representative; and
   using the received reference code to identify a user session associated with the web page.

* * * * *